United States Patent
Hada et al.

(10) Patent No.: US 6,388,768 B2
(45) Date of Patent: *May 14, 2002

(54) IMAGE FORMING APPARATUS WHICH EXCELS IN REPRODUCIBILITY OF COLORS, FINE LINES AND GRADATIONS EVEN IN A COPY MADE FROM A COPIED IMAGE

(75) Inventors: Yoshinobu Hada, Aichi-ken; Yukihiko Okuno, Toyokawa; Masahiro Kouzaki, Gamagori; Kentaro Katori; Katsuyuki Hirata, both of Toyokawa, all of (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,281

(22) Filed: Feb. 9, 1998

Related U.S. Application Data

(63) Continuation-in-part of application No. 08/845,249, filed on Apr. 21, 1997, now abandoned.

(30) Foreign Application Priority Data

Apr. 22, 1996 (JP) .............................................. 8-100414
Apr. 22, 1996 (JP) .............................................. 8-100415
Mar. 26, 1997 (JP) .............................................. 9-073903

(51) Int. Cl.[7] .............................................. B41B 1/00
(52) U.S. Cl. ........................................................ 358/1.9
(58) Field of Search ................................... 358/518, 504, 358/521, 406, 461, 300, 1.9; 382/112, 167, 168, 162, 165, 260

(56) References Cited

U.S. PATENT DOCUMENTS

| 4,967,379 A | 10/1990 | Ott |
| 5,130,809 A | 7/1992 | Takayanagi |
| 5,182,721 A | 1/1993 | Kipphan et al. |
| 5,267,049 A | 11/1993 | Yamamoto |
| 5,327,252 A | 7/1994 | Tsuruoka et al. |
| 5,412,489 A | 5/1995 | Hiroto |
| 5,754,683 A | 5/1998 | Hayashi et al. |
| 5,960,121 A | * 9/1999 | Takahashi ................... 382/260 |

FOREIGN PATENT DOCUMENTS

JP          5-299964        11/1993

* cited by examiner

Primary Examiner—Joseph Mancuso
Assistant Examiner—Vikkram Bali
(74) Attorney, Agent, or Firm—McDermott, Will & Emery

(57) ABSTRACT

An image forming apparatus for forming an image with few defects even when making a copy from a copied image. When forming an image, a standard pattern is formed outside the image forming area in accordance with standard pattern data for color correction. When reading the image together with the standard pattern formed above, the color correction conditions for the image data are modified in accordance with the comparison result between the read standard pattern data and the standard pattern data for color correction. Copying is then performed on a copying paper.

11 Claims, 51 Drawing Sheets

⟹ : IMAGE BUS

⟶ : DATA BUS

FIG. 8

| C | M | Y | B | C | M | Y | B |
|---|---|---|---|---|---|---|---|
| ~x1 | ~x1 | ~x1 | B0 | ~x3 | ~x1 | ~x1 | B20 |
|  |  | ~x2 | B1 |  |  | ~x2 | B21 |
|  |  | ~x3 | B2 |  |  | ~x3 | B22 |
|  |  | x3~ | B3 |  |  | x3~ | B23 |
|  | ~x2 | ~x1 | B4 |  | ~x2 | ~x1 | B24 |
|  |  | ~x2 | B5 |  |  | ~x2 | B25 |
|  |  | ~x3 | B6 |  |  | ~x3 | B26 |
|  |  | x3~ | B7 |  |  | x3~ | B27 |
|  | ~x3 | ~x1 | B8 |  | ~x3 | ~x1 | B28 |
|  |  | ~x2 | B9 |  |  | ~x2 | B29 |
|  |  | ~x3 | Ba |  |  | ~x3 | B2a |
|  |  | x3~ | Bb |  |  | x3~ | B2b |
|  | x3~ | ~x1 | Bc |  | x3~ | ~x1 | B2c |
|  |  | ~x2 | Bd |  |  | ~x2 | B2d |
|  |  | ~x3 | Be |  |  | ~x3 | B2e |
|  |  | x3~ | Bf |  |  | x3~ | B2f |
| ~x2 | ~x1 | ~x1 | B10 | x3~ | ~x1 | ~x1 | B30 |
|  |  | ~x2 | B11 |  |  | ~x2 | B31 |
|  |  | ~x3 | B12 |  |  | ~x3 | B32 |
|  |  | x3~ | B13 |  |  | x3~ | B33 |
|  | ~x2 | ~x1 | B14 |  | ~x2 | ~x1 | B34 |
|  |  | ~x2 | B15 |  |  | ~x2 | B35 |
|  |  | ~x3 | B16 |  |  | ~x3 | B36 |
|  |  | x3~ | B17 |  |  | x3~ | B37 |
|  | ~x3 | ~x1 | B18 |  | ~x3 | ~x1 | B38 |
|  |  | ~x2 | B19 |  |  | ~x2 | B39 |
|  |  | ~x3 | B1a |  |  | ~x3 | B3a |
|  |  | x3~ | B1b |  |  | x3~ | B3b |
|  | x3~ | ~x1 | B1c |  | x3~ | ~x1 | B3c |
|  |  | ~x2 | B1d |  |  | ~x2 | B3d |
|  |  | ~x3 | B1e |  |  | ~x3 | B3e |
|  |  | x3~ | B1f |  |  | x3~ | B3f |

801 — C
802 — M
803 — Y
804 — B (a)                (b)

FIG. 14
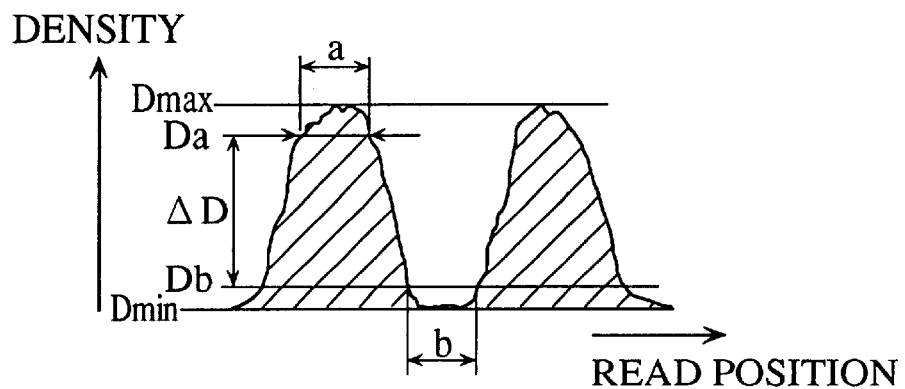
FIG. 15
| ΔD | 0 ~140 | 141 ~150 | 151 ~160 | 161 ~170 | 171 ~180 | 181 ~190 | 191 ~200 | 201 ~210 | 211 ~220 | 221 ~230 | 231 ~255 |
|---|---|---|---|---|---|---|---|---|---|---|---|
| MTF CORRECTION VALUE | +5 | +4 | +3 | +2 | +1 | ±0 | −1 | −2 | −3 | −4 | −5 |
FIG. 16
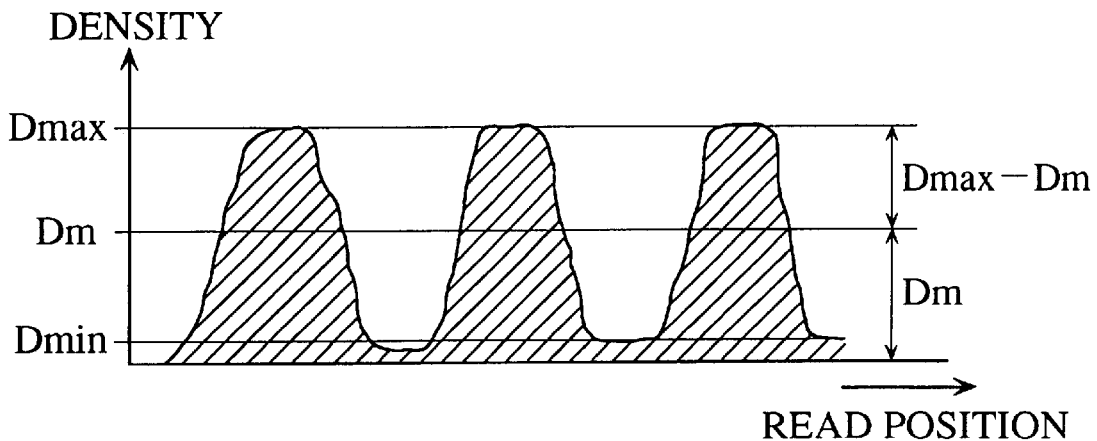

| A | ~0.3 | 0.3~0.4 | 0.4~0.6 | 0.6~0.8 | 0.8~1.0 | 1.0~1.2 | 1.2~1.4 | 1.4~1.6 | 1.6~1.8 | 1.8~ |
|---|---|---|---|---|---|---|---|---|---|---|
| MTF CORRECTION VALUE | +4 | +3 | +2 | +1 | ±0 | −1 | −2 | −3 | −4 | −5 |

| $\tan\theta\,\text{ave}/\tan\theta_0$ | ~0.4 | 0.4~0.5 | 0.5~0.6 | 0.6~0.7 | 0.7~0.9 | 0.9~1.1 | 1.1~1.3 | 1.3~1.6 | 1.6~1.9 | 1.9~2.3 | 2.3~ |
|---|---|---|---|---|---|---|---|---|---|---|---|
| MTF CORRECTION VALUE | +5 | +4 | +3 | +2 | +1 | ±0 | −1 | −2 | −3 | −4 | −5 |

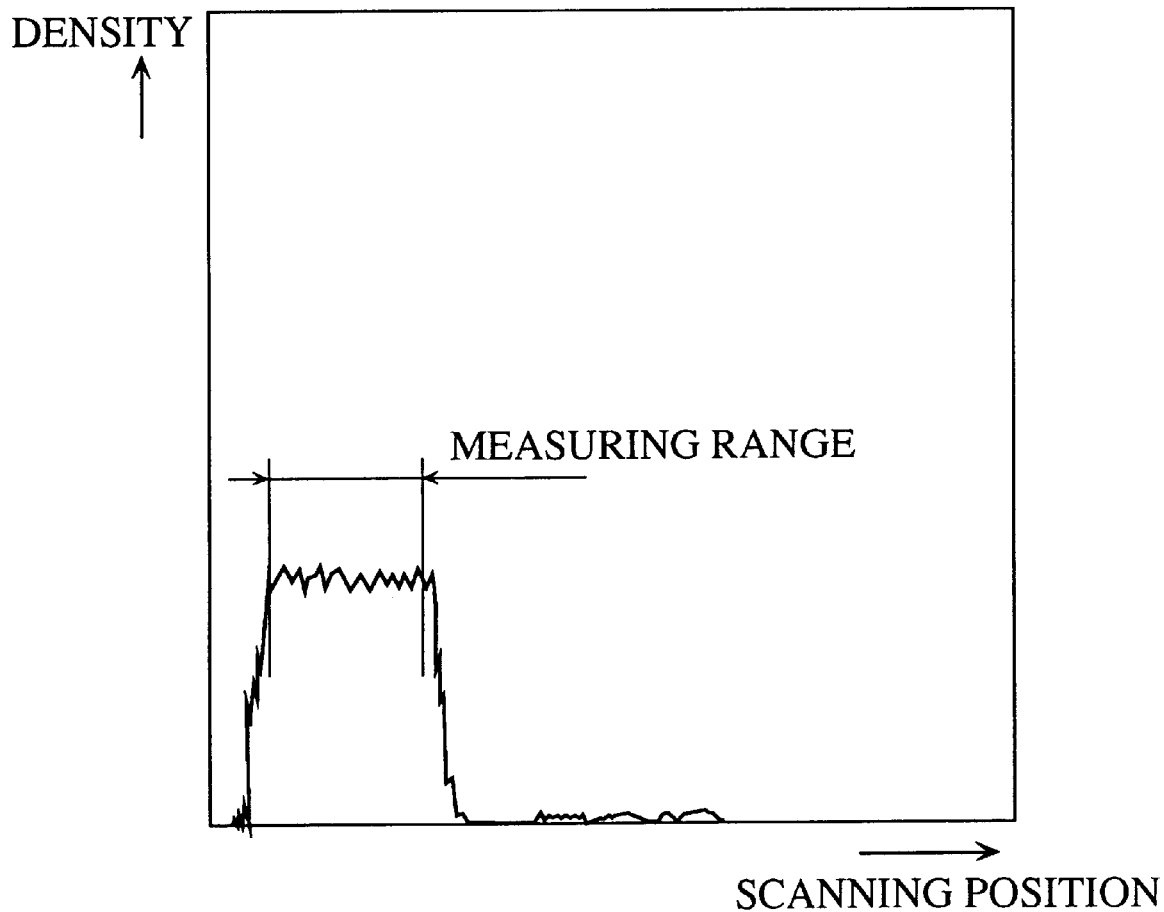

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

| −1/8 | 0 | 0 | 0 | 1/8 |
|---|---|---|---|---|
| −1/8 | −1/8 | 0 | 1/8 | 1/8 |
| −1/8 | −1/8 | 0 | 1/8 | 1/8 |
| −1/8 | −1/8 | 0 | 1/8 | 1/8 |
| −1/8 | 0 | 0 | 0 | 1/8 |

1262

| −1/8 | −1/8 | −1/8 | −1/8 | 1/8 |
|---|---|---|---|---|
| 0 | −1/8 | −1/8 | −1/8 | 0 |
| 0 | 0 | 0 | 0 | 0 |
| 0 | 1/8 | 1/8 | 1/8 | 0 |
| 1/8 | 1/8 | 1/8 | 1/8 | 1/8 |

| 1/32 | 1/16 | 1/32 |
|------|------|------|
| 1/16 | 5/8  | 1/16 |
| 1/32 | 1/16 | 1/32 |

1082

| 1/16 | 1/8 | 1/16 |
|------|-----|------|
| 1/8  | 1/4 | 1/16 |
| 1/16 | 1/8 | 1/16 |

1083

| 1/100 | 1/13 | 1/25 | 1/13 | 1/100 |
|-------|------|------|------|-------|
| 1/13  | 1/25 | 2/25 | 1/25 | 1/13  |
| 1/25  | 2/25 | 4/25 | 2/25 | 1/25  |
| 1/13  | 1/25 | 2/25 | 1/25 | 1/13  |
| 1/100 | 1/13 | 1/25 | 1/13 | 1/100 |

⟹ : IMAGE BUS

⟶ : DATA BUS

IMAGE FORMING APPARATUS WHICH EXCELS IN REPRODUCIBILITY OF COLORS, FINE LINES AND GRADATIONS EVEN IN A COPY MADE FROM A COPIED IMAGE

This is a Continuation-in-Part of U.S. patent application Ser. No. 08/845,249, filed Apr. 21, 1997 now abandoned.

BACKGROUND OF THE INVENTION (1) Field of the Invention

The present invention relates to a color image forming apparatus, such as a digital color copying machine.

(2) Description of the Prior Art

In a conventional digital color copying machine, color correction is performed so as to obtain image copies without causing deterioration. However, there has been a problem that, since a color correction value used in the color correction is a fixed value, the color reproducibility deteriorates when the color characteristics of an ink film or the recording density characteristics of a recording paper changes with time. Japanese Laid-open Patent Application No. 2-199964 discloses a color correction technique which is able to cope with the varying color characteristics of an ink film or the varying recording density characteristics of a recording paper. According to the technique disclosed in that application, a sample patch formed in accordance with conventional color data is printed on a recording paper, and a color correction value is changed depending on the color data read from the sample patch and the conventional color data.

In the prior art, as the color correction value can be changed depending on the reproduction characteristics of the image forming apparatus, the color reproducibility in a copy is stabilized. However, when making second, third, and successive generation copies of an original, there is a gradual deterioration in image quality and color, so that the colors in a later generation copy end up being totally different from the original colors. Here, even if the image forming apparatus reproduces the colors and the image quality as close to the original as possible, the colors in the copied image will still be different from the original colors due to the influence of the toner graininess and the characteristics of each color. If a copied image is copied further, the colors and the image quality become even more different from the original colors and the original image quality. The difference between the original image and the copied image becomes greater as the process of making copies of a copied image is repeated.

Repeating making copies of a copied image results not only in poor color reproducibility but also in deterioration of the minute line reproducibility and the gradient characteristic reproducibility.

SUMMARY OF THE INVENTION

The principal object of the present invention is to provide an image forming apparatus which is capable of forming an image with guaranteed reproducibility of colors, fine lines and gradations, even when it repeats reproduction to make generations of copies.

The principal object of the present invention is to provide an image forming apparatus which is capable of forming an image with guaranteed reproducibility of colors, fine lines and gradations, even when it repeats reproduction to make generations of copies.

The above object can be achieved by producing a color image forming apparatus comprising: a standard pattern data storage unit for storing standard pattern data for color correction; a standard pattern forming unit for forming a standard pattern for color correction on a copying paper in accordance with the standard pattern data; a standard pattern reading unit for reading the standard pattern formed on a document to be read; a color correction condition modification unit for modifying color correction conditions in accordance with standard pattern data obtained by reading the standard pattern formed on the document and the standard pattern data stored in the standard pattern data storage unit in advance; and a correction unit for performing color correction on read data of the entire image of the document in accordance with the modified color correction conditions.

The object of the present invention may also be achieved by providing an image forming apparatus comprising: a standard pattern data storage unit for storing standard pattern data for gradation correction; a standard pattern forming unit for forming a standard pattern for gradation correction on a copying paper in accordance with the standard pattern data; a standard pattern reading unit for reading a standard pattern formed on a document being read; a gradation correction condition modification unit for modifying gradation correction conditions in accordance with the read standard pattern data and the stored standard pattern data; and a correction unit for correcting image data obtained by reading the document in accordance with the modified gradation correction conditions.

The object of the present invention may also be achieved by providing an image forming apparatus comprising: a machine code storage unit for storing machine codes in advance; a standard pattern reading unit for reading a standard pattern formed on a document, the standard pattern corresponding to one of the machine codes; a machine code fetch unit for fetching a machine code corresponding to standard pattern data obtained by reading the standard pattern; a gradation correction condition modification unit for modifying gradation correction conditions in accordance with the fetched machine code; and a correction unit for correcting image data obtained by reading the image of the document in accordance with the modified gradation correction conditions.

The object of the present invention may also be achieved by an image forming method used for an image forming apparatus which comprises: a document reading unit for optically reading a document; a correction unit for performing color correction and gradation correction on image data obtained by reading the document; a storage unit for storing standard pattern data to be standards for correction; and an image printing unit for printing an image on a copying paper in accordance with the corrected image data. The image forming method comprises the steps of: reading the standard pattern data stored in the storage unit and forming a standard pattern in a predetermined area on the copying paper; reading the document by the document reading unit; detecting the standard pattern data from the image data; comparing the detected standard pattern data with the standard pattern data stored in the storage unit, determining color correction conditions, gradation correction conditions, and MTF correction conditions, and setting them in the correction unit; and correcting the image data in accordance with the corrected correction conditions and forming an image on the copying paper.

The object of the present invention may also achieved by an image forming method used for an image forming apparatus which comprises: a document reading unit for optically reading a document; a correction unit for performing gradation correction on image data obtained by reading a document; and an image printing unit for printing an image on a copying paper using a table containing machine codes and corresponding gradation correction conditions, and the corrected image data. The image forming method comprises the steps of: reading a document; detecting a standard pattern from the image data; detecting a machine code represented by the detected standard pattern; reading gradation correction conditions corresponding to the machine code detected from the table, and setting them in the correction unit; and correcting the image data by the correction unit, and printing the image on the copying paper.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 8 shows LUT used by the color correction unit in the image signal processing unit.

FIG. 14 is a graph showing the data values of the density data and the read position.

FIG. 15 is a table showing the constants AD and the MTF correction values.

FIG. 16 is a graph showing the data values of the density data and the read position.

FIG. 20 is a graph showing the relationship between the data values of the density data and the read position.

FIG. 21 is a table showing the absolute average values a and the MTF correction values.

FIG. 48 is a chart of the Laplacian filter.

FIG. 49 is a chart of the linear differential filter.

FIG. 53 shows the smoothing filter.

DESCRIPTION OF THE PREFERRED EMBODIMENTS

[First Embodiment]

Figure 1:
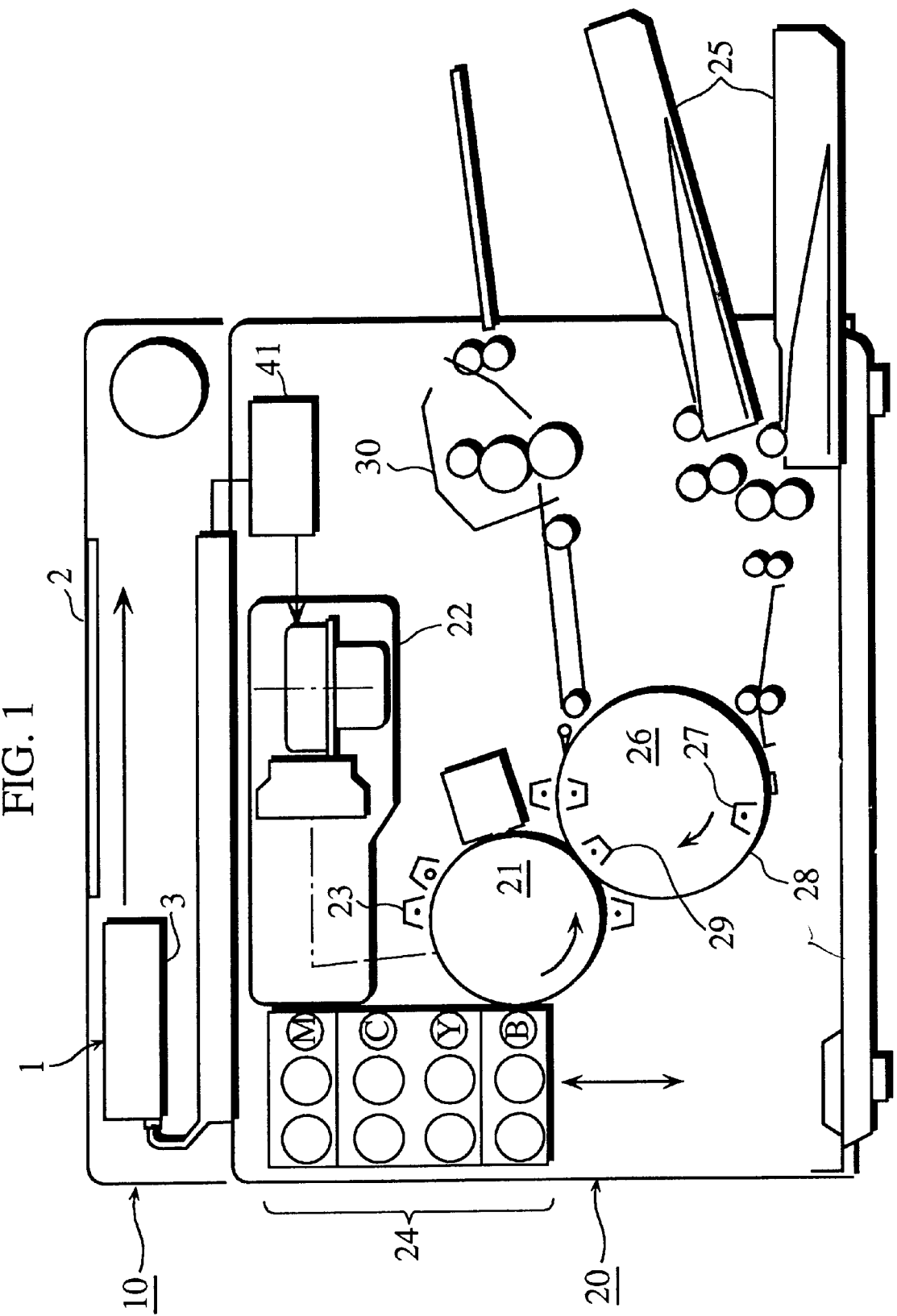
FIG. 1 shows the overall structure of a digital full-color copying machine of the first embodiment of the present invention.

FIG. 1 shows the overall structure of a digital full-color copying machine in the first embodiment of the present invention. In an image reader unit 10, a document placed on a document glass plate 2 is irradiated and scanned by a scanner 1, and the read image is photoelectrically converted. The image data are then subjected to A/D conversion by an image signal processing unit, followed by density conversion, color correction, and MTF correction. The corrected image data are then sent to a printer unit 20, where it is processed as printing data.

The printing data sent to the printer unit 20 are then subjected to gamma correction and D/A conversion so that it is converted into exposure data. A printer head included in a printer head unit 22 is driven, and a laser light irradiates the surface of a photosensitive member 21 so that an electrostatic image of each toner of C, M, Y, and BK is formed in accordance with the exposure data. By doing so, an electrostatic latent image is formed on the surface of the photosensitive member 21, which has been uniformly charged by a sensitizing charger 23. The development of a color selected among C, M, Y, and BK, is performed by a developing unit 24, which has been moved close to the photosensitive member 21.

Meanwhile, a copying paper is transferred from one of paper cassettes 25 in synchronization with the suction positions of a transfer drum 26 so that it is electrostatically stuck onto a transfer film 28 by means of a suction charger 27. The image developed on the surface of the photosensitive member 21 is then transferred onto the copying paper by a transfer charger 29.

The above printing process of reading, forming a latent image by laser irradiation, developing, and transferring, is repeated for all the colors (it is repeated four times in normal full-color image forming). The copying paper is then separated from the transfer drum, and the image is fixed onto the surface of the copying paper by a fixing unit 30.

Figure 2:
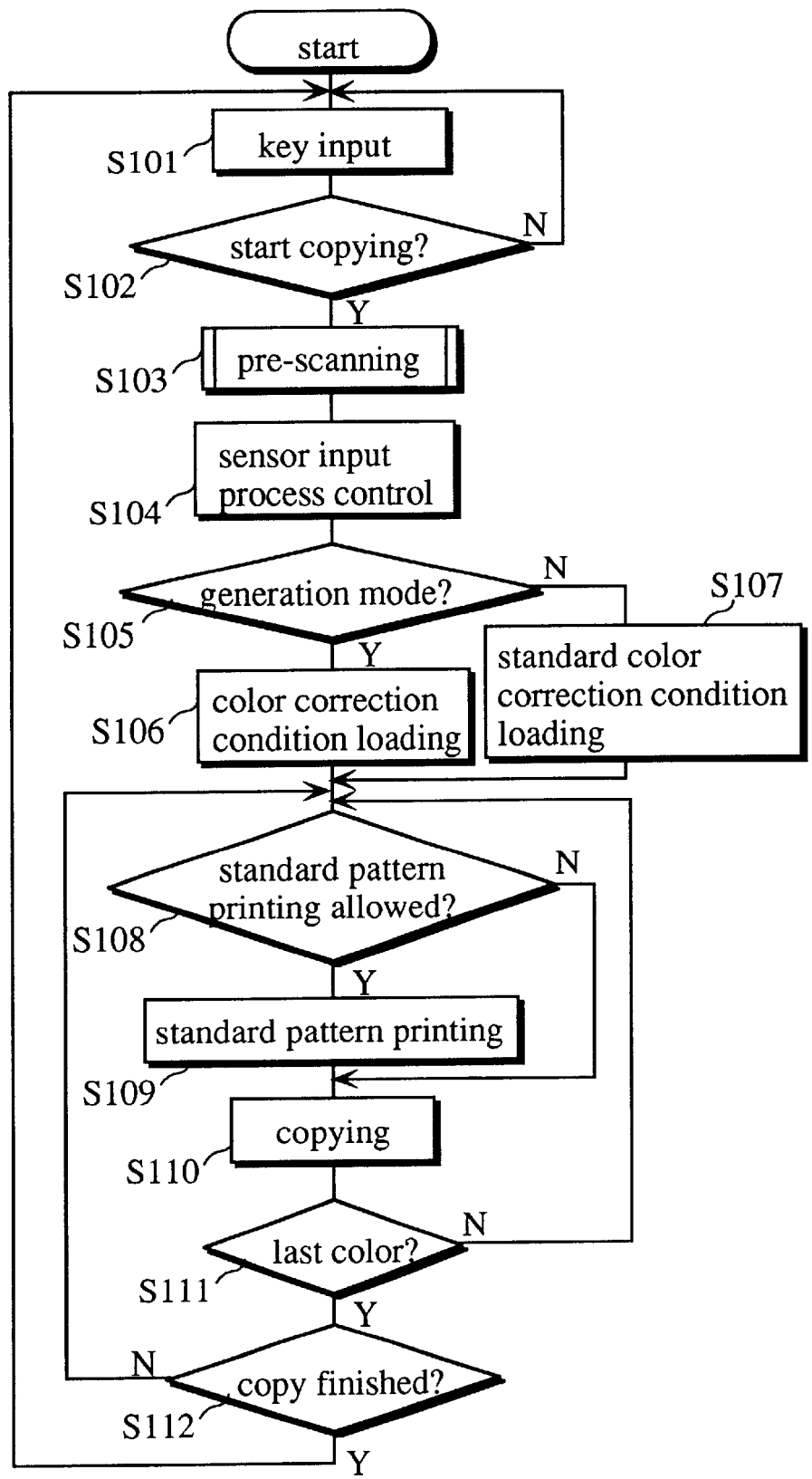
FIG. 2 is a flow chart of the control unit of the digital full-color copying machine.
Figure 3:
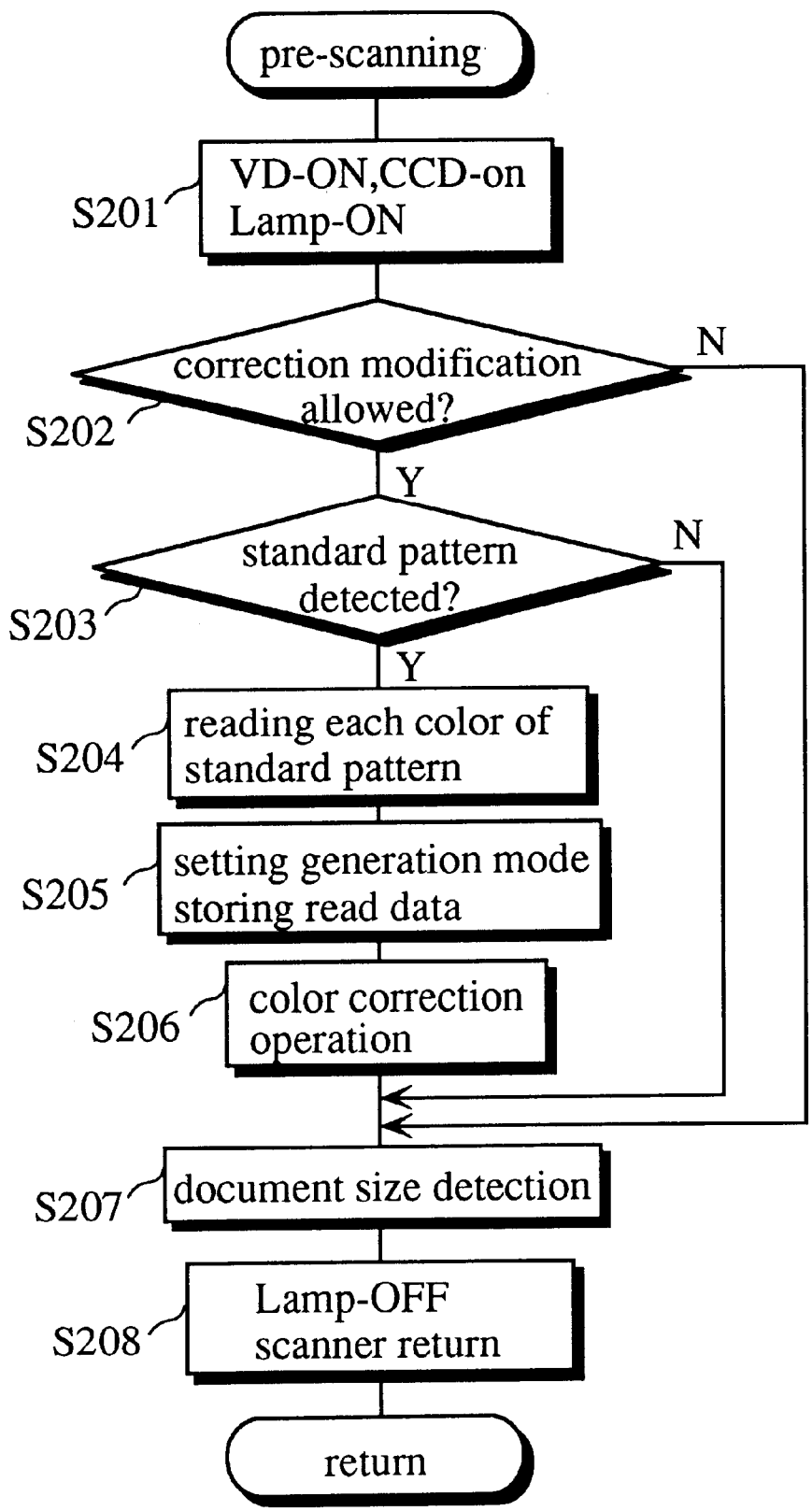
FIG. 3 shows a subroutine of the control flow shown in FIG. 2.

A control unit 41 is provided to control each unit. FIGS. 2 and 3 show the control flow charts of the control unit 41, which will be described later in the specification.

Figure 4:
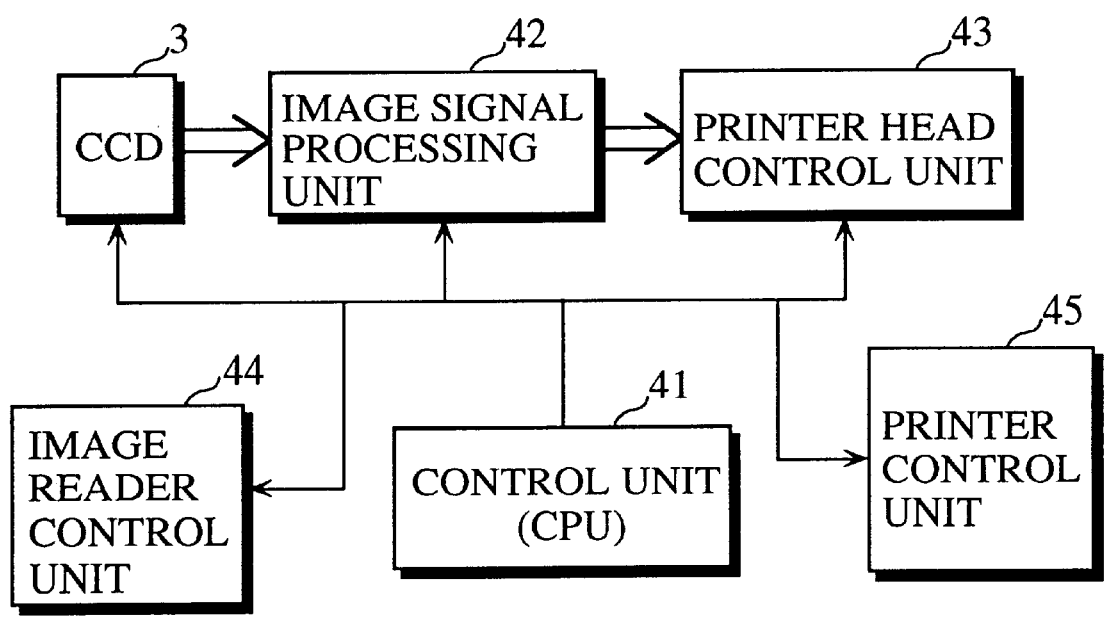
FIG. 4 is a block diagram of the control system of the digital full-color copying machine.

FIG. 4 is a block diagram of the control system of the digital full-color copying machine. This figure shows a CCD sensor 3, an image signal processing unit 42, a printer head control unit 43, an image reader control unit 44, and a printer control unit 45.

(1-1) Image Signal Processing Unit

Figure 5:
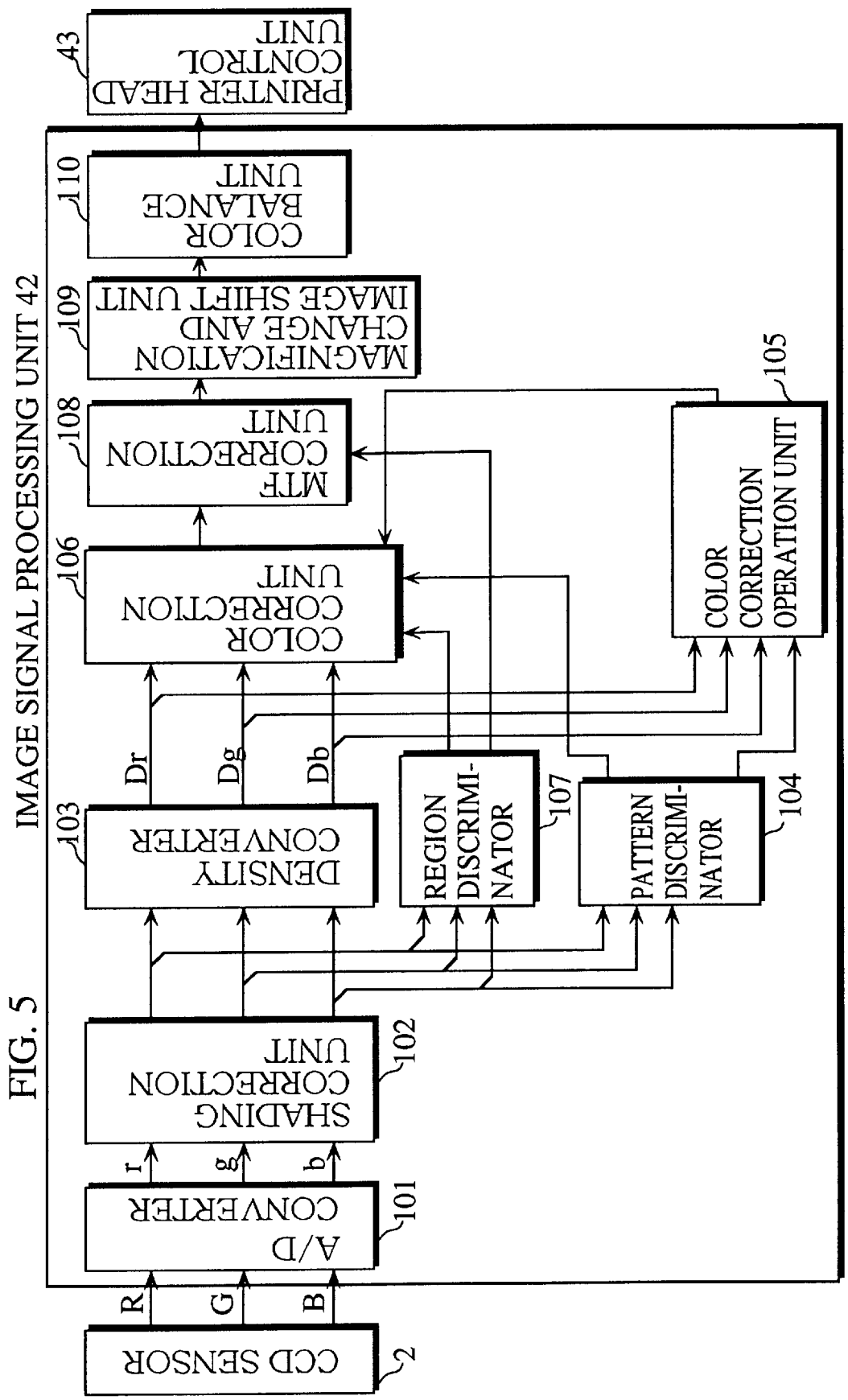
FIG. 5 is a block diagram of the image signal processing unit of the digital full-color copying machine.

FIG. 5 is a block diagram of the image signal processing unit shown in FIG. 4. The image signal processing unit 42 subjects the image data outputted from the CCD sensor 3 to A/D conversion, density conversion, color correction, and MTF correction, and then outputs them as printing data to the printer head control unit 43.

The image data photoelectrically converted by the CCD sensor 3 are further converted into multi-valued digital data r, g, and b of the three primary colors, R, G, and B by an A/D converter 101. The multi-valued digital data are then subjected to shading correction by a shading correction unit 102, and standardized into 8-bit data, which are sent to a density converter 103, a pattern discriminator 104, and a region discriminator 107.

The density converter 103 converts the reflectance data of an image into the actual density data, which are then sent to a color correction operation unit 105 and a color correction unit 106.

Figure 6:
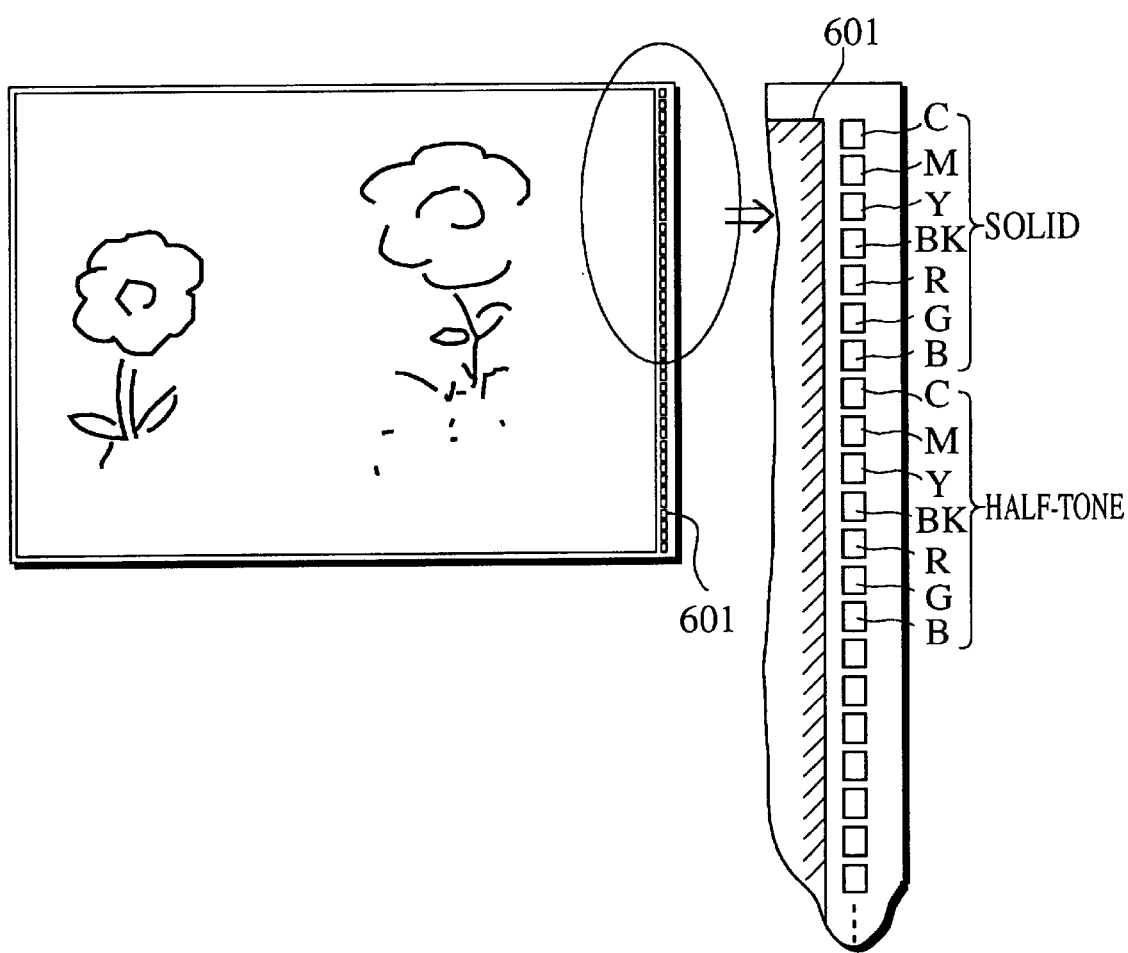
FIG. 6 shows a standard pattern.

The pattern discriminator 104 determines whether a standard pattern exists in a predetermined area, and discriminates the colors of the standard pattern. Here, the standard pattern consists of 2×3 mm solid and half-tone squares of C, M, Y, BK, R, G, and B, as shown in FIG. 6. The standard pattern is formed outside an image forming area 601 where an image is formed. The pattern discriminator 104 determines whether the standard pattern exits and determines the colors of the standard pattern by comparing inner-held information on the standard pattern position with the 8-bit information data on the standard position sent from the shading correction unit 102.

(1-2) Color Correction Operation Unit

The color correction operation unit 105 determines color correction conditions using the data from the density converter 103 (the read data of the standard pattern), the standard data for the standard pattern, and the discrimination results of the pattern discriminator 104, and it sends them to the color correction unit 106. The standard data for the standard pattern are stored in the color correction operation unit 105. The standard data are used as the standards for printing the standard pattern shown in FIG. 6. The color correction operation unit 105 sends the standard data to the printer head control unit 43 when printing an image.

The color correction operation unit 105 determines color correction conditions using a suitable technique, such as a linear masking method. The following is an explanation of the linear masking method.

Dr, Dg, and Db are the read data of the standard pattern, while Dc, Dm, and Dy are the standard data for the standard pattern stored in the color correction operation unit 105 in advance.

The relationship between the read data and the standard data for the standard pattern is as follows.

$$\begin{pmatrix} Dr \\ Dg \\ Db \end{pmatrix} = A \begin{pmatrix} Dc \\ Dm \\ Dy \end{pmatrix} \quad (1)$$

wherein A is a 3×3 matrix as shown below.

$$A = \begin{pmatrix} a_{11} & a_{12} & a_{13} \\ a_{21} & a_{22} & a_{23} \\ a_{31} & a_{32} & a_{33} \end{pmatrix} \quad (2)$$

According to the above equations, a matrix B in the following equation is the inverse matrix of the matrix A.

$$\begin{pmatrix} Dc \\ Dm \\ Dy \end{pmatrix} = B \begin{pmatrix} Dr \\ Dg \\ Db \end{pmatrix} \quad (3)$$

$$B = A^{-1} = \begin{pmatrix} a_{11} & a_{12} & a_{13} \\ a_{21} & a_{22} & a_{23} \\ a_{31} & a_{32} & a_{33} \end{pmatrix} \quad (4)$$

wherein $A^{-1}$ is the inverse matrix of matrix A.

Dc, Dm, and Dy are the standard data for the standard pattern stored in the color correction operation unit 105 in advance, and the data of the six colors, C, M, Y, R, G, and B, may be as follows.

$$\begin{pmatrix} Dc \\ Dm \\ Dy \end{pmatrix} = \begin{pmatrix} 255 \\ 0 \\ 0 \end{pmatrix} \begin{pmatrix} 0 \\ 255 \\ 0 \end{pmatrix} \begin{pmatrix} 0 \\ 0 \\ 255 \end{pmatrix} \begin{pmatrix} 0 \\ 128 \\ 128 \end{pmatrix} \begin{pmatrix} 128 \\ 0 \\ 128 \end{pmatrix} \begin{pmatrix} 128 \\ 128 \\ 0 \end{pmatrix} \quad (5)$$

Each of the six colors has 256 gradations, i.e., the data value of each color is from 0 to 255. Simultaneous equations are set up using the data values of the standard data of the six colors (C, M, Y, R, G, and B) and the read data of the standard pattern formed in accordance with the standard data, and the masking matrix B is determined from the solutions as of the simultaneous equations in the method of least squares.

The masking matrix B determined above serves as color correction conditions in correcting fluctuations in density of each color (the amount of density fluctuations of a first generation copy due to process changes, i.e., the color density differences between the genuine original and the first generation copy). The amount of black density fluctuations caused when making a first generation copy is incorporated into the amount of BP (black paint) or a black density adjusting value. From a black value, the amount of black density fluctuations caused in forming the standard pattern can be estimated.

The color correction unit 106 performs color correction on the density data outputted from the density converter 103 in accordance with the color correction conditions determined by the color correction operation unit 105. It also performs UCR/BP processing or masking to convert the density data into the printing data of C, M, Y, and BK. In the case where the standard pattern has not been detected by the region discriminator 107, the color correction unit 106 performs color correction in accordance with predetermined color correction conditions.

The region discriminator 107 discriminates image types from one another, such as a chromatic image from an achromatic image, and an edge portion from a non-edge portion, based on the read image data outputted from the shading correction unit 102.

In accordance with the discrimination result of the region discriminator 107, the MTF correction unit 108 then performs MTF correction, such as smoothing and edge sharpening, on the color-corrected data outputted from the color correction unit 106.

A magnification change and image shift unit 109 changes the magnification of the MTF-corrected data outputted from the MTF correction unit 108. A color balance unit 110 performs density balancing and color balancing on the data whose magnification has been changed, and outputs them as the printing data to the printer unit 20.

The printer head control unit 43 shown in FIG. 4 controls a laser unit 22 shown in FIG. 1 at the time of printing. If the user has sent an instruction to form the standard pattern shown in FIG. 6, the standard pattern is printed outside the image forming area 601, based on the printing data of the standard data outputted from the image signal processing unit 42.

The image reader control unit 44 controls the scanner 1.

The printer control unit 45 collectively and synchronously controls the actions of each component of the printer unit 20, including paper supply from one of the paper cassettes 25, paper transferring, rotation of the photosensitive member 21, and charge supply to each charger.

(1-3) Operation of the Color Copying Machine

The following explanation is for the operation of the digital full-color copying machine of the first embodiment, with reference to the control flow charts shown in FIGS. 2 and 3.

The digital full-color copying machine receives each key input prior to copying (step S101). An operation panel 60 shown in FIG. 7 may receive each key input. The operation panel 60 is provided with an LCD touch panel 61, which displays a density button 63, a magnification button 64, a paper size button 65, a generation button 66, and a standard pattern button 67. The generation button 66 receives an instruction as to whether a modification to correction conditions is allowed. An instruction to allow a modification to correction conditions is issued to order the copying machine to perform copying in accordance with color correction modification conditions calculated by the color correction operation unit 105, even when making a generation copy. An instruction to prohibit a modification to correction conditions is issued to order the copying machine to perform copying in accordance with the usual color correction conditions, even when making a generation copy. The standard pattern button 67 receives an instruction as to whether the standard pattern shown in FIG. 6 is formed at the time of copying. Each key input is provided by the user through the buttons 63 to 66. The number of copies to be made is set through a 10-keypad. A display 62 indicates the number of copies to be made. A copy start key 68 receives an instruction to start copying. The operation panel 60 further comprises an IC card 70 and an IC card insertion unit 71. Prior to copying, the IC card 70 stores data on the number of copies, copy magnification, paper size, and allowed modifications to correction conditions. These data stored in the IC card 70 are read only by inserting the IC cart 70 into the IC card insertion unit 71, where the insertion of the IC card 70 has the same function as an input through the buttons 63 to 66 and the 10-keypad.

Figure 7:
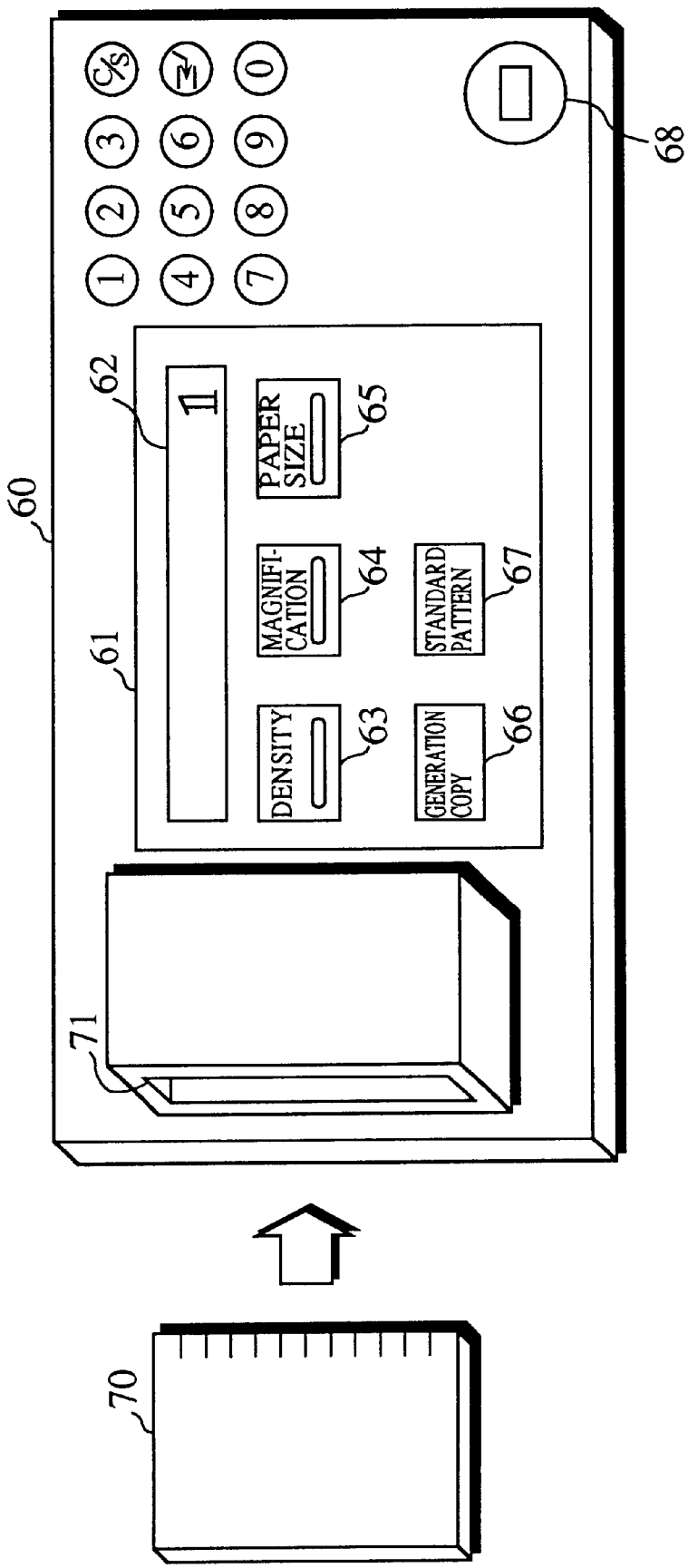
FIG. 7 shows the operation panel and IC card.

After receiving each key input, an instruction to start copying is issued by pressing the copy start key 68 shown in FIG. 7 (step S102), and pre-scanning is performed (step S103). As shown in the control flow of FIG. 3, the pre-scanning is performed prior to main scanning of a document to detect the size of the document and the existence of the standard pattern.

More specifically, the lamp of the scanner 1, the CCD sensor 3, and a VD signal are turned on (step S201). The VD signal indicates that the CCD sensor has started outputting signals. If an instruction to allow a modification to correction conditions has been received in step S101 (step S202), the pattern discriminator 104 determines through the CCD sensor 3 whether the standard pattern exist outside the image forming area in the document (step S203). For instance, it determines whether the standard pattern of C, M, Y, BK, R, G, and B has been printed outside the image forming area 601 of the copying paper as shown in FIG. 6, and if it has, the CCD sensor 3 reads each color of the standard pattern (step S204). The read data are processed by the A/D converter 101, the shading correction unit 102, and the density converter 103, and then stored into the color correction operation unit 105 (step S205). Here, a generation mode flag is set in the control unit 41. The color correction operation unit 105 then performs a color correction operation (step S206). More specifically, the color correction operation unit 105 determines color correction conditions using the read data of the standard pattern and the stored data of the standard pattern. The scanner 1 then detects the size of the document (step S207). After that, the lamp is switched off, and the scanner 1 returns to the home position (step S208), where the pre-scanning is completed.

As shown in FIG. 2, in accordance with the sensor input of the environmental sensor in the printer and the process control operations (detection of the electric potential of the photosensitive member and detection of the amount of stuck toners by AIDC pattern), image forming conditions (VO, VB, LD GAIN, Y-TABLE, and so on) are set in the printer head control unit 43 and the printer control unit 45 (step S104). The AIDC pattern formed on the photosensitive member is designed especially for detecting the amount of stuck toners. VO indicates the surface potential of the photosensitive member 21, VB indicates the electric potential of the developing bias, and LD GAIN indicates the amount of laser light.

Whether the generation mode flag is on is judged (step S105), and if it is, the color correction unit 106 is loaded with the color correction conditions determined in step S206 in FIG. 3 (step S106). In accordance with the color correction conditions, the copying operation, including the main scanning, is performed for each color (C, M, Y, and BK) (steps S110 and S11).

If the generation mode flag is not on, the control unit 41 loads the standard color correction conditions from the color correction operation unit 105 into the color correction unit 106 (step S107). In accordance with the standard correction conditions, the copying operation is performed for each color (steps S110 and S111). In the case where an instruction to form the standard pattern has been received in step S101 (step S108), an instruction is issued so that the printer head control unit 43 forms the standard pattern (S109). More specifically, an instruction is issued so that the pattern discriminator 104 and the color correction operation unit 105 transmits the standard data of the standard pattern to the printer head control unit 43. In accordance with the standard data of the standard pattern transmitted from the image signal processing unit 42 through the color correction operation unit 105, the color correction unit 106, the MTF correction unit 108, the magnification change and image shift unit 109, and the color balance unit 110, the printer head control unit 43 forms the standard pattern outside the image forming area 601 as shown in FIG. 6. Generally, the printing of the standard pattern is performed only when making a first generation copy. When making second and later generation copies, the standard pattern is not formed every time a new generation copy is made, but the standard pattern in the first generation copy is copied as a part of the image. By copying the standard pattern repeatedly, deterioration in color reproducibility can be detected by reading the copied standard pattern. Using the read data of the standard pattern, a suitable color correction can be performed. After repeating the above operation for each of a predetermined number of copying papers, the copying operation is finished (step S112). At the same time, the generation mode flag is cleared.

As described above, according to this embodiment, the standard pattern formed outside the image forming area of a copying paper is read, and the read data of the standard pattern are compared with the standard data of the standard pattern to determine the optimum color correction conditions. As copies are made in accordance with the color correction conditions, excellent color reproducibility can be achieved even in an image copied from a copied image. When making a second or third generation copy from a first generation copy in which the standard pattern has been formed, the standard pattern formed in the first generation copy is repeatedly copied so that deterioration in color reproducibility can be easily detected in comparison with the color reproducibility. Thus, a suitable color correction can be performed without causing deterioration in color reproducibility, even when making a copy from a copied image.

[Second Embodiment]

The following is an explanation of a digital full-color copying machine of the second embodiment of the present invention. The structure and the control system of the digital full-color copying machine of this embodiment are the same as shown in FIG. 1 and FIG. 4, and therefore, explanations of them are not provided below. The control unit 41 performs a control operation shown in the control flow charts of FIGS. 9 and 10. This control operation will be described later. An image signal processing unit 92 shown in FIG. 11 is provided in place of the image signal processing unit 42. So, the following description focuses on the image signal processing unit 92.

FIG. 11 is a block diagram of the image signal processing unit 92, which has the same structure as the image signal processing unit of the first embodiment except that it comprises a contrast judging unit 201 and an MTF correction unit 208 in place of the MTF correction unit 108. Accordingly, the following description concerns the contrast judging unit 201 and the MTF correction unit 208.

(2-1) Contrast Judging Unit

Figure 12:
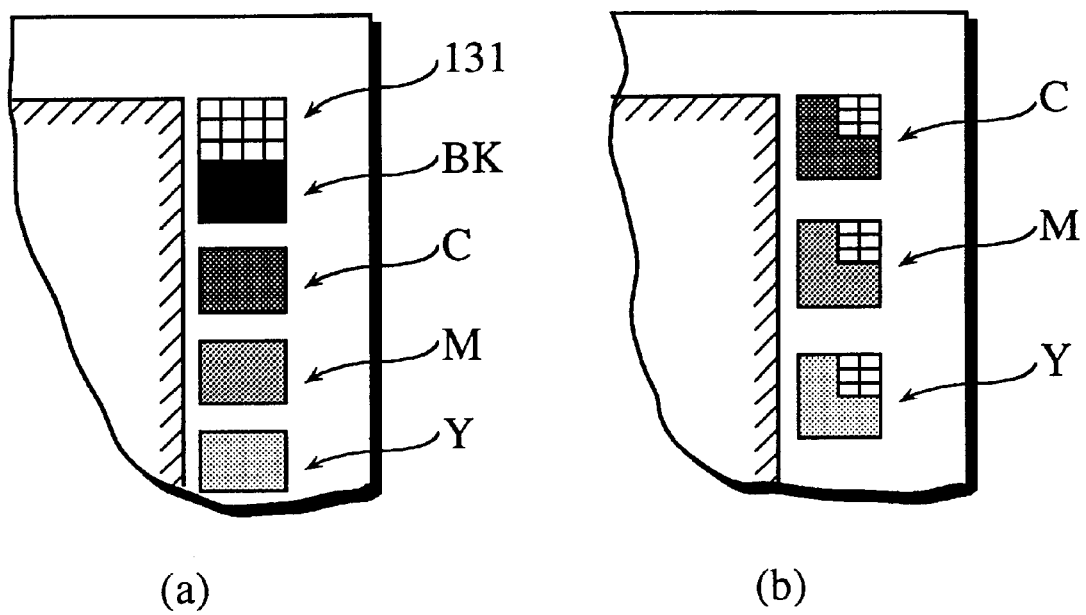
FIG. 12 shows a standard pattern of the second embodiment.

The contrast judging unit 201 determines an MTF correction value by judging the contrast between colors of the standard pattern, and sends the MTF correction value to the MTF correction unit 208. Besides the individual patterns of C, M, Y, BK, R, G, and B shown in FIG. 6, the standard pattern includes a lattice pattern as shown in FIG. 12(*a*). A lattice pattern painted by the BK toner may be formed in a corner of each individual pattern as shown in FIG. 12(*b*). Based on the density data of the standard pattern read by the CCD sensor 3, the contrast judging unit 201 detects the contrast between a light portion and a dark portion in the lattice pattern in the standard pattern. More specifically, this operation is performed as follows.

Figure 13:
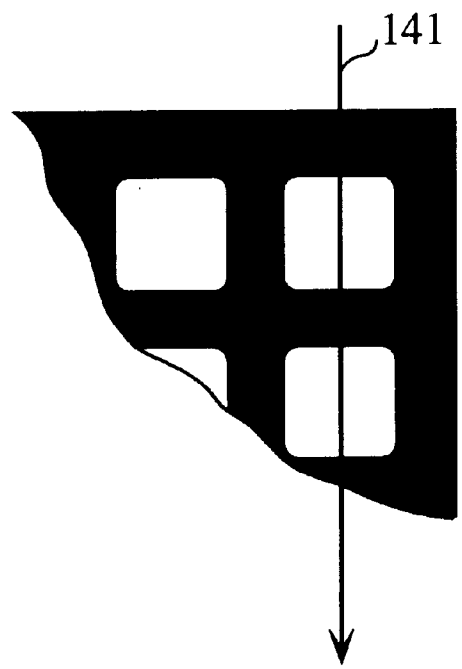
FIG. 13 is an enlarged view of a part of a lattice pattern of the standard pattern.

FIG. 13 is an enlarged view of a part of the lattice pattern shown in FIG. 12. FIG. 14 is a graph showing the relationship between the data values of the density data outputted from the density converter 103 and the read position when the standard pattern is read in the direction indicated by the arrow 141. Alphabetical characters a and b denote width data (shown on the graph) which have been stored in the contrast judging unit 201 in advance. The contrast judging unit 201 receives the pattern data of one line, and determines a data value Da which represents the density data having the width a, and determines a data value Db which represents the density data having the width b, using the width data a and b stored in advance. The contrast judging unit 201 further determines a contrast ΔD from the values Da and Db determined above. The contrast ΔD can be determined by subtracting Db from Da. Referring to the contrast ΔD and a table showing contrasts AD and MTF correction values in FIG. 15, an MTF correction value corresponding to each contrast ΔD is selected. The table shown in FIG. 15 is contained in the contrast judging unit 201, and one contrast ΔD is allotted to each of 11-level MTF correction values. The MTF correction unit 208 performs MTF correction based on an MTF correction value. When the MTF correction value is larger than zero, edge sharpening is performed, and the larger the MTF correction becomes, the more the edge sharpening is intensified. When the MTF correction value is smaller than zero, smoothing is performed, and the smaller the MTF correction value becomes, the more the smoothing is intensified.

The contrast judging unit 201 holds data for forming the lattice standard pattern.

In accordance with the MTF correction value and the discrimination result of the region discriminator 107, the MTF correction unit 208 performs the optimum smoothing or edge sharpening on the data which have been subjected to color correction by the color correction unit 106.

(2-2) The Operation of the Color Copying Machine

Figure 9:
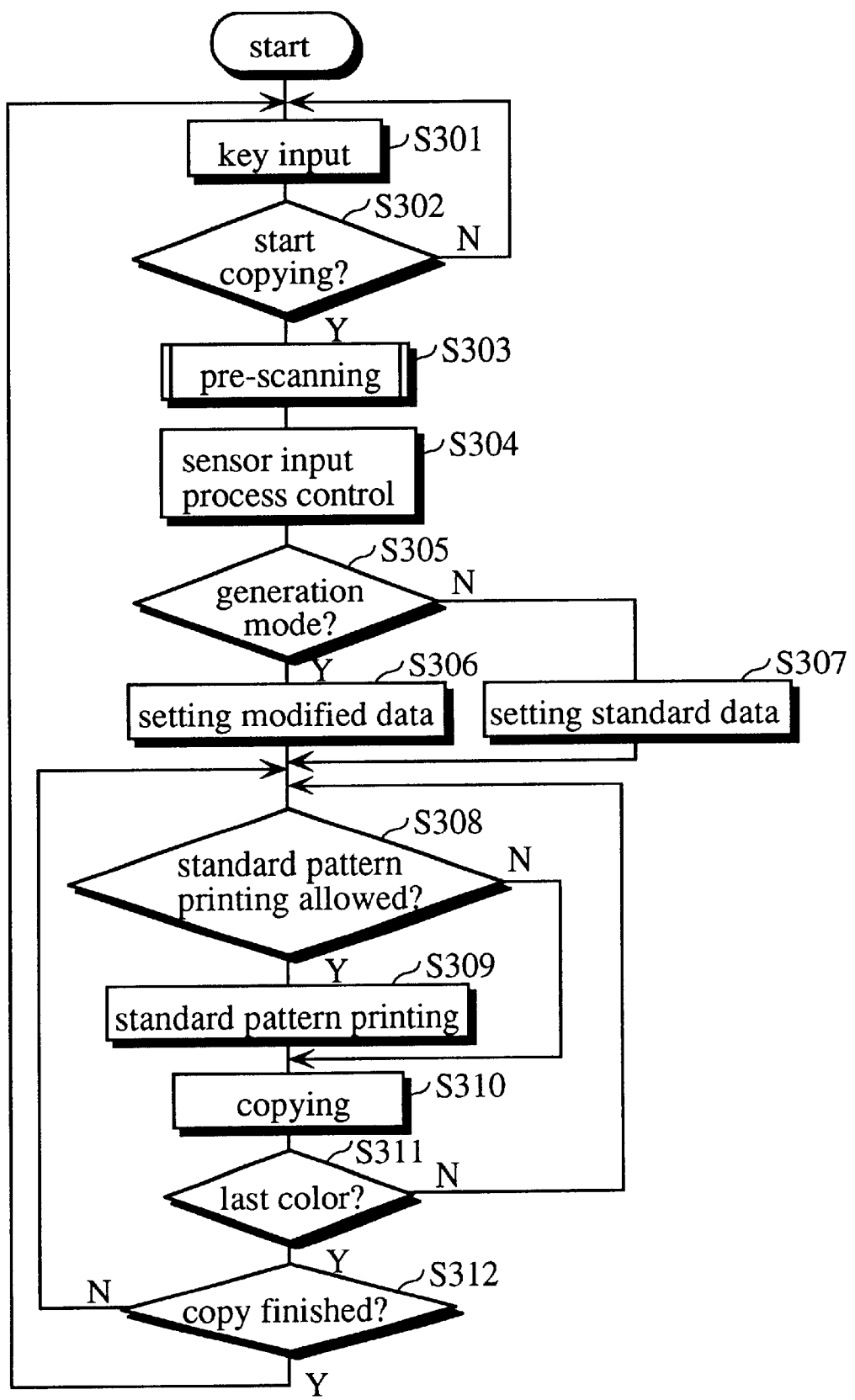
FIG. 9 is a flow chart of the control unit of a digital full-color copying machine of the second embodiment.
Figure 10:
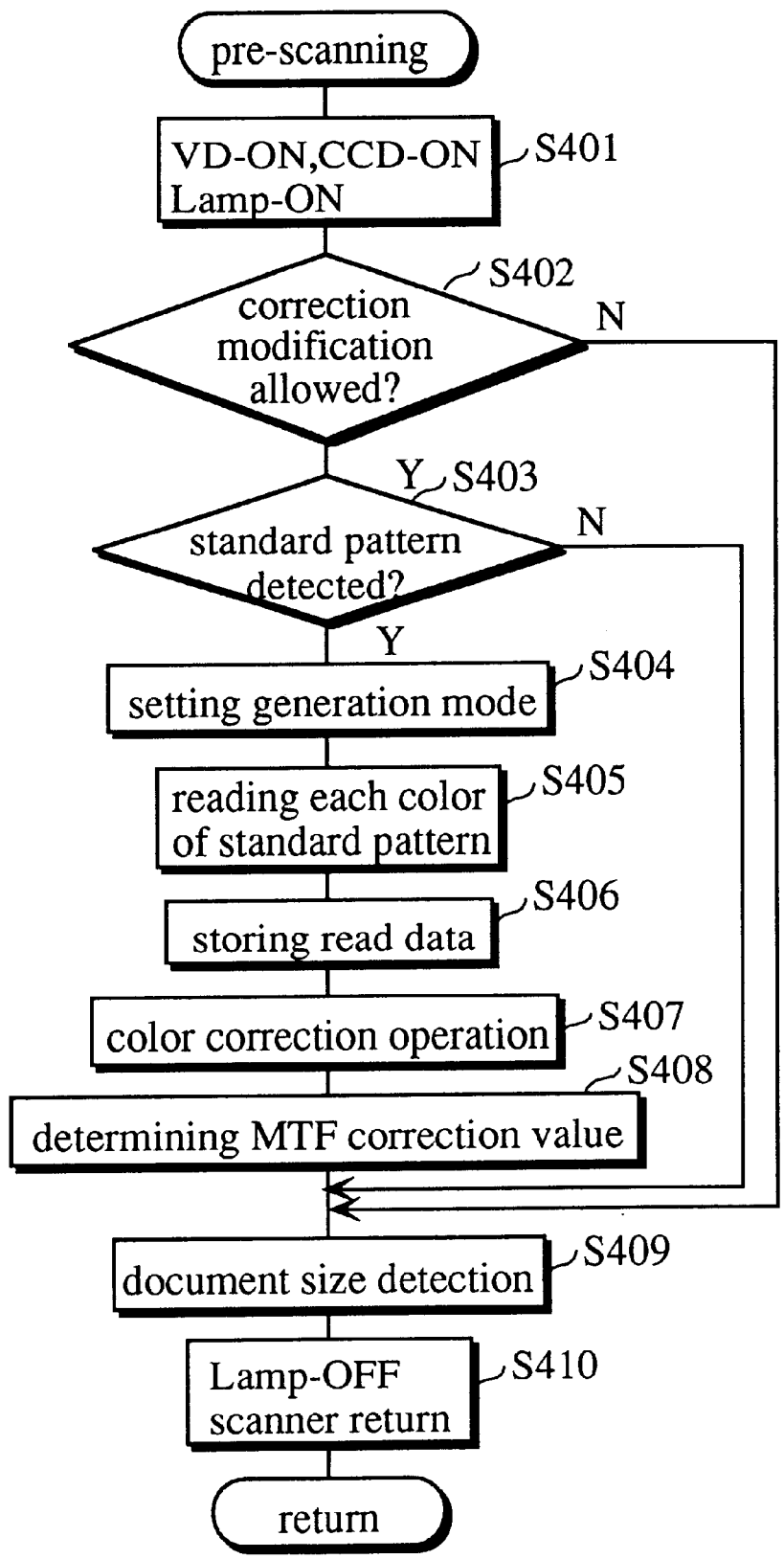
FIG. 10 shows a subroutine of the control flow shown in FIG. 9.
Figure 11:
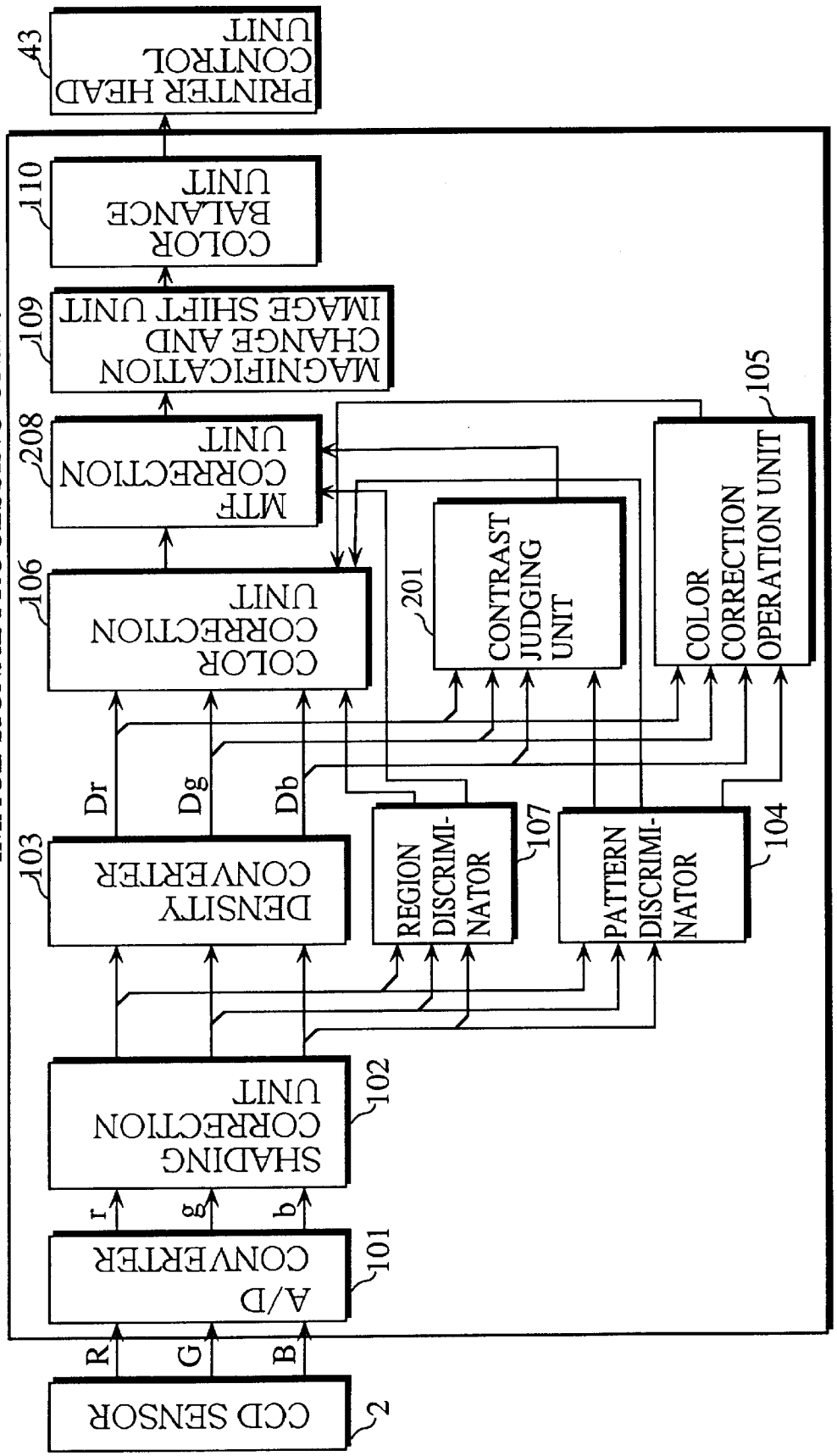
FIG. 11 is a block diagram of the image signal processing unit of the digital full-color copying machine.

The following explanation is for the operation of the digital full-color copying machine of the second embodiment, with reference to the control flow charts shown in FIGS. 9 and 10.

Prior to copying, the digital full-color copying machine receives each key input through the operation panel 60 shown in FIG. 7 (step S301). Here, an instruction as to whether a modification to correction conditions is allowed or not is issued through the generation button 66. When making a copy from a copied image, in response to an instruction to allow a modification to correction conditions, the copying machine performs a copying operation in accordance with the MTF correction value determined by the contrast judging unit 201 as well as the color correction conditions determined by the color correction operation unit 105. In response to an instruction to prohibit a modification to correction conditions, the copying machine performs copying in accordance with the standard color correction conditions and the standard MTF correction value even when making a copy from a copied image. An instruction as to whether the standard pattern shown in FIG. 12(a) or 12(b) is formed or not is issued through the standard pattern button 67.

After all key input has been received, an instruction to start copying is issued (step S302), and pre-scanning is started (step S303). The pre-scanning is performed to detect the size of a document and the existence of the standard pattern prior to main scanning, as shown in the control flow chart of FIG. 10.

More specifically, the lamp of the scanner 1, the CCD sensor 3, and the VD signal are turned on (step S401). Whether an instruction to allow a modification to correction conditions has been issued in step S301 is judged (step S402), and if it has, whether the standard pattern exists outside the image forming area of the copying paper is judged (step S403). For instance, whether a solid standard pattern of C, M, Y, BK, R, G, and B, including a lattice pattern, exists outside the image forming area of the copying paper is judged. If the standard pattern has been detected, the generation mode flag is set in the control unit 41 (step S404). The CCD sensor 3 reads the standard pattern comprising lattice and square patches (step S405). The read data are stored into the color correction operation unit 105 (step S406). The color correction operation unit 105 then performs a color correction operation (step S407). The contrast judging unit 201 judges a contrast between colors, and instructs to determine an MTF correction value based on the read density data (step S408). The scanner 1 then detects the size of the document (step S409). The lamp of the scanner 1 is turned off, and the scanner is returned to the home position (step S410), where the pre-scanning comes to an end.

As shown in FIG. 9, in accordance with the sensor input of the environmental sensor in the printer and the process control operations (detection of the electric potential of the photosensitive member and detection of the amount of stuck toners by AIDC pattern), image forming conditions (VO, VB, LD GAIN, γ-TABLE, and so on) are set (step S304). Whether an instruction to allow a modification to correction conditions has been issued in step S301 is judged (step S305), and if it has, the color correction unit 106 is loaded with the color correction conditions determined in steps S407 and S408 in FIG. 10, and the MTF correction unit 108 is loaded with an MTF correction value (step S306). In accordance with the color correction conditions, the copying operation, including the main scanning, is performed for each color (C, M, Y, and BK) (steps S310 and S311).

If an instruction to prohibit a modification to correction conditions has been issued, the standard color correction conditions and MTF correction value are employed (step S307), and the printer head control unit 43 performs a copying operation for each color (steps S310 and S311). In the case where an instruction to form the standard pattern has been issued in step S301 (step S308), an instruction is issued so that the printer head control unit 43 forms the standard pattern (step S309). More specifically, an instruction is issued so that the pattern discriminator 104 and the color correction operation unit 105 transmits the standard data of the standard pattern to the printer head control unit 43. In accordance with the standard data of the standard pattern transmitted from the image signal processing unit 42 through the color correction operation unit 105, the color correction unit 106, the MTF correction unit 108, the magnification change and image shift unit 109, and the color balance unit 110, the printer head control unit 43 forms the standard pattern outside the image forming area 601 as shown in FIG. 12. Generally, the printing of the standard pattern is performed only when making a first generation copy. When making second and later generation copies, the standard pattern is not formed every time a new generation copy is made, but the standard pattern in the first generation copy is copied as a part of the image. By copying the standard pattern repeatedly, deterioration in color reproducibility can be detected by reading the copied standard pattern. Using the read data of the standard pattern, a suitable color correction can be performed. After repeating the above operation for each of a predetermined number of copying papers, the copying operation is finished (step S312). At the same time, the generation mode flag is cleared.

As described above, according to the second embodiment, the standard pattern formed outside the image forming area of a copying paper is read, and the read data of the standard pattern are compared with the standard data of the standard pattern to determine the optimum color correction conditions and the optimum MTF correction value. As copies are made in accordance with the color correction conditions and the MTF correction value, excellent color reproducibility can be achieved even in an image copied from a copied image. When making a second or third generation copy from a first generation copy in which the standard pattern has been formed, the standard pattern formed in the first generation copy is repeatedly copied so that deterioration in color reproducibility can be easily detected in comparison with the original color reproducibility. Thus, the optimum color correction and MTF correction can be performed without causing deterioration in color reproducibility and edge sharpness, even when making a copy from a copied image.

[Third Embodiment]

Figure 24:
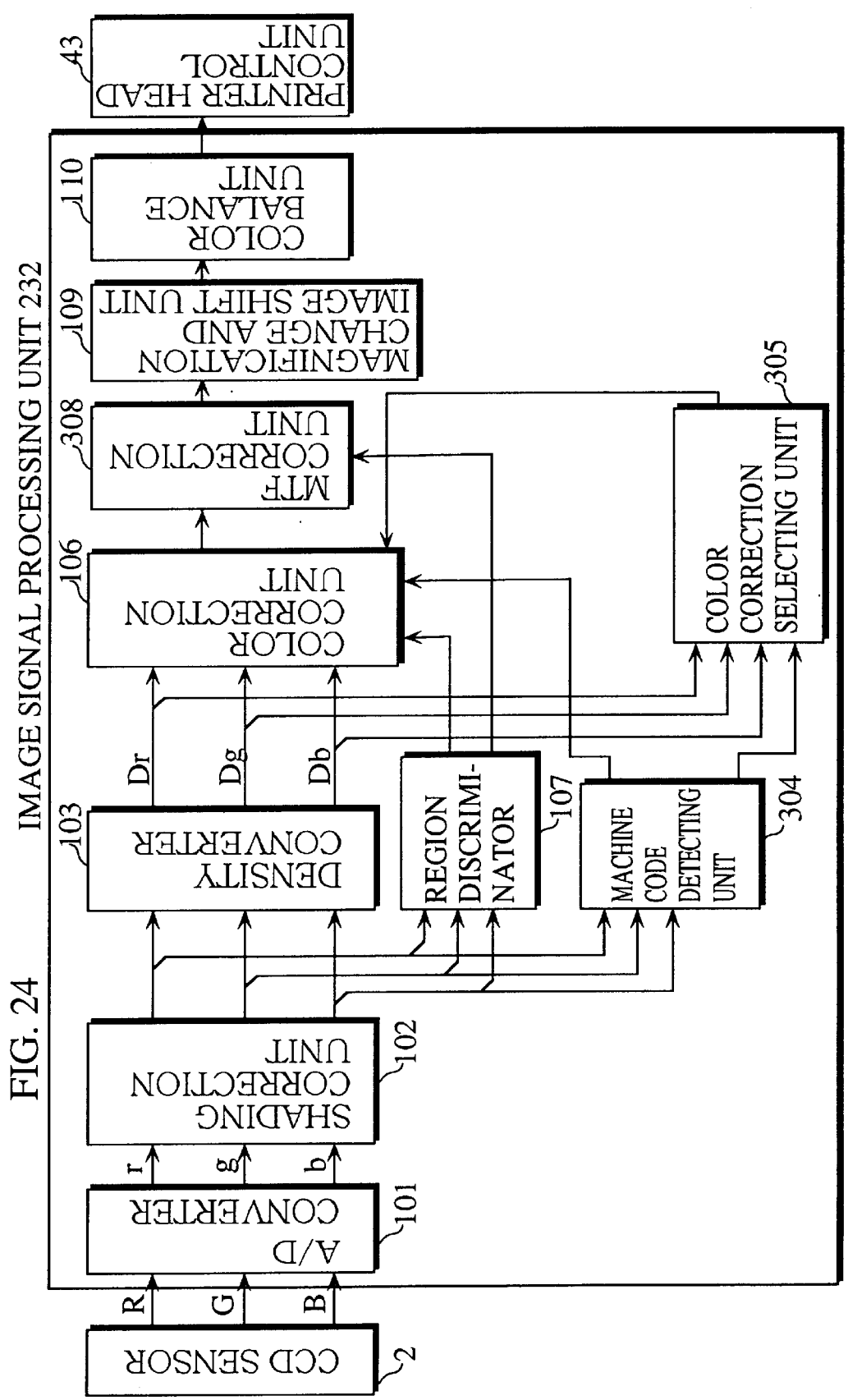
FIG. 24 is a block diagram of the image signal processing unit 232.

The following is an explanation of a digital full-color copying machine of the third embodiment of the present invention. The structure and the control system of the digital full-color copying machine of this embodiment are the same as those of the first embodiment shown in FIGS. 1 and 4, and therefore, explanations of them are not provided below. The control unit 41 performs a control operation shown in the control flow charts of FIGS. 9 and 10. This control operation will be described later. An image signal processing unit 232 shown in FIG. 24 is provided in place of the image signal processing unit 42. So, the following description focuses on the image signal processing unit 232.

FIG. 24 is a block diagram of the image signal processing unit 232, which has the same structure as the image signal processing unit of the first embodiment except that it comprises a machine code detecting unit 304, a color correction selecting unit 305, and an MTF correction unit 308, in place of the pattern discriminator 104, the color correction operation unit 105, and the MTF correction unit 108. Accordingly, the description below mainly concerns the machine code detecting unit 304, the color correction selecting unit 105, and the MTF correction unit 308.

(3-1) Machine Code Detecting Unit

Figure 25:
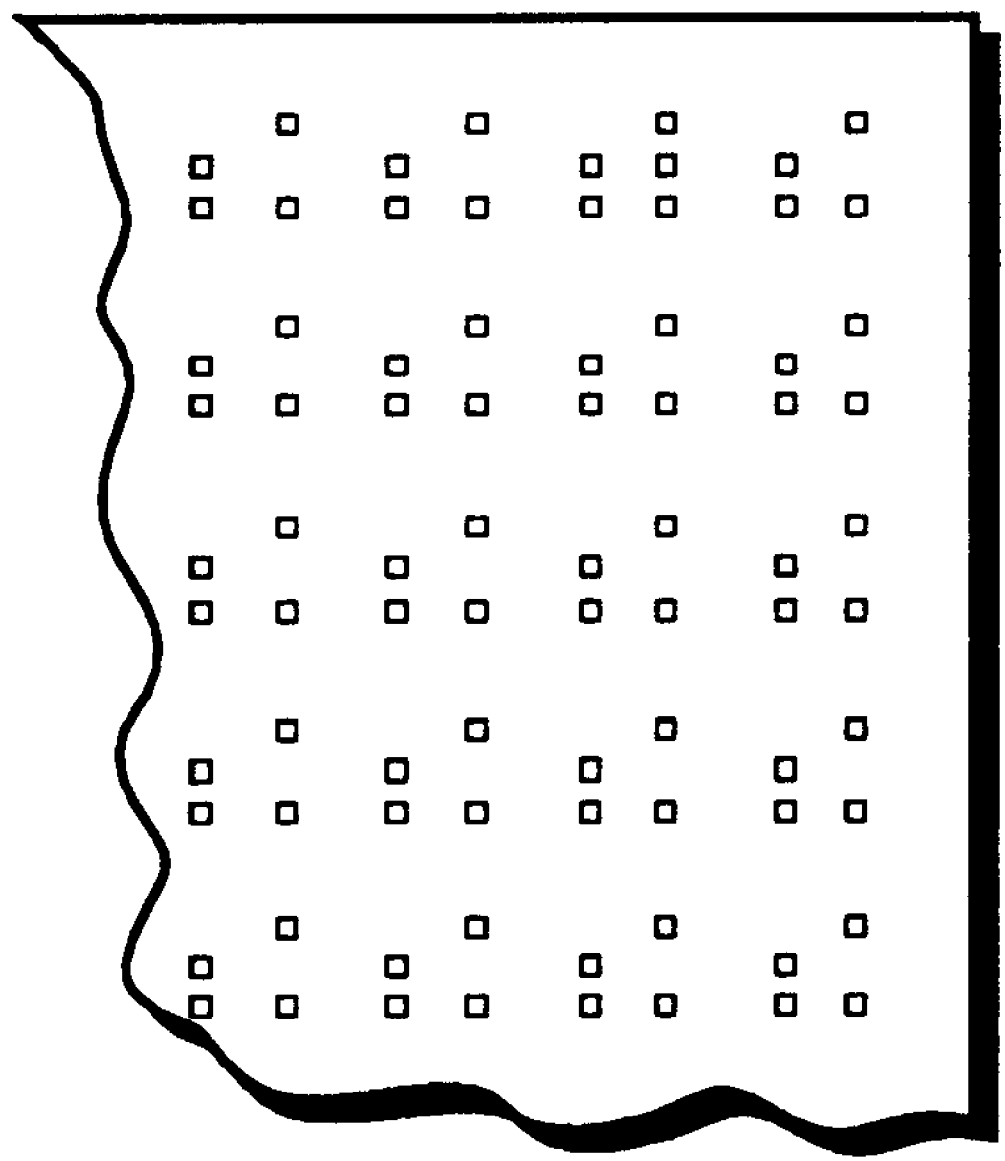
FIG. 25 shows the standard pattern of the third embodiment.

Based on the read data of the standard pattern, the machine code detecting unit 304 detects a machine code represented by the standard pattern. The standard pattern, as shown in FIG. 25, comprises only one color (Y) and represents code data containing a machine code and image forming conditions (the user setting, image processing conditions, process setting conditions, environmental conditions, and so on) in a part of the image forming area or in the entire image forming area. Specifically, the machine code detecting unit 304 extracts code data in accordance with the read data of the standard pattern. By comparing the extracted code data with a machine code table contained inside, it is judged whether the extracted code data contains a machine code or not.

(3-2) Color Correction Selecting Unit

The color correction selecting unit 305 selects color correction conditions using the machine code detected by the machine code detecting unit 304 and a look-up table of machine codes and color correction conditions, and sends the selected color correction conditions to the color correction operation unit 105. The look-up table is contained in the color correction selecting unit 305, and stores a plurality of combinations of a machine code and color correction conditions. The optimum color correction conditions for the characteristics of the machine represented by the machine code are selected.

The MTF correction unit 308 performs MTF correction using the machine code detected by the machine code detecting unit 304 and a look-up table of machine codes and MTF correction values. The look-up table is contained in the MTF correction unit 308, and stores a plurality of combinations of a machine code and an MTF correction value. Each MTF correction value is the optimum value for the machine characteristics represented by each corresponding machine code.

(3-3) The Operation of the Color Copying Machine

Figure 22:
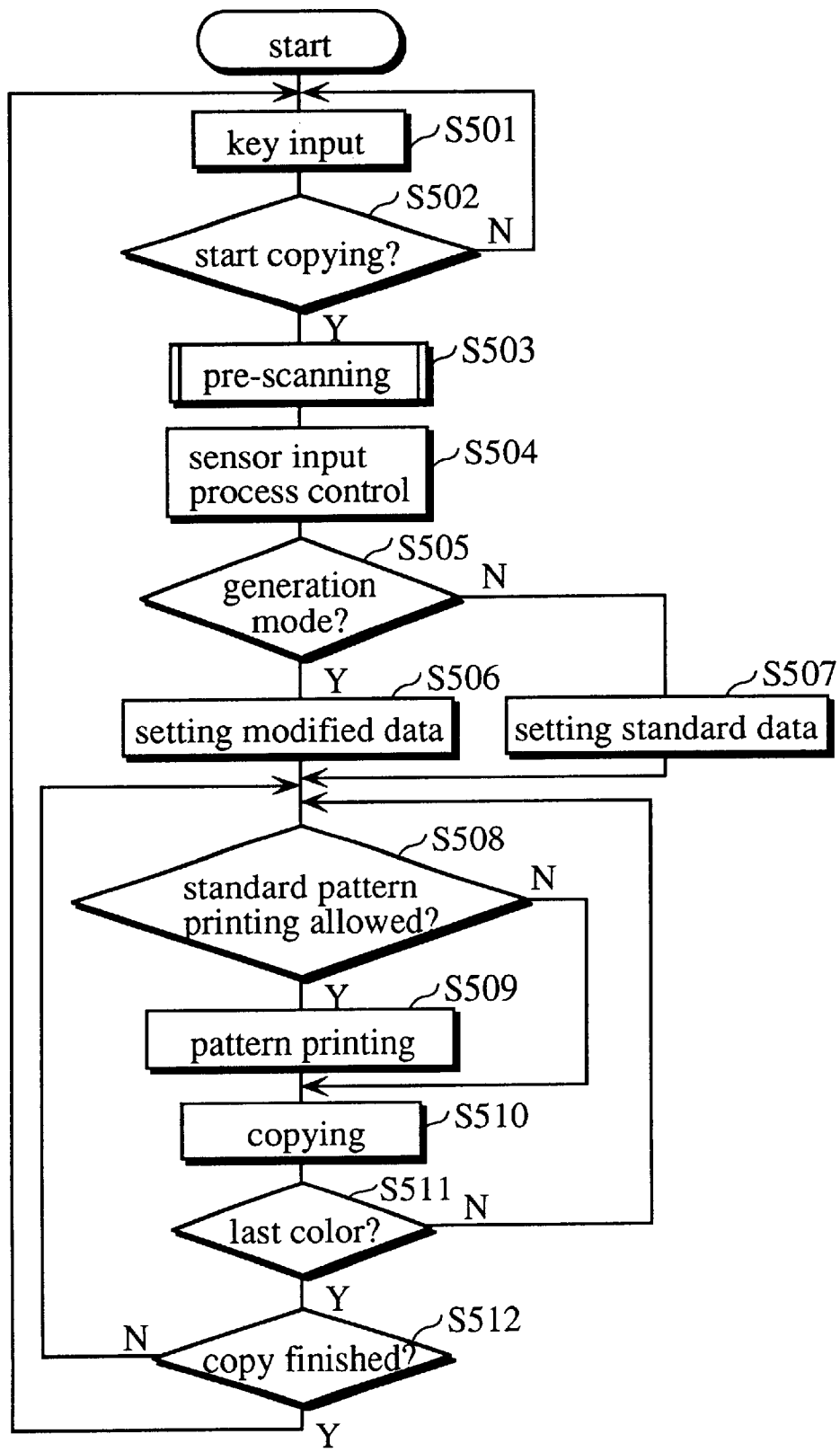
FIG. 22 is a flow chart of the control unit of a digital full-color copying machine of the third embodiment.
Figure 23:
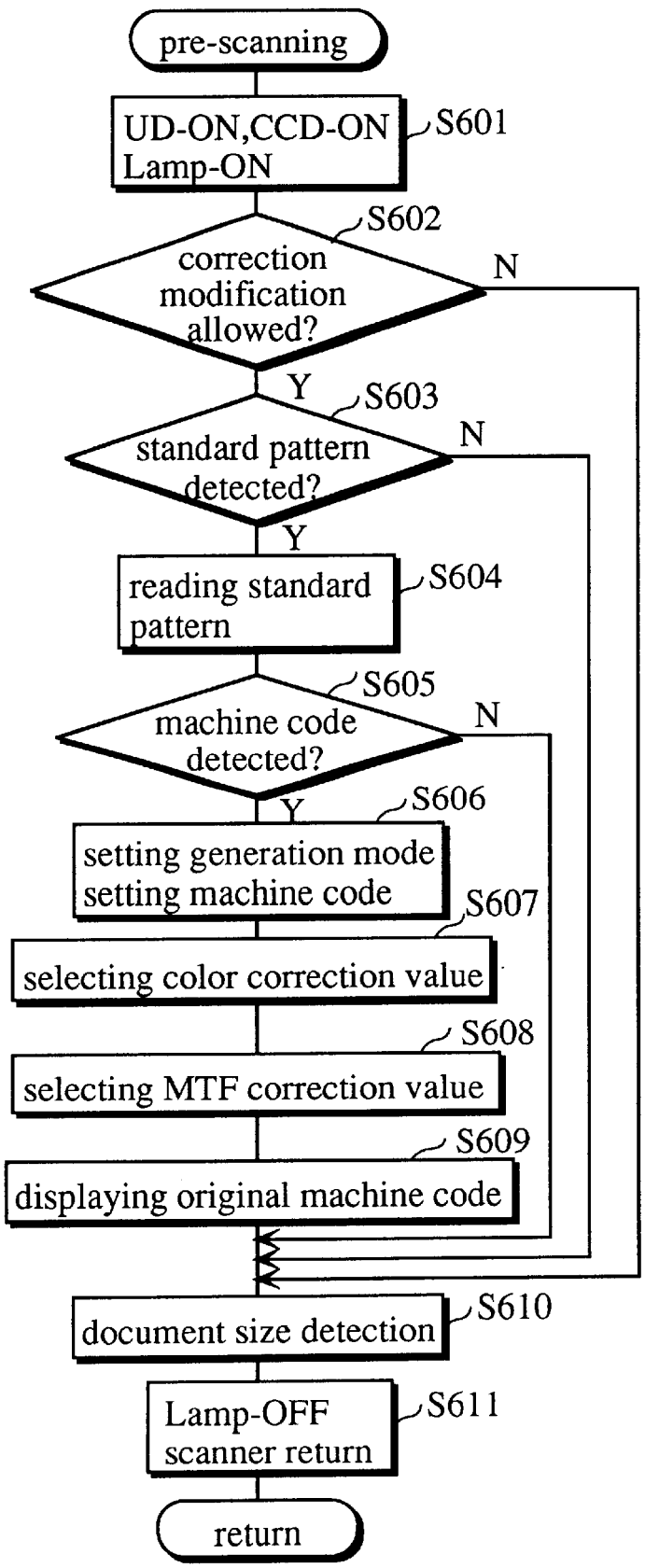
FIG. 23 shows a subroutine of the control flow shown in FIG. 22.

The following explanation is for the operation of the digital full-color copying machine of the third embodiment, with reference to the control flow charts shown in FIGS. 22 and 23.

Prior to copying, the digital full-color copying machine receives each key input through the operation panel 60 shown in FIG. 7 (step S501). Here, an instruction as to whether a modification to correction conditions is allowed or not is issued through the generation button 66. In response to an instruction to allow a modification to correction conditions, the color correction selecting unit 305 selects suitable color correction conditions, and the MTF correction unit 308 selects a suitable MTF correction value. When making a copy from a copied image, the copying operation is performed in accordance with the selected color correction conditions and MTF correction value. In response to an instruction to prohibit a modification to correction conditions, the copying machine performs the copying operation in accordance with the standard color correction conditions and the standard MTF correction value even when making a copy from a copied image. An instruction as to whether the standard pattern shown in FIG. 25 is formed or not is issued through the standard pattern button 67. The display 62 displays the number of copies being made as well as the machine code.

After all key input has been received, an instruction to start copying is issued by pressing the copy start key 68 shown in FIG. 7 (step S502), and pre-scanning is started (step S503). The pre-scanning is performed to detect the size of a document and the existence of the standard pattern prior to main scanning, as shown in the control flow chart of FIG. 23.

More specifically, the lamp of the scanner 1, the CCD sensor 3, and the VD signal are turned on, as shown in the control flow chart of FIG. 23 (step S601). Whether an instruction to allow a modification to correction conditions has been issued in step S501 is judged (step S602), and if it has, whether the standard pattern representing a machine code exists in the image forming area is judged (step S603). For instance, whether a single-color standard pattern of Y representing a machine code as shown in FIG. 25 exists or not is judged. If the standard pattern has been detected, the CCD sensor 3 reads the standard pattern (step S604). The read data are sent to the machine code detecting unit 304 via the A/D converter 101, the shading correction unit 102, and the density converter 103. Based on the read data, the machine code detecting unit 304 detects the machine code represented by the standard pattern. After the machine code has been detected (step S605), the control unit 41 sends the machine code to the color correction selecting unit 305 and sets the generation mode flag (step S606).

The control unit 41 orders the color correction selecting unit 305 to select color correction conditions (step S607). Specifically, the color correction selecting unit 305 selects color correction conditions using the detected machine code and an internal table showing machine codes and color correction conditions. The MTF correction unit 308 then selects an MTF correction value (step S608). Specifically, the MTF correction unit 308 selects an MTF correction value using the detected machine code and the internal table showing machine codes and color correction conditions. Next, the detected machine code is displayed on the display 62, and the size of the document is detected by the scanner 1 (steps S609 and S610). The lamp of the scanner 1 is turned off, and the scanner is returned to the home position (step S611), where the pre-scanning comes to an end.

As shown in the control flow chart of FIG. 22, in accordance with the sensor input of the environmental sensor in the printer and the process control operations (detection of the electric potential of the photosensitive member and detection of the amount of stuck toners by AIDC pattern), image forming conditions (VO, VB, LD GAIN, γ-TABLE, and so on) are specified (step S504). Whether the generation mode flag is currently on is judged (step S505), and if it is, the color correction unit 106 is loaded with the color correction conditions selected in step S607 in FIG. 23, and the MTF correction unit 308 is loaded with the MTF correction value selected in step S608 (step S506). In accordance with the selected color correction conditions and the selected MTF correction value, the copying operation, including the main scanning, is performed for each color (C, M, Y, and BK) (steps S510 and S511).

If the generation mode flag is not currently on, the control unit 41 loads the standard color correction conditions from the color correction selecting unit 305 into the color correction unit 106, and sets the standard MTF correction value in the MTF correction unit 308 (step S507). In accordance with the standard color correction conditions, a copying operation is performed for each color (steps S510 and S511). In the case where an instruction to form the standard pattern has been issued in step S501 (step S508), the control unit 41 instructs the printer head control unit 43 to form the standard pattern (step S509). More specifically, the control unit 41 instructs the printer head control unit 43 to form the standard pattern representing the machine code detected by the machine code detecting unit 304. As described above, a color correction suitable for the machine characteristics, because a generation copy used as a document contains the standard pattern representing the machine code. After repeating the above operation for each of a predetermined number of copying papers, the copying operation is finished (step S512). At the same time, the generation mode flag is cleared.

As described above, according to the third embodiment, a machine code is detected by reading the standard pattern, and color correction and MTF correction are performed according to the characteristics of the machine indicated by the machine code, so that excellent color reproducibility can be achieved even when making a copy from a copied image. This embodiment has the advantage that it is hard to recognize the standard pattern formed in the copies image because the standard pattern comprises a color difficult to distinguish, such as yellow.

The color correction operation unit 105 determines color correction conditions in a linear masking method, but color correction conditions may be determined in other methods as follows. The color correction operation unit 105 selects a color correction coefficient stored in a look-up table (LUT) shown in FIG. 8, in accordance with the read data of the standard pattern and the look-up table stored in the color correction operation unit 105. More specifically, this operation is performed as follows. The amount of density variation of each color is calculated from the read data of the standard pattern by comparing the density of each color of C, M, and Y with the standard data of the standard pattern stored in the color correction operation unit 105. The amount of density variation of each color may be estimated from each individual pattern of C, M, and Y, but an estimate from a pattern of more than seven colors is more preferable because the error is the smallest by this estimate. According to the calculated amount of density variation, a color correction coefficient stored in the look-up table shown in FIG. 8 is selected. A column 801 shows the amount of density variation of C, a column 802 shows the amount of density variation of M, and a column 803 shows the amount of density variation of Y. Here, the density variation of each color of C, M, and Y are divided into four stages ( x1, x2, x3, x3 ). A column 804 shows color correction coefficients denoted by B. A color correction coefficient can be invariably determined by the combination of density variations of C, M, and Y. According to the amount of density variations of C, M, and Y determined above, a corresponding color correction coefficient (B) is selected.

The detection of the standard pattern (step S203) is not necessarily performed during the pre-scanning. Instead, the standard pattern may be detected when the copying starts (step S110). In doing so, there is a disadvantage that a document has to be set in a predetermined position (i.e., the read starting position), but there is also an advantage that the first copy can be made in a shorter period of time.

The contrast judging unit 201 detects the contrast between a light portion and a dark portion, but it may be able to detect other values, such as a black-and-white line width ratio, line widths, MTF characteristics, and edge profile (i.e., edge gradient).

The contrast judging unit 201 determines an MTF correction value by calculating density data values Da and Db as shown in FIG. 14, but an MTF correction value may be determined by any of the following three methods.

Figures 17, 18, 19:
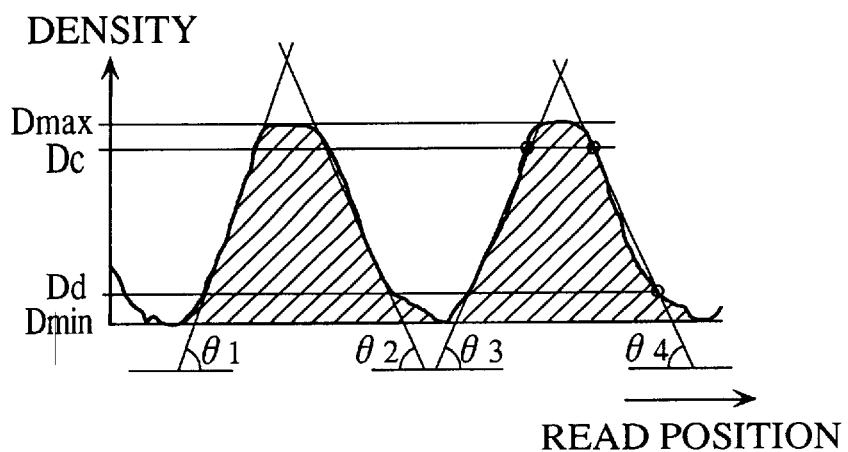
FIG. 17 is a table showing the values A and the MTF correction values.
FIG. 18 is a graph showing the data values of the density data and the read position.
FIG. 19 is a table showing the values tan θ ave/tan θ6 and the MTF correction values.

According to the first method, a graph showing the relationship between the read position and the density data values is formed as shown in FIG. 16. The mean density value Dm is then calculated from the maximum density data value Dmax and the minimum density data value. A value A is calculated by using this formula: (Dmax−Dm)/Dm. In accordance with the value A and a table of the values A and MTF correction values shown in FIG. 17, an MTF correction value corresponding to a determined MTF correction value is selected. The table of FIG. 17 is contained in the contrast judging unit 201. In this table, a value A is allotted to a corresponding MTF correction value.

According to the second method, a graph showing the relationship between the read position and the density data values is formed as shown in FIG. 18. Data values Dc and Dd are then determined by using the following formulae: Dc=a* (Dmax−Dmin)+Dmin; and Dd=b*(Dmax−Dmin)+Dmin. From the determined data values Dc and Dd, and the read position corresponding to the data values Dc and Dd, tan θ1 to tan θn are determined, and tan θave is calculated by averaging tan 61 to tan θn. Further, tan θave/tan θ0 is determined by dividing tan θave by tan θ0. By using a table of tan θave/tan θ0 and MTF correction values, an MTF correction value corresponding to the determined value tan θave/tan θ0 is selected. The table of FIG. 19 is contained in the contrast judging unit 201. In this table, a value tan θave/tan θ0 is allotted to a corresponding MTF correction value.

According to the third method, an MTF correction value is determined not from the lattice portion of the standard pattern but from the solid portion of the standard pattern. Specifically, an MTF correction value is calculated by detecting a density variation of the solid portion of the standard pattern. FIG. 20 shows a graph showing the relationship between the read position and density data values of the solid portion of the standard pattern. In such case, a small density variation is detected within a measuring range. In the following, the third method is described more in detail.

An average density value Dave is calculated from the density data of each pixel of the standard pattern. As shown in the equation below, the absolute average σ is determined by calculating the difference between the density value D(x) of each pixel and the average density value Dave.

$$\sigma = 1/n \sum |(D(x) - Dave|$$

In accordance with the absolute average σ determined above and a table showing absolute averages σ and MTF correction values shown in FIG. 21, an MTF correction value corresponding to the determined absolute average σ is selected. The table shown in FIG. 21 is contained in the contrast judging unit 201, and in this table, an absolute average σ is allotted to an corresponding MTF correction value.

There is yet another method in which the pixel density, the average density, and the generation cycles of them are detected, and the power spectrum is determined for each frequency.

If a color which is not included in the predetermined color range is detected during the pre-scanning, the standard color correction values and the standard MTF correction values may be used for correction regardless of whether the standard pattern has been detected or not.

[Fourth Embodiment]

Figure 28:
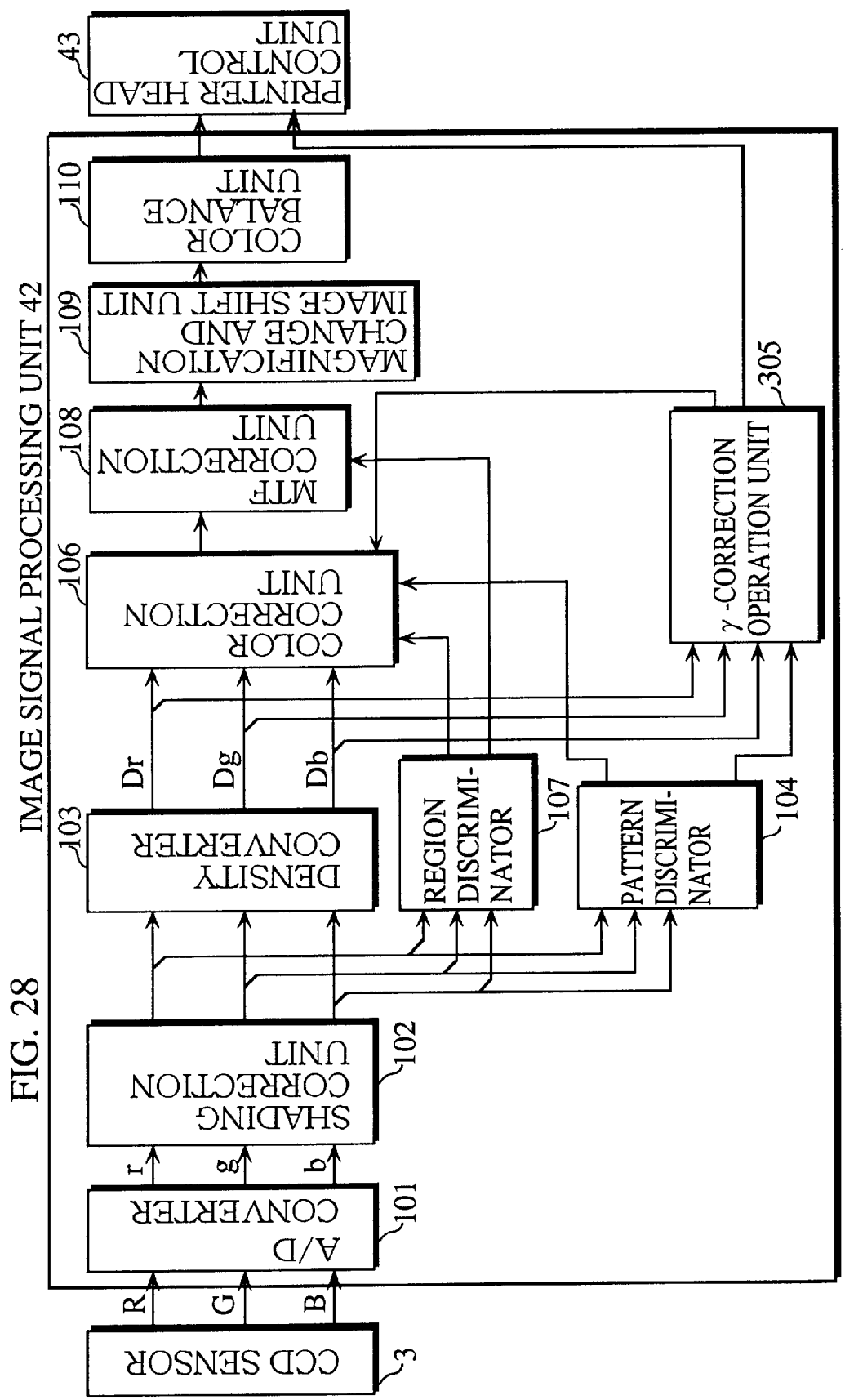
FIG. 28 is a block diagram of the image signal processing unit of the digital full-color copying machine.
Figure 29:
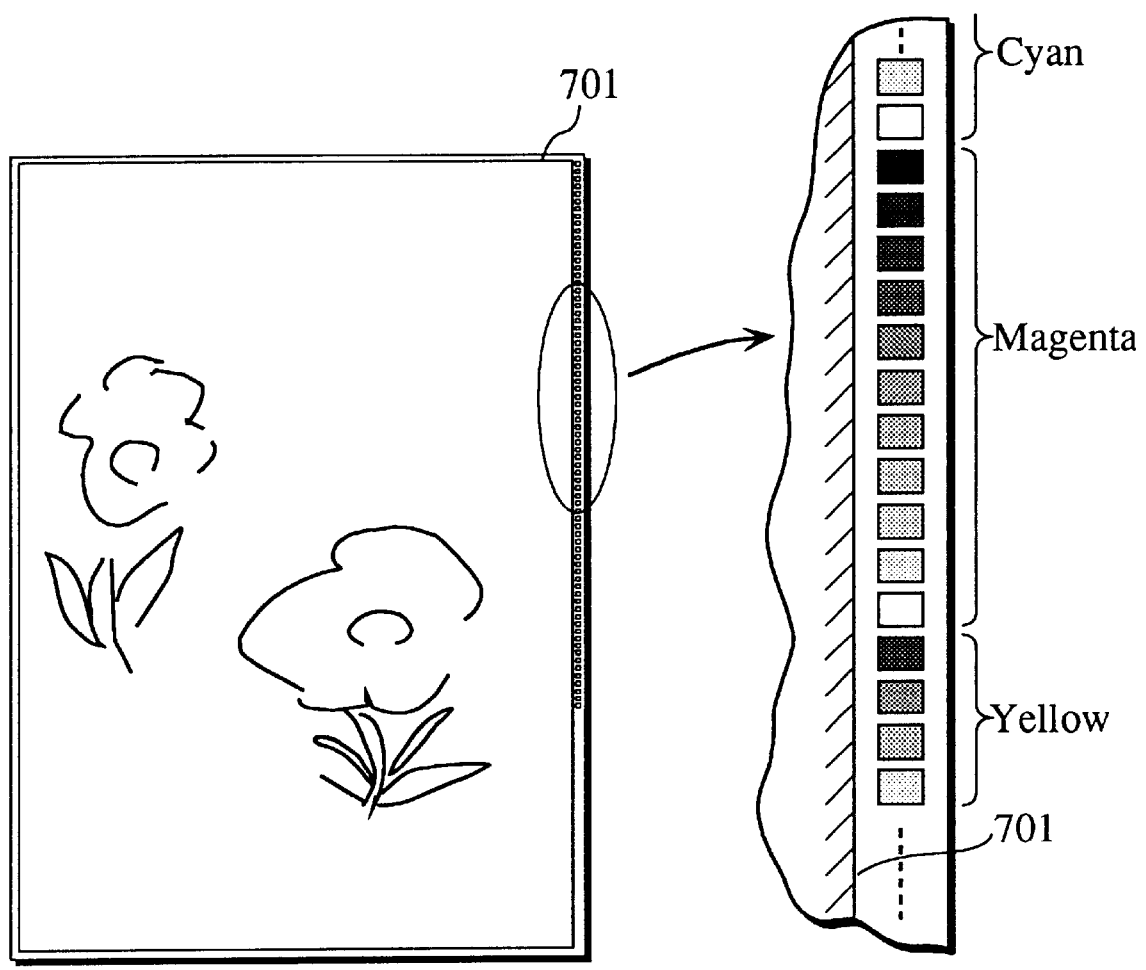
FIG. 29 shows the standard pattern used in the digital full-color copying machine.

The following is an explanation of a digital full-color copying machine of the fourth embodiment of the present invention. This embodiment is substantially the same as the first embodiment, except that a gamma correction operation unit 305 is provided in place of the color correction operation unit 105 as shown in FIG. 28, the standard pattern shown in FIG. 29 is employed, the structure of the printer head control unit is specified more in detail, and the control system is shown in the flow charts of FIGS. 26 and 27. So, the following description mainly concerns the newly added or modified components.

Each color of C, Y, M, and Y in the standard pattern of this embodiment is divided into eleven stages, as shown in FIG. 29. The standard pattern is formed outside an image forming area 701 in a copying paper, with the individual pattern of each color of each stage having a size of roughly 2×3 mm. The pattern discriminator 104 detects the standard pattern and discriminates the colors and gradations of the standard pattern by comparing position information of the standard pattern contained inside with position information contained in 8-bit data transmitted from the shading correction unit 102.

Figure 30:
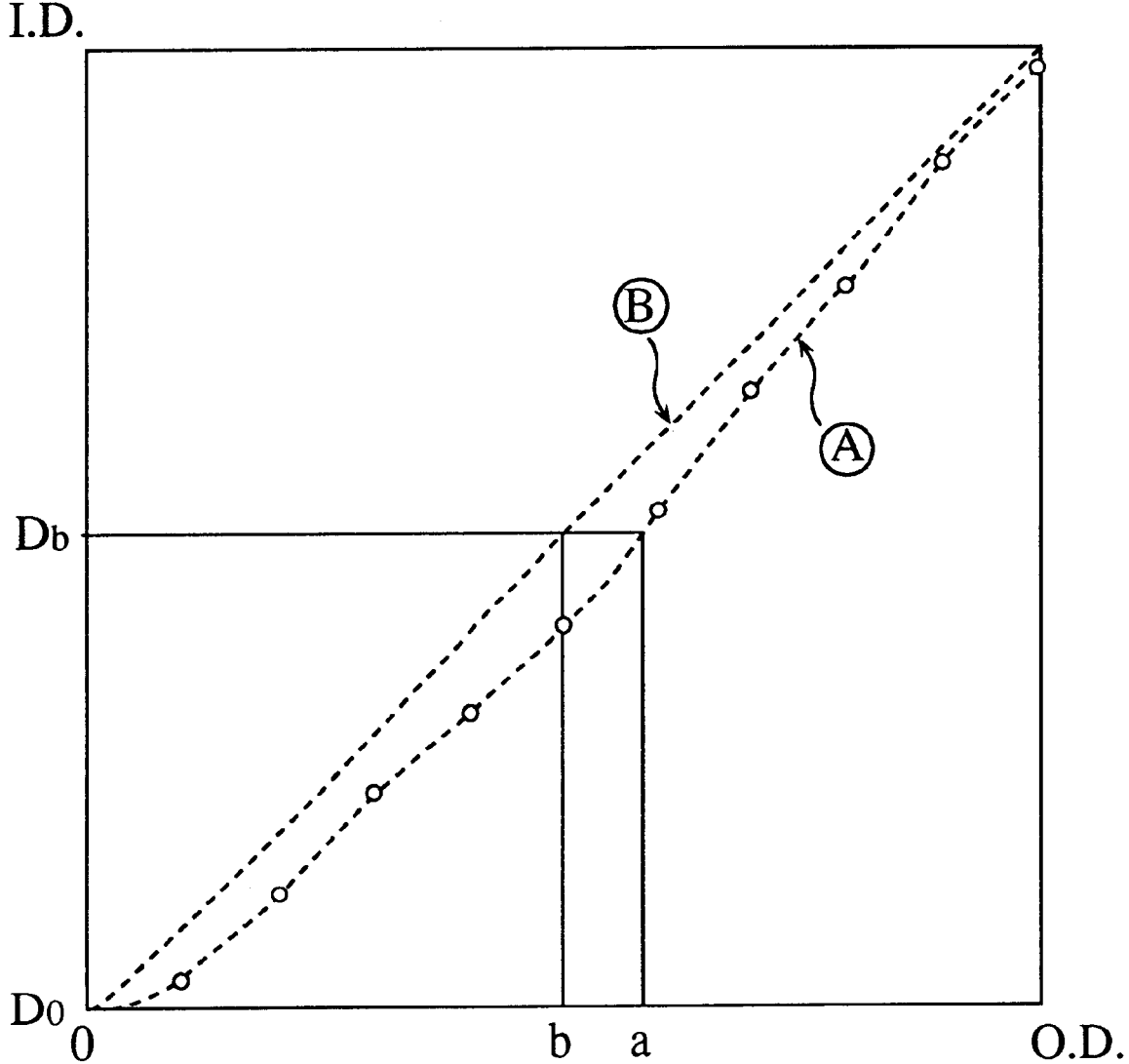
FIG. 30 is a graph showing the target reproduction characteristic curve and the gradient characteristics.

The gamma correction operation unit 305 determines gamma correction conditions (gradation correction conditions) in accordance with the discrimination result of the pattern discriminator 104, the data to be the standards for the standard pattern, and the data of a target reproduction characteristic curve to be the standards for correction. The gamma correction conditions determined above are sent to the printer head control unit 43. The data to be the standards for the standard pattern and the data of the target reproduction characteristic curve are stored in the gamma correction operation unit 305 beforehand. Here, the data to be the standards for the standard pattern are the data to be standards for printing the standard pattern shown in FIG. 29. The target reproduction characteristic curve is a line denoted by B in a graph showing the gradation characteristics in FIG. 30. In the graph of FIG. 30, the abscissa axis represents the original ,density, and the ordinate axis represents the read image density. The target reproduction characteristic curve shows that the relationship between the original density and the read image density is linear.

The gamma correction operation unit 305 determines gamma correction conditions as follows.

Firstly, a reproduction characteristic curve B shown in FIG. 30 is determined based on the read image density of the standard pattern and the standard data of the standard pattern. More specifically, an 11-stage individual standard pattern of one of the colors in the standard pattern is plotted on the graph. In this plot, the ordinate axis component is the density value of the read image density, while the abscissa axis component is the density value of the data to be standard for the standard pattern stored in the gamma correction operation unit 305. The data to be the standards for forming the standard pattern are the data of the standard pattern to be the standards for the read standard pattern, in accordance with the discrimination result of the pattern discriminator 104. After completing all the plotting, the reproduction characteristic curve A is determined by interpolating between the plotted dots.

By comparing the dots on the reproduction characteristic curve A with the dots on the target reproduction characteristic curve B. From the comparison result, correction data, which are gamma correcting conditions for the input data (read data), are determined. As shown in FIG. 30, for instance, the original density corresponding to the image density Db is represented by b on the target reproduction characteristic curve B. On the other hand, the original density corresponding to the image density Db is represented by a on the actual reproduction characteristic curve A. Accordingly, the target image density Db can be obtained by adding a correction value (a−b) to the original density b. This operation is repeated, starting from the lowest density area, to determine gamma correction conditions for all the original density levels (0 to 255). This procedure is performed for each color of C, M, Y, and BK. The determined gamma correction conditions are sent to the printer head control unit 43.

The gamma correction operation unit 305 also sends the standard data of the standard pattern to the printer head control unit 43 when the standard pattern shown in FIG. 29 should be formed upon image formation.

Figure 31:
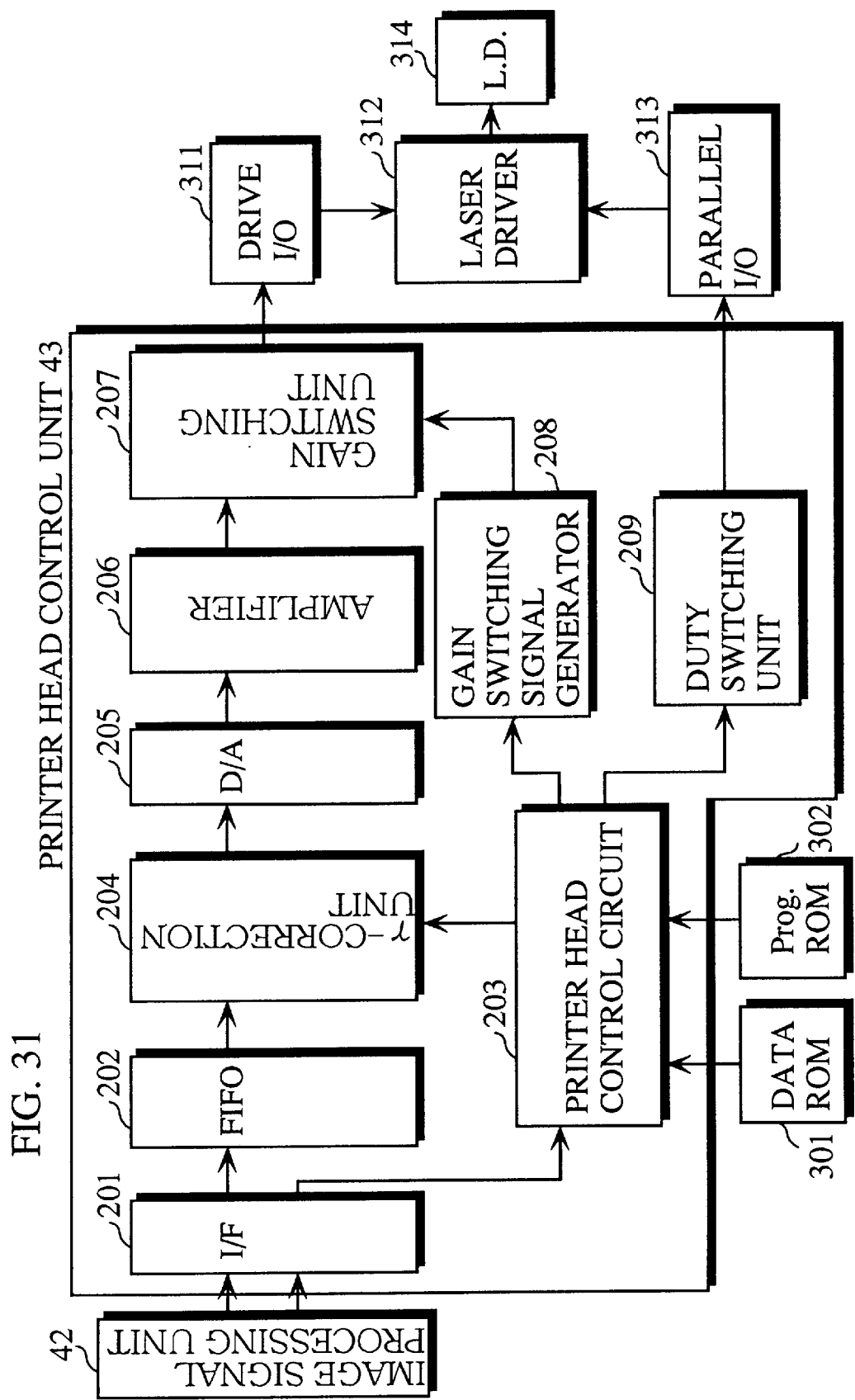
FIG. 31 is a block diagram of the print head control unit of the digital full-color copying machine.

FIG. 31 is a block diagram of the printer head control unit 43. The printing data inputted through the image signal processing unit 42 are sent to an FIFO memory 202 via an interface 201. The FIFO memory 202 eliminates the frequency difference between the image reader unit 10 and the printer unit 20. The gamma correction conditions transmitted from the image signal processing unit 42 are sent to a printer head control circuit 203 via the interface 201. The printer head control circuit 203 sends either the transmitted gamma correction conditions or the gamma correction conditions stored in a data ROM in advance to a gamma correction unit 204. The gamma correction unit 204 performs gamma correction on the printing data in accordance with the gamma correction conditions transmitted from the printer head control circuit 203, and converts the printing data into 10-bit data. The 10-bit data are then converted into analog voltage by a D/A converter 205, amplified by an amplifier 206, and outputted to a gain switching unit 207. Meanwhile, the printer head control circuit 203 sends gain switching data set in accordance with the detection values of the sensors to a gain switching signal generator 208, which outputs a gain switching signal to the gain switching unit 207 based on the gain switching data. The gain switching unit 107 switches the gain in accordance with the gain switching signal, and it adjusts the data transmitted from the amplifier 206 in accordance with the switched gain. The adjusted data are outputted as exposure data to a laser driver 312 via a drive I/O 311. The printer head control circuit 203 also sends duty switching data including the ratio between the laser emission time and the non-emission time to a duty switching unit 209, which switches the clock pulse based on the duty switching data. The switched clock pulse is then sent to the laser drive 312 via a parallel I/O 313. The laser driver 312 drives a laser diode 314 with the switched clock pulse and the emission strength corresponding to the exposure data.

When an instruction to form the standard pattern shown in FIG. 29 is issued, the printer head control circuit 203 forms the standard pattern outside the image forming area, in accordance with the printing data of the standard pattern transmitted from the image signal forming unit 42.

Figure 26:
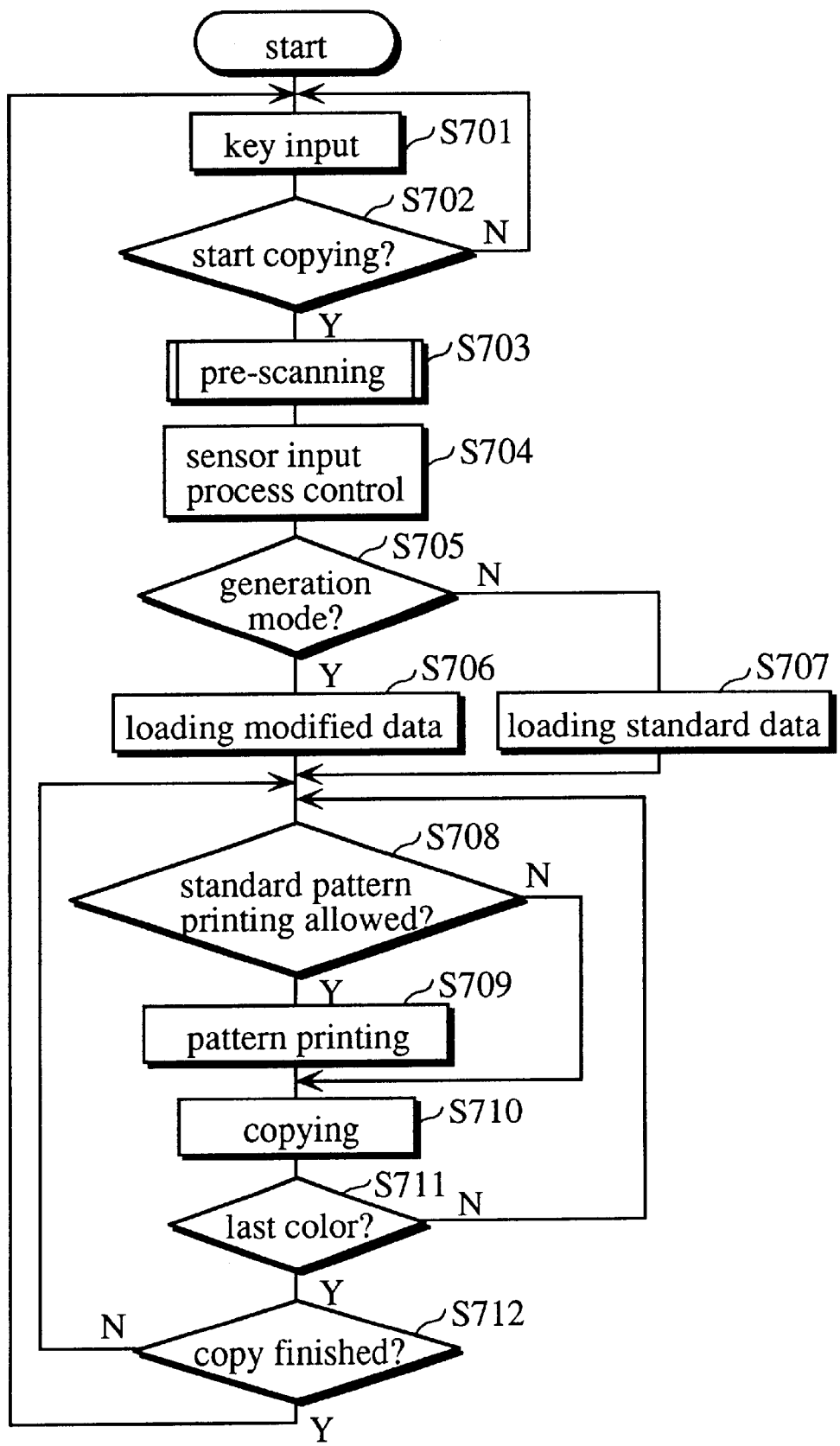
FIG. 26 is a flow chart of the control unit of a digital full-color copying machine of the fourth embodiment.
Figure 27:
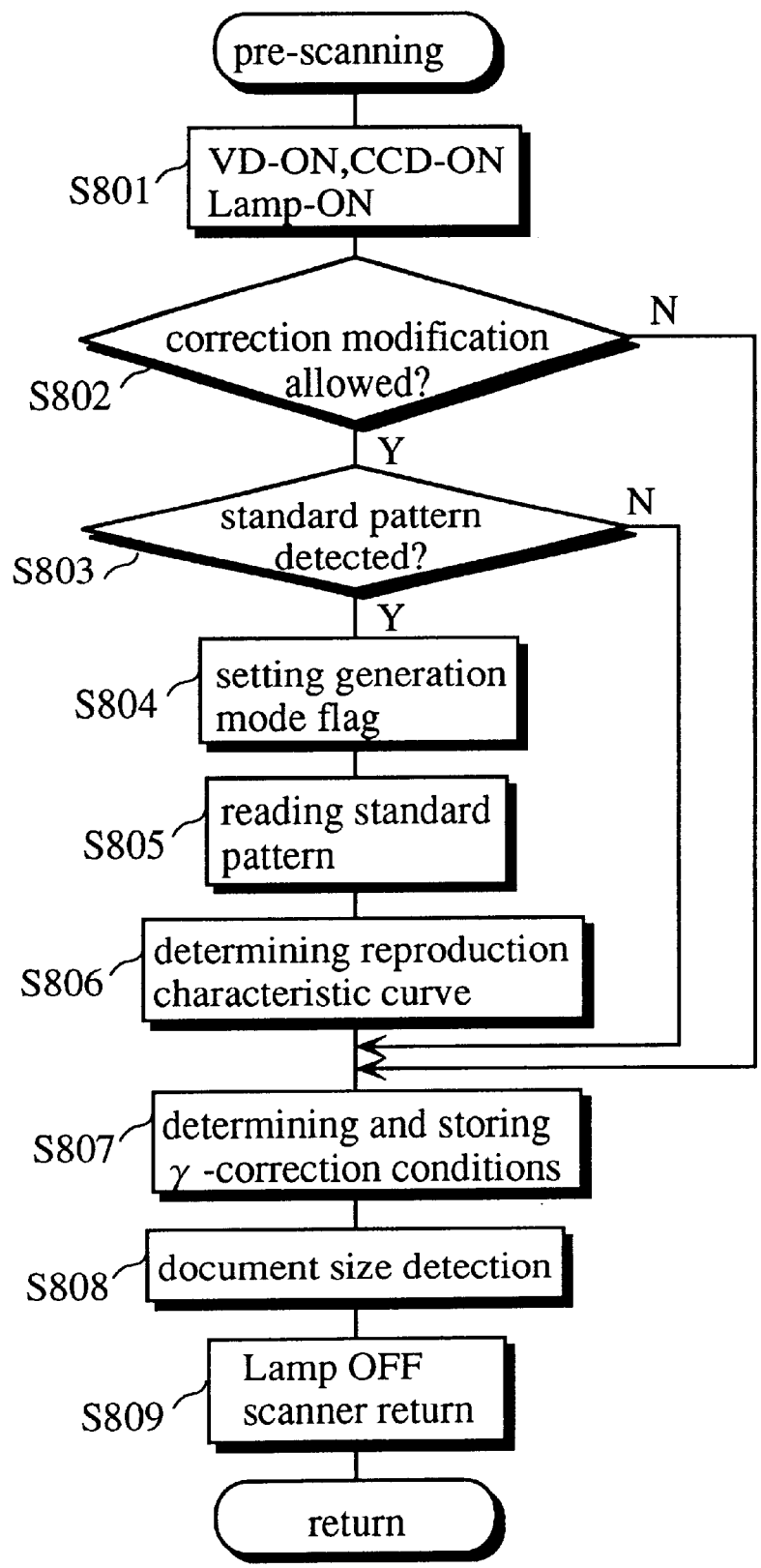
FIG. 27 shows a subroutine of the control flow shown in FIG. 26.

The following explanation is for the operation of the digital full-color copying machine of the fourth embodiment, with reference to the control flow charts shown in FIGS. 26 and 27.

Prior to copying, the digital full-color copying machine receives each key input (step S701). The key input is received through the buttons 63 to 66 on the operation panel 60 shown in FIG. 7 operated by a user.

After all key input has been received, an instruction to start copying is issued by pressing the copy start key 68 (step S702), and pre-scanning is started (step S703). The pre-scanning is performed to detect the size of a document and the existence of the standard pattern prior to main scanning, as shown in the control flow chart of FIG. 27.

More specifically, the lamp of the scanner 1, the CCD sensor 3, and the VD signal are turned on (step S801). The VD signal is a signal to indicate that the CCD sensor 3 has started outputting signals. Whether an instruction to allow a modification to correction conditions has been issued in step S701 is judged (step S802), and if it has, whether the standard pattern exists outside the image forming area of the copying paper is judged by the pattern discriminator 104 through the CCD sensor 3 (step S803). For instance, the pattern discriminator 104 judges whether an 11-stage standard pattern having a different density for each stage exists outside the image forming area of the copying paper. If the standard pattern has been detected, the generation mode flag for indicating whether gradation correction is necessary is set in the control unit 41 (step S804). The control unit 41 then orders the CCD sensor 3 to read the density of each stage of the standard pattern (step S805). The read data are stored into the gamma correction operation unit 305 via the A/D converter 101, the shading correction unit 102, and the density converter 103. The gamma correction operation unit 305 determines a reproduction characteristic curve based on the read data and the standard data of the standard pattern stored inside (step S806). The gamma correction operation unit 305 further determines gamma correction conditions based on the determined reproduction characteristic curve and a target reproduction characteristic curve stored inside, and the determined gamma correction conditions are stored in the gamma correction operation unit 305 (step S807). The scanner 1 then detects the size of the document (step S808). The lamp of the scanner 1 is turned off, and the scanner is returned to the home position (step S809), where the pre-scanning comes to an end.

As shown in FIG. 26, in accordance with the sensor input of the environmental sensor in the printer and the process control operations (detection of the electric potential of the photosensitive member and detection of the amount of stuck toners by AIDC pattern), image forming conditions (VO, VB, LD GAIN, γ-TABLE, and so on) are set in the printer head control unit 43 and the printer control unit 45 (step S704). The AIDC pattern formed on the photosensitive member is designed especially for detecting the amount of stuck toners. VO indicates the surface potential of the photosensitive member 21, VB indicates the electric potential of the developing bias, and LD GAIN indicates the amount of laser light.

Whether the generation mode flag is currently on or not is judged (step S705), and if it is, the control unit 41 loads the gamma correction conditions determined in step S807 from the gamma correction operation unit 305 into the gamma correction unit 204 (step S706). In accordance with the gamma correction conditions, the copying operation, including the main scanning, is performed for each color (C, M, Y, and BK) (steps S710 and S711).

When the generation mode flag is not currently on, the control unit 41 loads the standard gamma correction conditions from the gamma correction operation unit 305 into the gamma correction unit 204 (step S707). In accordance with the standard gamma correction conditions, the copying operation is performed for each color (steps S710 and S711).

Whether an instruction to form the standard pattern has been issued in step S701 is judged (step S708), and if it has, the printer head control unit 43 forms the standard pattern (step S709). More specifically, an instruction is issued so that the gamma correction operation unit 305 sends the standard data of the standard pattern to the printer head control unit 43. The standard data of the standard pattern are transferred from the gamma correction operation unit 305 to the printer head control unit 43 via the color correction unit 106, the MTF correction unit 108, the magnification change and image shift unit 109, and the color balance unit 110. In accordance with the standard data of the standard pattern originated from the image signal processing unit 42, the printer head control unit 43 forms the standard pattern outside the image forming area 701 as shown in FIG. 29. Generally, the printing of the standard pattern is performed only when making a first generation copy. When making second and later generation copies, the standard pattern is not formed every time a new generation copy is made, but the standard pattern in the first generation copy is copied as a part of the image. By copying the standard pattern repeatedly, deterioration in color reproducibility can be detected by reading the copied standard pattern. Using the read data of the standard pattern, a suitable gamma correction can be performed. After repeating the above operation for each of a predetermined number of copying papers, the copying operation is finished (step S712). At the same time, the generation mode flag is cleared.

As described above, according to the fourth embodiment of the present invention, the standard pattern formed outside the image forming area of a copying paper is read, and the read data of the standard pattern are compared with the standard data of the standard pattern as well as th data of the target reproduction characteristic curve to determine the optimum gamma correction conditions. As copies are made in accordance with the determined gamma correction conditions, excellent gradation reproducibility can be achieved even when making a copy from a copied image. When making a second or third generation copy from a first generation copy in which the standard pattern has been formed, the standard pattern formed in the first generation copy is repeatedly copied so that a variation in color reproducibility can be easily detected in comparison with the original color reproducibility. Thus, the optimum gamma correction can be performed without causing a variation in gradation reproducibility, even when making a copy from a copied image.

[Fifth Embodiment]

The following is an explanation of a digital full-color copying machine of the fifth embodiment of the present invention. The structure and the control system of the digital full-color copying machine of this embodiment are the same as those of the first embodiment shown in FIGS. 1 and 4, and therefore, explanations of them are not provided below. The control unit 41 performs a control operation shown in the control flow charts of FIGS. 32 and 33. This control operation will be described later. An image signal processing unit 92 shown in FIG. 34 is provided in place of the image signal processing unit 42. So, the following description focuses on the image signal processing unit 92.

FIG. 34 is a block diagram of the image signal processing unit 92, which has the same structure as the image signal processing unit of the fourth embodiment except that it comprises an image forming correction condition deciding unit 401, and a gamma correction operation unit 405 in place of the gamma correction operation unit 305 of the fourth embodiment. Accordingly, the following description mainly concerns the A image forming correction condition deciding unit 401 and the gamma correction operation unit 405.

Figure 35:
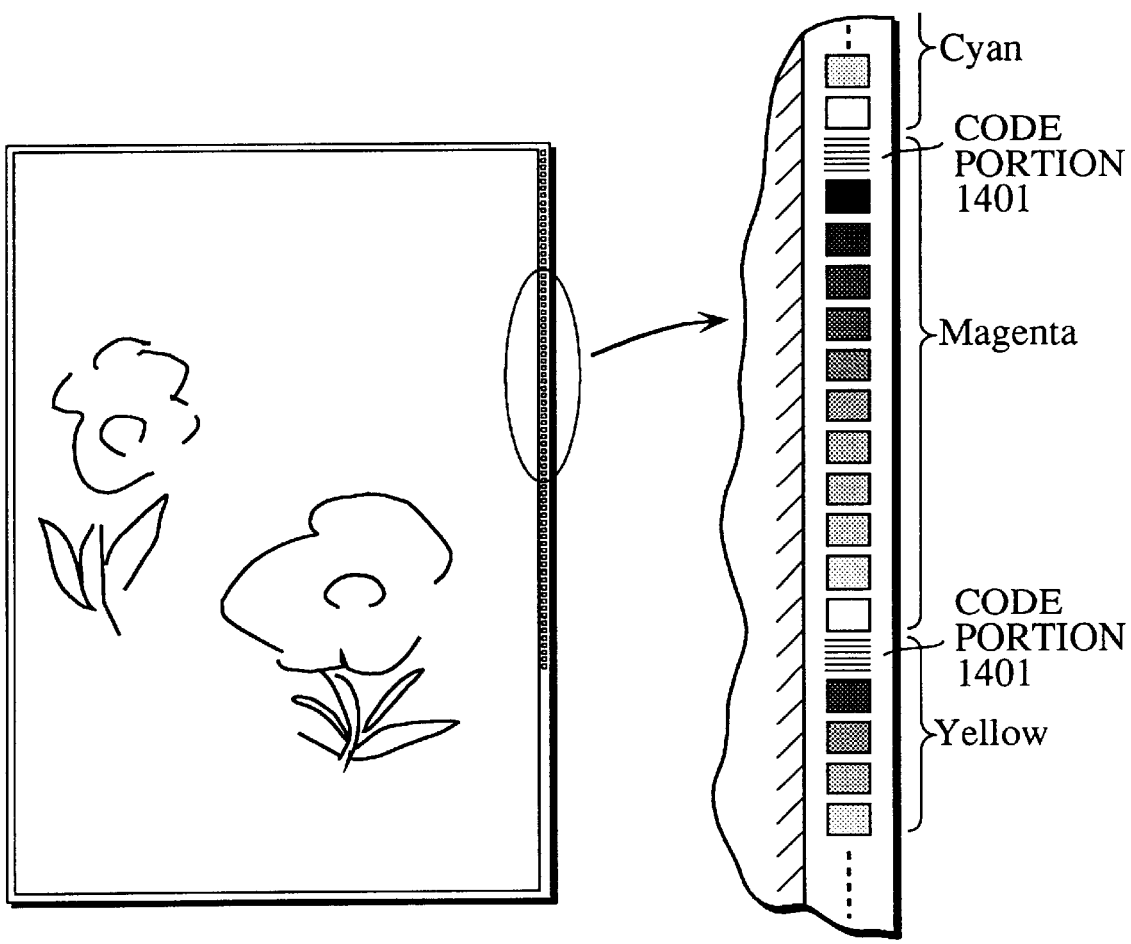
FIG. 35 shows the standard pattern used in the digital full-color copying machine.

Based on the read data of the standard pattern, the image forming correction condition deciding unit 401 decides a gradation correction curve for image formation and a machine code. The standard pattern, as shown in FIG. 35, is provided with code portions 1401. The code portions 1401 is formed by bar codes or the like, and represents the gradation correction curve for image formation and the machine code of the copying machine which has made the copy being used as a document. Specifically, the image forming correction condition deciding unit 401 extracts code data in accordance with the read data of the code portions in the standard pattern. By comparing the extracted code data with a look-up table of image forming correction condition codes and machine codes contained inside, image forming correction conditions and a machine code represented by the extracted code data are decided.

Figure 36:
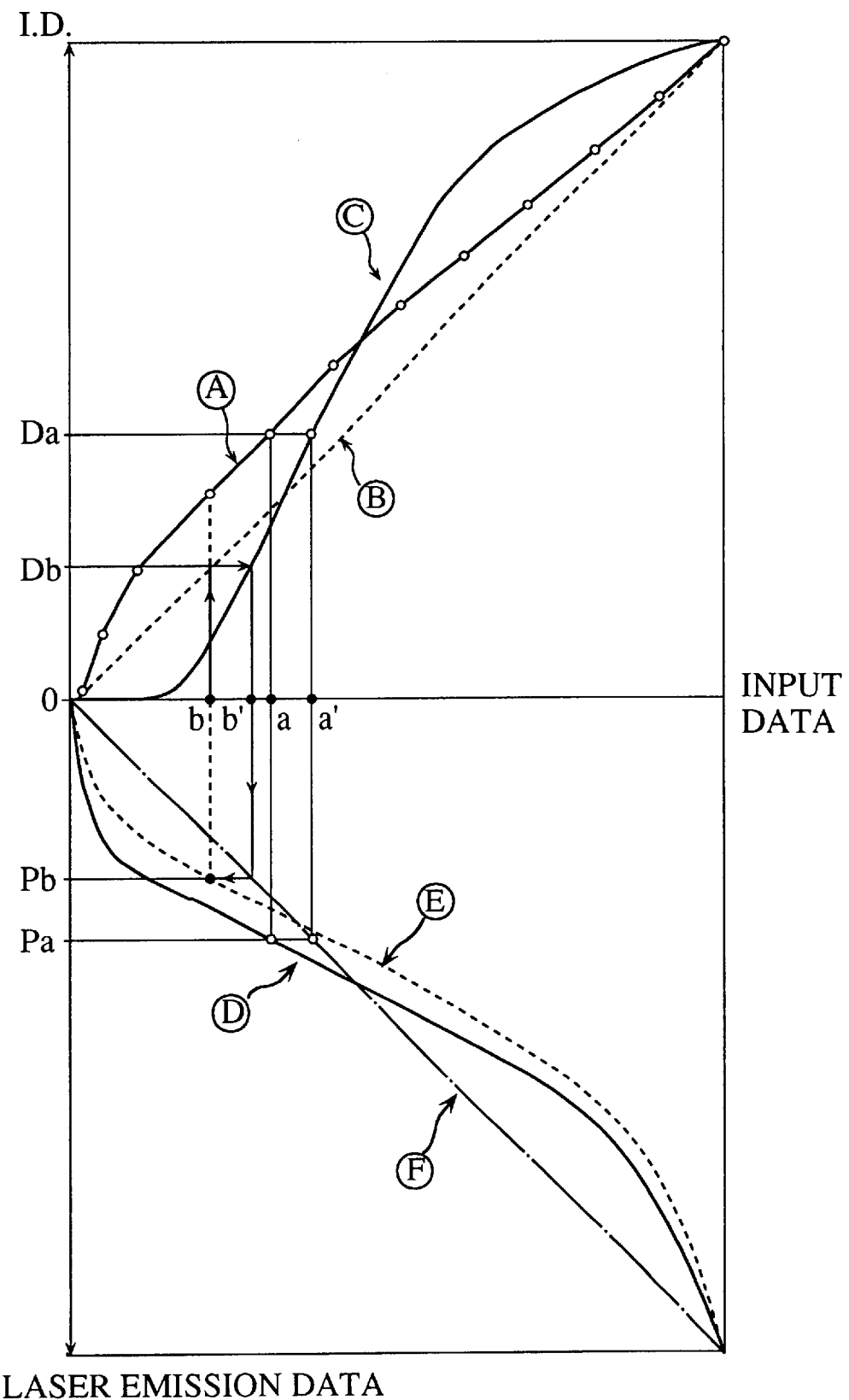
FIG. 36 is a graph showing the gradient characteristics, the image density, and the laser emission strength.

The gamma correction operation unit 405 determines gamma correction conditions (gradation correction conditions) in accordance with the discrimination result of the pattern discriminator 104, the result of the image forming correction condition deciding unit 401, the read data of the standard pattern transmitted from the density converter 103, the data to be the standards for the standard pattern, and the data of a target reproduction characteristic curve to be the standards for correction. The gamma correction conditions determined above are sent to the printer head control unit 43. The data to be the standards for the standard pattern and the data of the target reproduction characteristic curve are stored in the gamma correction operation unit 405 beforehand. Here, the data to be the standards for the standard pattern are the data to be the standards for printing the standard pattern shown in FIG. 35. The target reproduction characteristic curve is a line denoted by B in a graph showing the gradation characteristics in FIG. 36. In the graph of FIG. 36, the abscissa axis represents the image data, and the upper half of the ordinate axis represents the image density and the lower half of the ordinate axis represents the laser emission strength.

The gamma correction operation unit 405 determines gamma correction conditions as follows.

In accordance with the reproduction characteristic curve A and the target reproduction characteristic curve B shown in FIG. 36, a gradation correction curve D previously stored as gamma correction conditions is modified so that the reproduction characteristics becomes equal to the target reproduction characteristic curve B. Thus, a modified gradation correction line E as gamma correction conditions is determined. The reproduction characteristic curve A is determined based on the image density and the standard data of each individual standard pattern. Since the method of determining the reproduction characteristic curve A is the same as in the fourth embodiment, the explanation of it is not provided in the following description. The target reproduction characteristic curve B represents the target reproduction characteristics and is stored in the gamma correction operation unit 405 in advance. The gradation correction curve D is a curve selected in accordance with image forming correction conditions determined by the image forming correction condition deciding unit 401, and represents the gamma correction performed upon image formation. A plurality of gradation correction curves are stored in the gamma correction operation unit 405. Based on the image forming correction conditions sent from the image forming correction condition deciding unit 401, the gamma correction operation unit 405 selects the gradation correction curve D from a plurality of gradation correction curves.

In practice, a temporary characteristic curve C is determined from the gradation correction curve D, a gradation correction line F which is not modified, and the reproduction characteristic curve A, as shown in FIG. 36. A modified gradation correction curve E is determined from the temporary characteristic curve C, the target reproduction characteristic curve B, and the reproduction characteristic curve A. The gradation correction line F represents the gradation characteristics which have not been modified, and the relationship between the image data and the laser emission strength is linear. The gradation correction line F is stored in the gamma correction operation unit 405. The temporary characteristic curve C represents the gradation characteristics obtained when making a copy using the gradation correction line F. The following is an explanation of this operation.

Firstly, the temporary characteristic curve C, which is obtained when gradation correction is not performed on the document, is determined from the reproduction characteristic curve A, the gradation correction curve D, and the gradation correction line F, which is used when gradation correction is not performed. More specifically, in the case where the detected density of one individual standard pattern is set as Da, the image data corresponding to the detected density Da is determined to be a from the reproduction characteristic curve A. The laser emission strength corresponding to the image data a is determined to be Pa from the gradation correction curve D. On the gradation correction line F, the image data corresponding to the laser emission strength Pa is a'. In other words, when the density Da is detected, the laser emission strength is Pa. In accordance with the gradation correction line F, the image data is a' when the laser emission strength is Pa. Accordingly, it becomes clear that in the case where the laser emission strength is determined from the gradation correction line F used when no gradation correction is performed, the density Da can be obtained from the image data a'. The detected density Da and the image data a' are represented by a dot on the temporary characteristic curve C. This operation is repeated for each individual standard pattern, and the temporary characteristic curve C is determined by interpolating between the dots by the method of least squares.

The modified gradation correction curve E is determined from the temporary characteristic curve C, the target reproduction characteristic curve B, and the gradation correction line F. More specifically, when the image data is b, the detected density is Db on the modified gradation correction curve E. On the temporary characteristic curve C, however, the image data is b' when the detected density is Db. The laser emission strength is Pb on the gradation correction line F when the image data is b'. Accordingly, the laser emission strength corresponding to the image data b should be Pb. The image data b and the laser emission strength Pb are represented by a dot on the modified gradation correction curve E. This operation is repeated for each value of 0 to 255 of the image data to obtain the modified gradation correction curve E as the target gamma correction conditions. The modified gradation correction curve E may be obtained by repeating the above operation at 5 to 20 predetermined points an interpolating between the points by the method of least squares. The modified gradation correction curve E as the gamma correction conditions is then sent to the printer head control unit 43.

The gamma correction operation unit 405 also sends the standard data of the standard pattern to the printer head control unit 43 in response to an instruction to form the standard pattern shown in FIG. 35 when printing an image.

Figure 32:
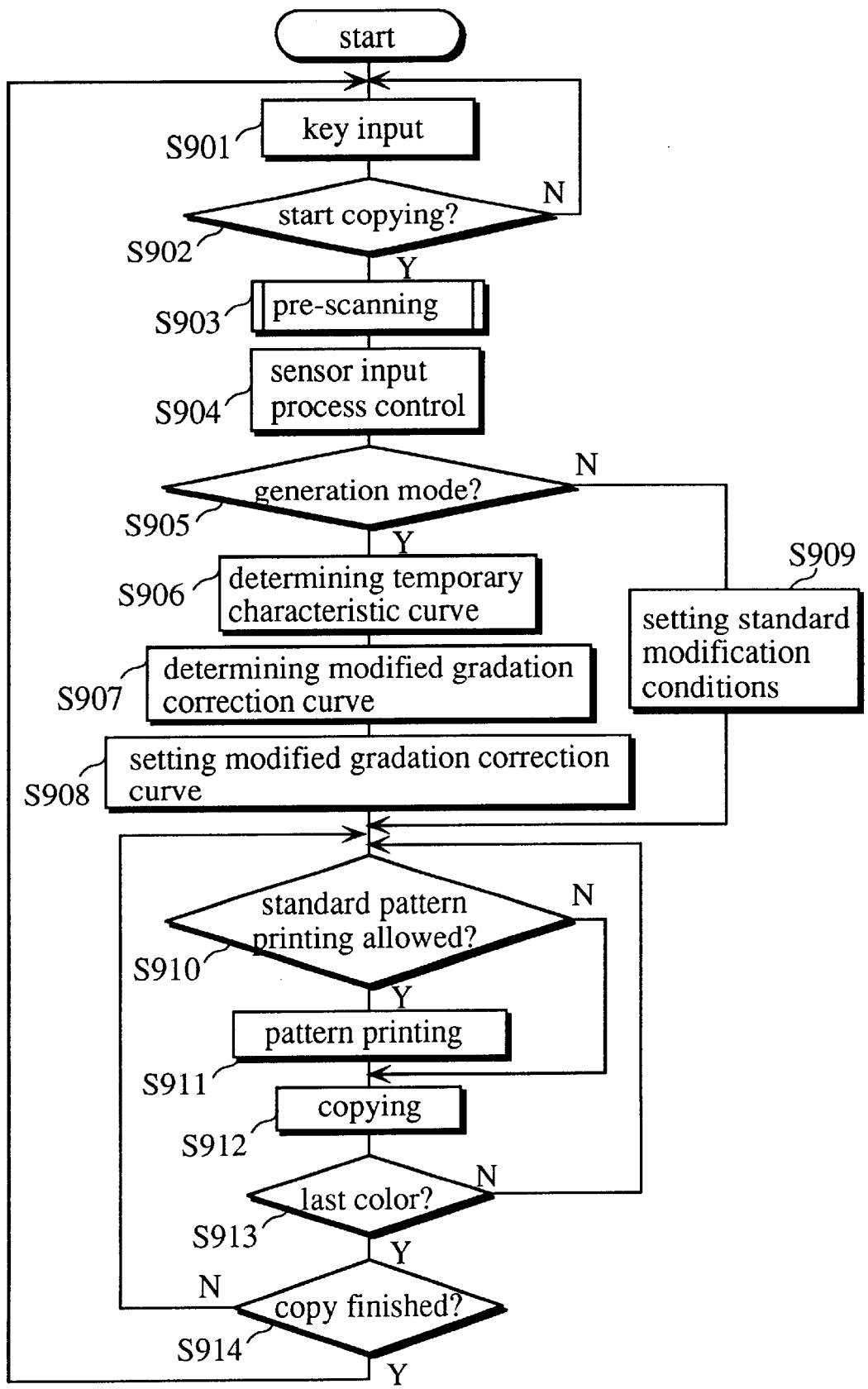
FIG. 32 is a flow chart of the control unit of the digital full-color copying machine of the fifth embodiment.
Figure 33:
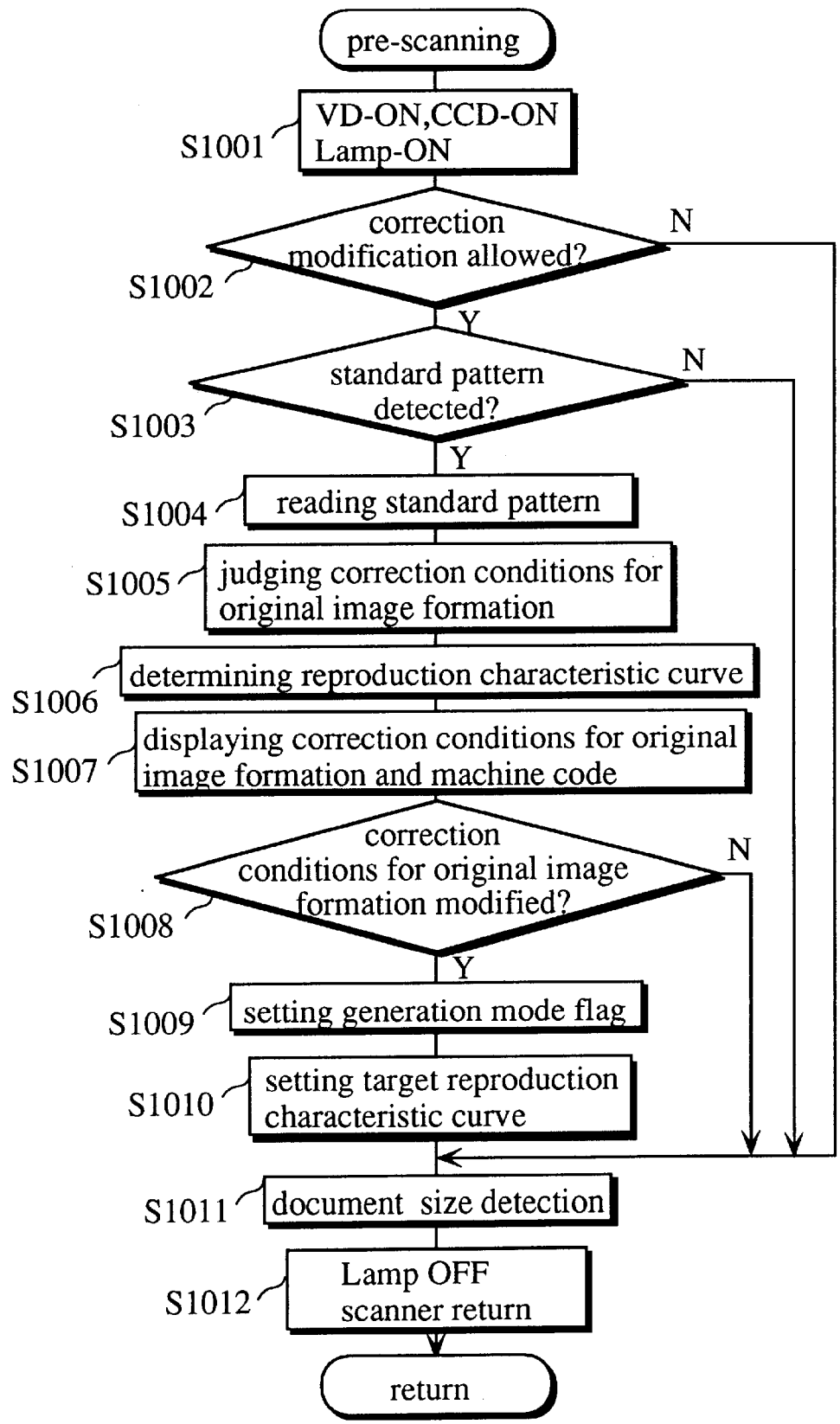
FIG. 33 shows a subroutine of the control flow shown in FIG. 32.
Figure 34:
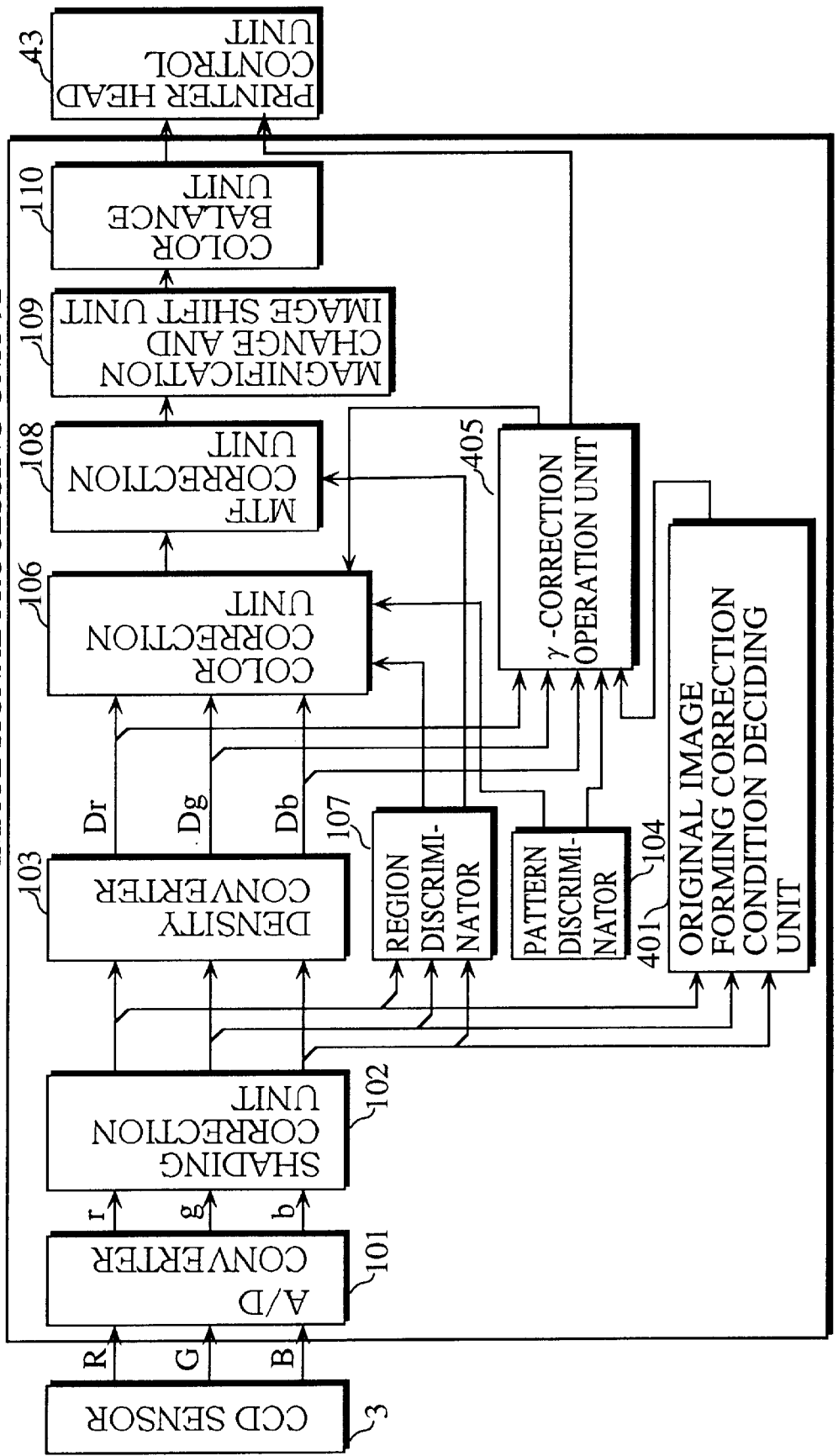
FIG. 34 is a block diagram of the image signal processing unit of the digital full-color copying machine.

The following explanation is for the operation of the digital full-color copying machine of the fifth embodiment of the present invention, with reference to the control flow charts shown in FIGS. 32 and 33.

Prior to copying, the digital full-color copying machine receives each key input (step S901). The key input is received through the operation panel. The operation panel of this embodiment comprises an image forming correction condition modification button in addition to the buttons of the operation panel 60 shown in FIG. 7. The image forming correction condition modification button receives an instruction whether a modification is required in the correction of the image formation, when the display 62 indicates that the copy being used as an original document has not been corrected so that it shows linear gradation characteristics, i.e., that the gradation characteristics have been corrected intentionally. An instruction to modify the correction conditions for image formation is issued so that the correction performed upon image formation is cancelled, and the image is reproduced. An instruction not to modify the correction conditions for image formation is issued so that the corrected image is reproduced as it is. The standard pattern button 67 receives an instruction as to whether the standard pattern shown in FIG. 35 should be formed during the copying operation.

After all key input has been received, an instruction to start copying is issued by pressing the copy start key 68 (step S902), and pre-scanning is started (step S903). The pre-scanning is performed to detect the size of the document and the existence of the standard pattern prior to main scanning, as shown in the control flow of FIG. 33.

As shown in FIG. 33, the lamp of the scanner 1, the CCD sensor 3, and the VD signal are first turned on (step S1001). Whether an instruction to modify the correction conditions has been issued in step S901 is judged (step S1002), and if it has, the pattern discriminator 104 judges whether the standard pattern exists output the image forming area of the copying paper (step S1003). For instance, the pattern discriminator 104 judges whether an 11-stage standard pattern having a different density for each stage of each color (C, M, Y, and BK) exists outside the image forming area of the copying paper as shown in FIG. 35. If the standard pattern has been detected, the CCD sensor 3 read the standard pattern (step S1004). The image signal processing unit 92 orders the image forming correction conditions deciding unit 401 to store the code data in the read data and orders the gamma correction operation unit 405 to store the remaining data. In accordance with the stored code data, the image forming correction condition unit 401 determines the gradation correction conditions for image formation and a machine code of the copying machine which has made the copy being used as the original document (step S1005). Based on the read data of the standard pattern stored in the gamma correction operation unit 401, the reproduction characteristic curve A shown in FIG. 36 is determined (step S1006). The display 62 on the operation panel then displays the image forming correction conditions or the machine code determined by the image forming correction condition deciding unit 401 (step S1007). An instruction as to whether a modification is necessary to the image forming correction conditions is issued through the image forming correction condition modification button on the operation panel operated by the user (step S1008). If an instruction to allow a modification to the image forming correction conditions is issued, the control unit 41 sets the generation mode flag inside (step S1009). The gamma correction operation unit 405 sets the target reproduction characteristic curve indicated by B in FIG. 36 (step S1010). The scanner 1 then detects the size of the document (step S1011). The lamp of the scanner 1 is turned off, and the scanner returns to the home position (step S1022), where the pre-scanning comes to an end.

As shown in FIG. 32, in accordance with the sensor input of the environmental sensor in the printer and the process control operations, image forming conditions (VO, VB, LD GAIN, γ-TABLE, and so on) are set in the printer head control unit 43 (step S904). Whether the generation mode flag is currently on or not is judged (step S905), and if it is, the gamma correction operation unit 405 determines the temporary characteristic curve C shown in FIG. 36 (step S906). Specifically, the gamma correction operation unit 405 determines the temporary characteristic curve C in accordance with the gradation correction curve D specified by the determined correction conditions for image formation, a gradation correction line F used when no gradation correction is performed, and the reproduction characteristic curve A, all shown in FIG. 36. Based on the temporary characteristic curve C determined above and, the target reproduction characteristic curve B, and the gradation correction line F, the modified gradation correction curve E is determined (step S907). The modified gradation correction curve E is set as correction conditions in the gamma correction unit 204 (step S908). In accordance with the above correction conditions, the printer head control unit 43 performs the copying operation including the main scanning for each color (C, M, Y, and BK) (steps S912 and S913).

Meanwhile, if the generation mode flag is not currently on, the control unit 41 loads the standard gamma correction conditions from the gamma correction operation unit 405 into the gamma correction unit 204 (step S909). In accordance with the standard correction conditions, the printer head control unit 43 performs the copying operation for each color (steps S912 and S913).

Whether an instruction to form the standard pattern has been issued in step S901 is judged (step S910), and if it has, the control unit 41 instructs the printer head control unit 43 to form the standard pattern (step S911). Specifically, an instruction is issued so that the gamma correction operation unit 405 sends the standard data of the standard pattern to the printer head control unit 43. The standard data of the standard pattern are transferred from the gamma correction operation unit 405 to the printer head control unit 43. In accordance with the standard data of the standard pattern transmitted from the image signal processing unit 92, the printer head control unit 43 forms the standard pattern outside the image forming area as shown in FIG. 35. Generally, the printing of the standard pattern on a copying paper is performed only when making a first generation copy. By using the read data of the standard pattern, a suitable gamma correction can be performed. The above operation is performed for each copying paper, and the copying operation is finished when a predetermined number of copies have been made (step S914). The generation mode flag is cleared at the same time of finishing the copying.

As described above, in this embodiment, whether the original document is made in accordance with correction conditions different from the standard correction conditions is judged, and according to the judgement, correction is performed to reproduce a copied image as close to the original as possible, or to reproduce the copied image as it is.

[Sixth Embodiment]

The following is an explanation of a digital full-color copying machine of the sixth embodiment of the present invention. The structure and the control system of the digital full-color copying machine of this embodiment are the same as those of the first embodiment shown in FIGS. 1 and 4, and therefore, explanations of them are not provided below. The control unit 41 performs a control operation shown in the control flow charts of FIGS. 37 and 38. This control operation will be described later. An image signal processing unit 172 shown in FIG. 39 is provided in place of the image signal processing unit 42. So, the following description focuses on the image signal processing unit 172.

FIG. 39 is a block diagram of the image signal processing unit 172, which has the same structure as the image signal processing unit of the fourth embodiment, except that it comprises a machine code detecting unit 504 and a gamma correction selecting unit 505 in place of the pattern discriminator 104 and the gamma correction operation unit 105 shown in FIG. 28. Accordingly, the description below mainly concerns the machine code detecting unit 504 and the gamma correction selecting unit 505.

Figure 40:
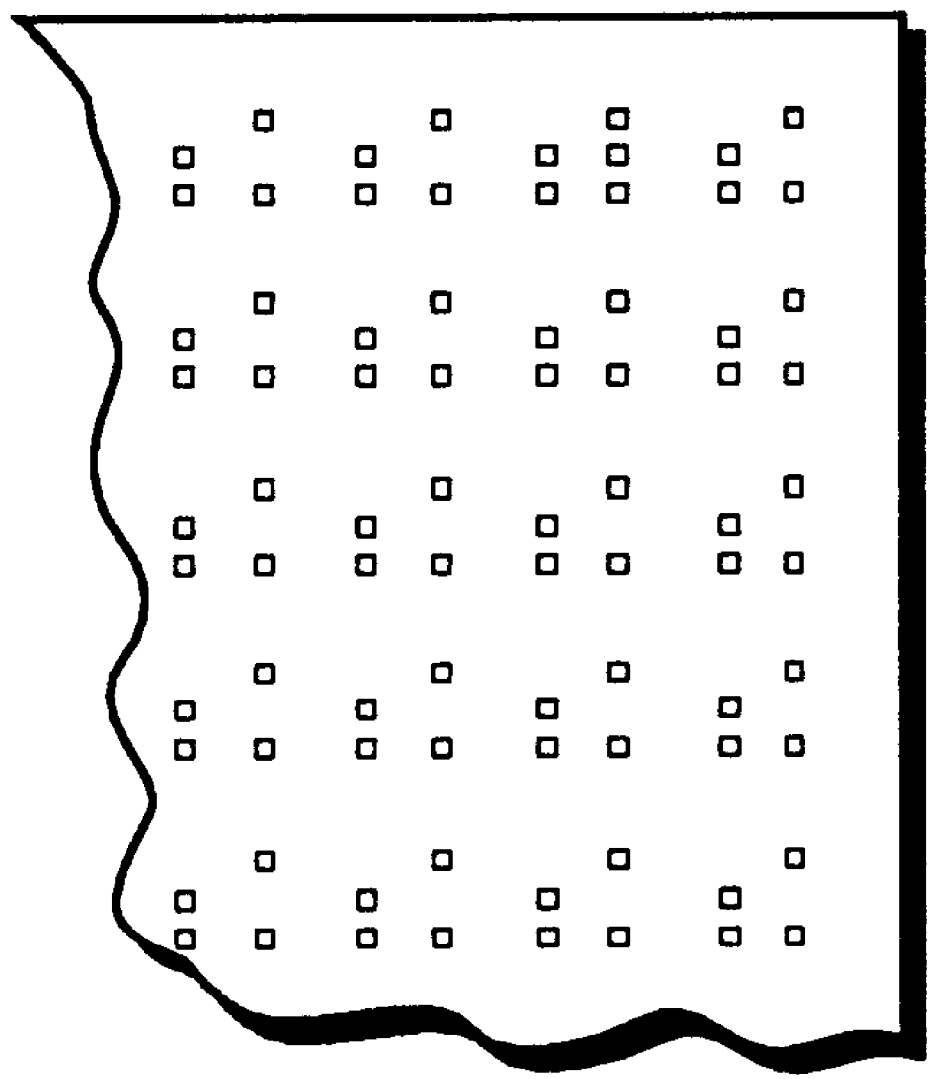
FIG. 40 shows the standard pattern used in the digital full-color copying machine.

The machine code detecting unit 504 detects a machine code represented by the standard pattern, based on the read data of the standard pattern. The standard pattern, as shown in FIG. 40, comprises only one color (Y) and represents code data containing a machine code and image forming conditions (the user setting, image processing conditions, process setting conditions, environmental conditions, and so on) in a part of the image forming area or in entire image forming area. Specifically, the machine code detecting unit 504 extracts code data in accordance with the read data of the standard pattern. By comparing the extracted code data with a machine code table contained therein, whether the extracted code data contains a machine code or not can be judged.

Figure 41:
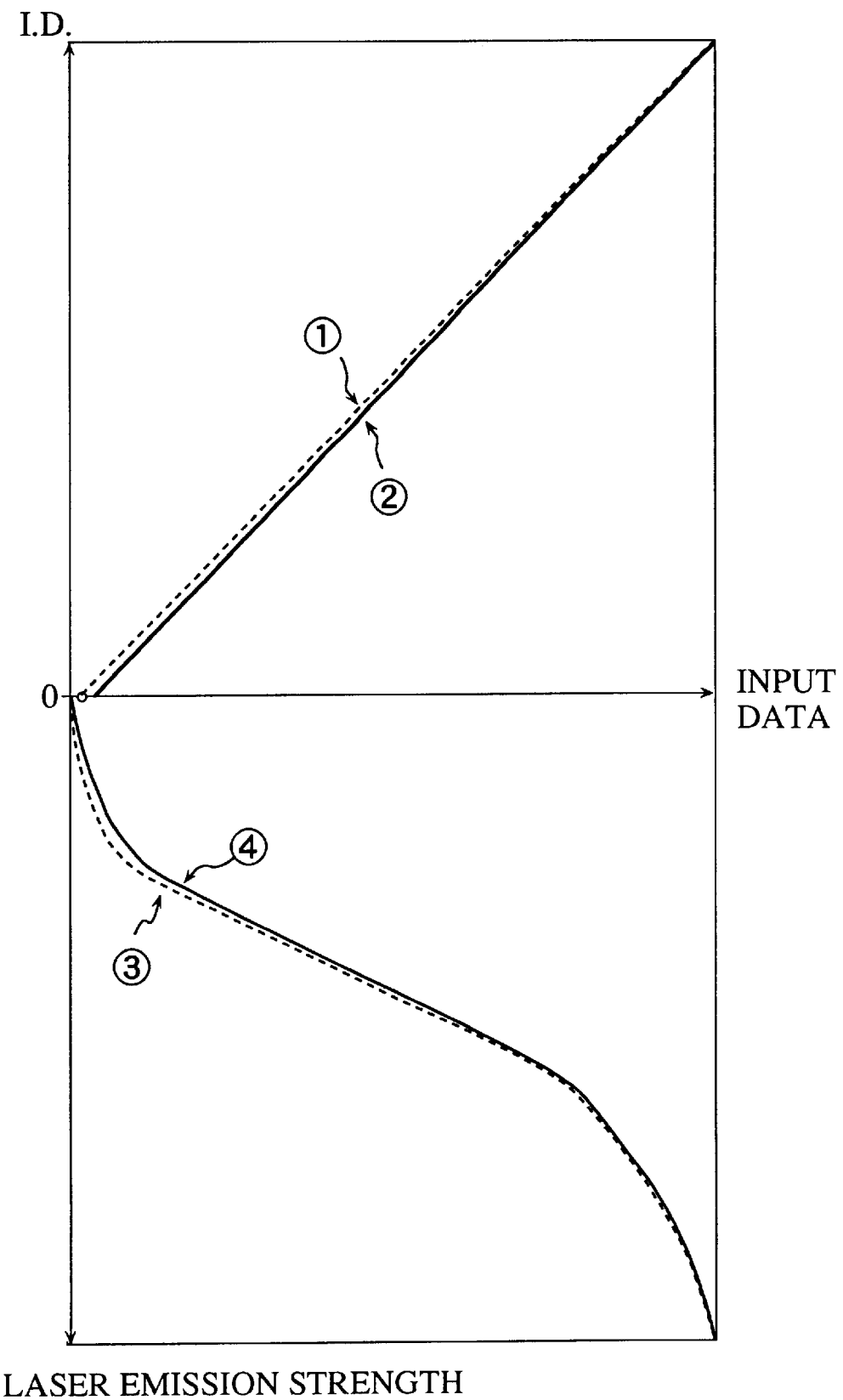
FIG. 41 is a graph showing the gradient characteristics, the image density, and the laser emission strength.

The gamma correction selecting unit 505 selects gamma correction conditions using the machine code detected by the machine code detecting unit 504 and a look-up table of machine codes and gamma correction conditions, and sends the selected gamma correction conditions to the gamma correction unit 204 in the printer head control unit 43. The look-up table is contained in the gamma correction selecting unit 505, and stores a plurality of combinations of a machine code and gamma correction conditions. The optimum gamma correction conditions for the characteristics of the machine (copying machine) represented by the machine code are selected. FIG. 41 shows an example of the gamma correction conditions. The upper half of the figure is a graph showing gradation characteristics, and the lower half is a graph showing the original density and the laser emission strength. A curve (3) is a gradation correction curve representing the standard gamma correction conditions, and a curve (1) is a reproduction characteristic curve determined from the gradation correction curve (3). A curve (4) is a gradation correction curve representing gamma correction conditions determined by the machine code, and a curve (2) is a reproduction characteristic curve determined from the gradation correction curve (4). The example gamma correction conditions represented by the curve (4) are used to perform correction by skipping highlight portions. The reproduction characteristic curve (2) shows that the low density portion in the original density is cut down to zero.

Figure 37:
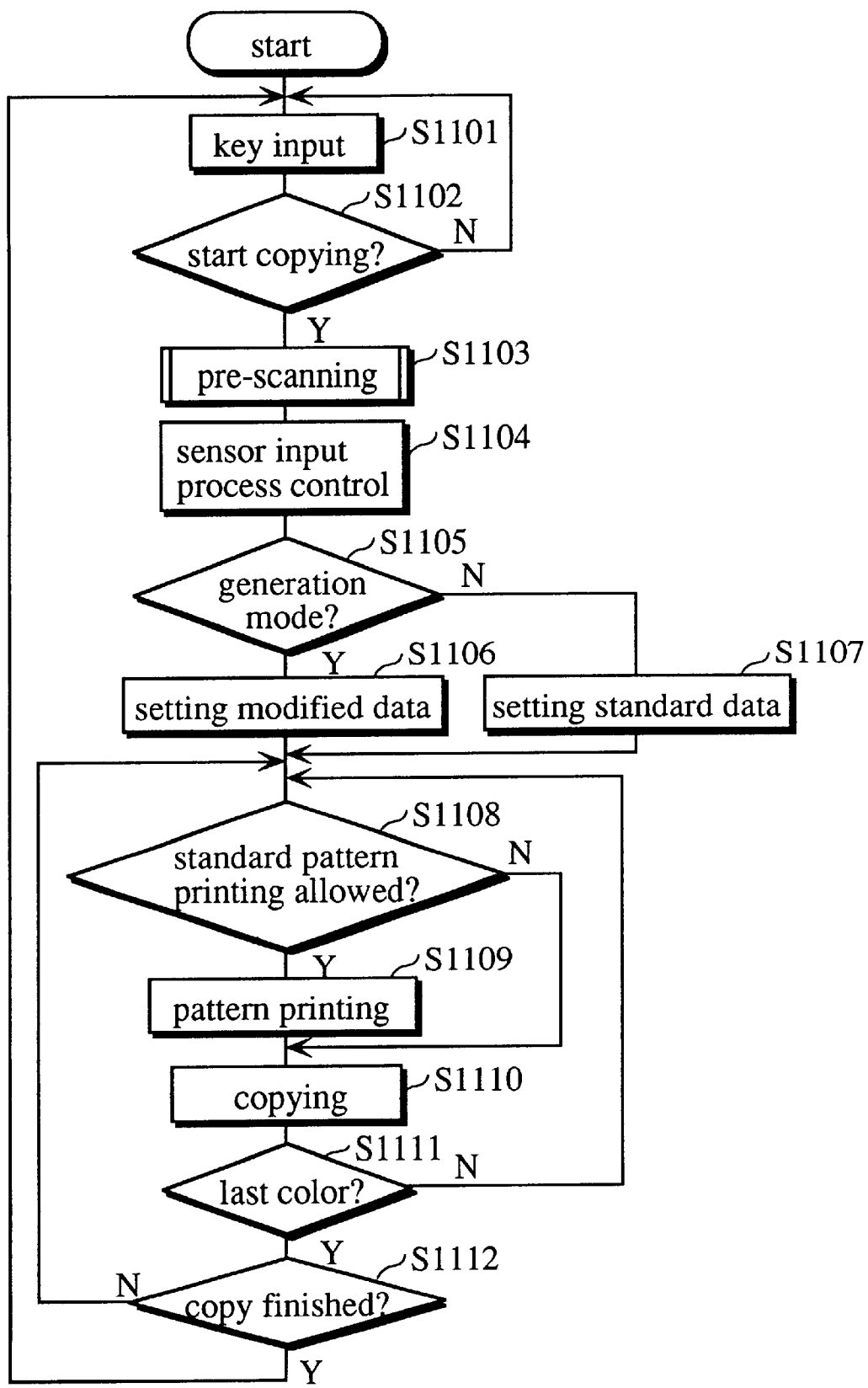
FIG. 37 is a flow chart of the control unit of a digital full-color copying machine of the sixth embodiment.
Figure 38:
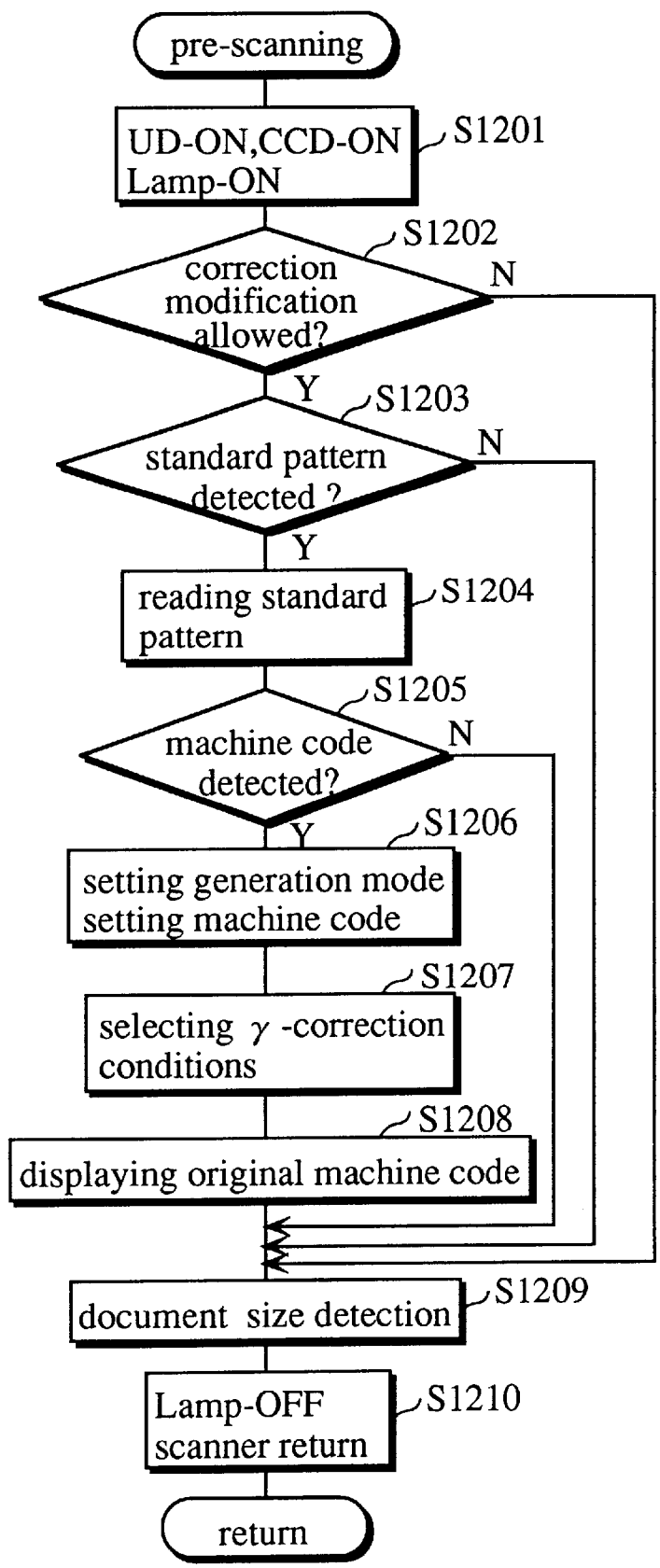
FIG. 38 shows a subroutine of the control flow shown in FIG. 37.
Figure 39:
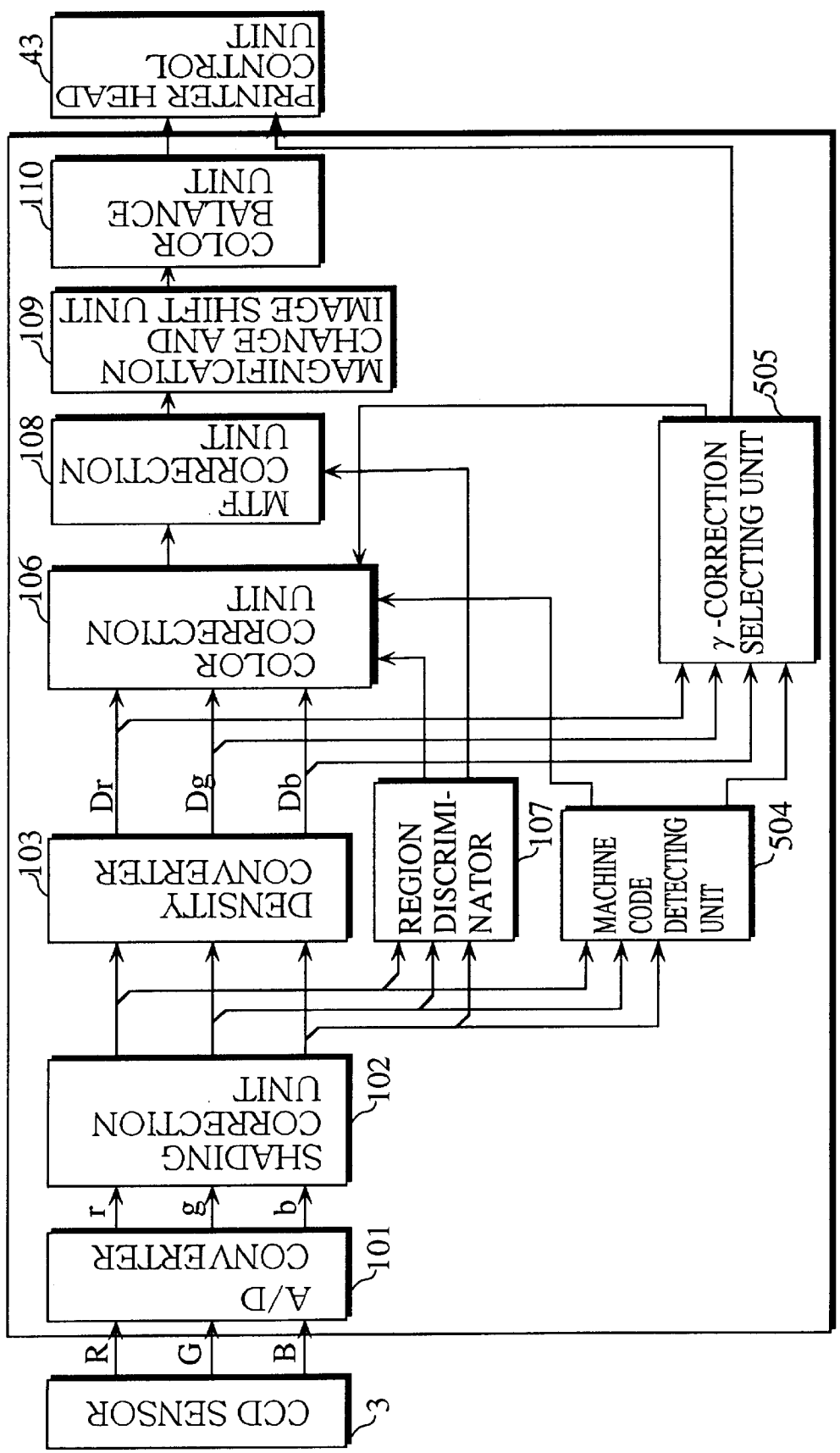
FIG. 39 is a block diagram of the image signal processing unit of the digital full-color copying machine.

The following explanation is for the operation of the digital full-color copying machine of this embodiment, with reference to the control flow charts shown in FIGS. 37 and 38.

Prior to the copying operation, the digital full-color copying machine receives each key input through the operation panel 60 shown in FIG. 7 (step S1101). Here, the generation button 66 receives an instruction as to whether a modification to correction conditions is allowed or not. In response to an instruction to allow a modification to correction conditions, the gamma correction selecting unit 505 selects gamma correction conditions. When making a copy from a copied image, the copying operation is performed in accordance with the selected gamma correction conditions. In response to an instruction to prohibit a modification to correction conditions, the copying machine performs the copying operation in accordance with the standard gamma correction conditions even when making a copy from a copied image. The standard pattern button 67 receives an instruction as to whether the standard pattern shown in FIG. 40 should be formed or not. The display 62 displays the number of copies being made as well as the machine code.

After all key input has been received, an instruction to start copying is issued by pressing the copy start key 68 (step S1102), and pre-scanning is started (step S1103). The pre-scanning is performed to detect the size of the document and the existence of the standard pattern prior to main scanning, as shown in the control flow chart of FIG. 38.

More specifically, the lamp of the scanner 1, the CCD sensor 3, and the VD signal are first turned on, as shown in the control flow chart of FIG. 38 (step S 1201). Whether an instruction to allow a modification to correction conditions has been received in S1101 is judged (step S1202), and if it has, the machine code detecting unit 504 judges, through the CCD sensor 3, whether the standard pattern representing a machine code and the like exists in any part of the image forming area (step S1203). For instance, the machine code detecting unit 504 judges whether a single-color standard pattern of Y representing a machine code as shown in FIG. 40 exists or not. If the standard pattern has been detected, the CCD sensor 3 reads the standard pattern (step S1204). The read data of the standard pattern are then sent to the machine code detecting unit 504. Based on the read data, the machine code detecting unit 504 detects the machine code represented by the standard pattern (step S1205). If the machine code has been detected, the control unit 41 sends the detected machine code to the gamma correction selecting unit 505, and sets the generation mode flag (step S1206).

The control unit 41 orders the gamma correction selecting unit 505 to select gamma correction conditions (step S1207). Specifically, the gamma correction selecting unit 505 selects gamma correction conditions in accordance with the detected machine code and a look-up table of machine codes and gamma correction conditions (step S1208). The detected machine code is then displayed by the display 62, and the size of the document is detected by the scanner 1 (steps S1208 and S1209). The lamp of the scanner 1 is turned off, and the scanner returns to its home position (step S1210), where the pre-scanning comes to an end.

As shown in the control flow chart of FIG. 37, in accordance with the sensor input of the environmental sensor in the printer and the process control operations (detection of the electric potential of the photosensitive member and detection of the amount of stuck toners by AIDC pattern), image forming conditions (VO, VB, LD GAIN, γ-TABLE, and so on) are specified (step S1104). Whether the generation mode flag is currently on or not is judged (step S1105), and if it is, the gamma correction conditions selected in step S1207 are set in the gamma correction unit 204 (step S1106). In accordance with the selected gamma correction conditions, the copying operation go including the main scanning is performed for each color (C, M, Y, and BK) (steps S1110 and S1111).

If the generation mode flag is not currently on, the gamma correction unit 204 is loaded with the standard gamma correction conditions selected by the gamma correction selecting unit 505 (step S1107). In accordance with the standard gamma correction conditions, a copying operation is performed for each color (steps S1110 and S1111). Whether an instruction to form the standard pattern has been issued in step S1101 is judged (step S1108), the control unit 41 instructs the printer head control unit 43 to form the standard pattern (step S1109). More specifically, the control unit 41 instructs the printer head control unit 43 to form the standard pattern representing the machine code detected by the machine code detecting unit 504. After repeating the above operation for each of a predetermined number of copying papers, the copying operation is finished (step S1112). The generation mode flag is cleared at the same time of finishing the copying.

As described above, according to this embodiment, a machine code is detected by reading the standard pattern, and the copying operation is performed in accordance with the gamma correction conditions suitable for the characteristics of the machine represented by the detected machine code. This embodiment has the advantage that it is hard to recognize the standard pattern formed in the copied image, because the standard pattern is not printed in the margin of a copying paper and comprises a color difficult to distinguish, such as yellow.

The gamma correction operation unit 305 of the fourth embodiment and the gamma correction operation unit 405 of the fifth embodiment determine gamma correction conditions for all image data, but gamma correction conditions may be determined for only a part of the image data. In such case, the determined gamma correction conditions are stored as the approximation of a higher degree curve or a polygonal line.

The gamma correction operation unit 305 may determine a density conversion coefficient, instead of gamma correction conditions, to perform gradation correction by correcting density data.

The gamma correction operation unit 305 does not necessarily determine gamma correction conditions based on the density data, but it may determine gamma correction conditions in accordance with the read data after A/D conversion.

The printer head control unit 43 does not need to keep an area for forming the standard pattern, so the printing area may be enlarged.

Although the gamma correction operation unit 305 of the fourth embodiment and the gamma correction operation unit 405 of the fifth embodiment determine gamma correction conditions from the read data of the standard pattern every time a copy is made, gamma correction conditions may be determined in accordance with a look-up table. In other words, gamma correction conditions may be selected from a look-up table based on the read data of the standard pattern.

The code portions in the standard pattern of the fifth embodiment stores the gradation correction curve for forming an original image and the machine code of the copying machine which has outputted the original image as a copy, but color balance conditions and density adjustment conditions may be stored, too. Information on image process and process setting conditions may also be stored, such as sharpness (MTF correction value) for image formation, photography mode setting, VG/VB table conditions of the printer unit, laser gain adjustment conditions, and machine environment conditions. With these stored condition data, more precise correction can be performed on reproduction images.

In the standard pattern of the sixth embodiment, color balance conditions and density adjustment conditions may be stored, too. Information on image process and process setting conditions may also be stored, such as sharpness (MTF correction value) for image formation, photography mode setting, VG/VB table conditions of the printer unit, laser gain adjustment conditions, and machine environment conditions. With these stored condition data, more precise correction can be performed on reproduction images.

The standard pattern is not necessarily detected (step S803) during the pre-scanning in the control flow chart of the fourth embodiment shown in FIG. 27, but it may be detected when Or the copying starts (step S710 in FIG. 26). In doing so, there is a disadvantage that a document has to be set in a predetermined position (i.e., the read starting position), but there is also an advantage that the first copy can be made in a shorter period of time.

The above modification is also applied to the control flow charts of the fifth embodiment shown in FIGS. 32 and 33.

If a color which is not included in the predetermined reproduction range is detected during the pre-scanning, the standard gradation copying values may be used regardless of whether the standard pattern has been detected or not.

[The Seventh Embodiment]

Figure 42:
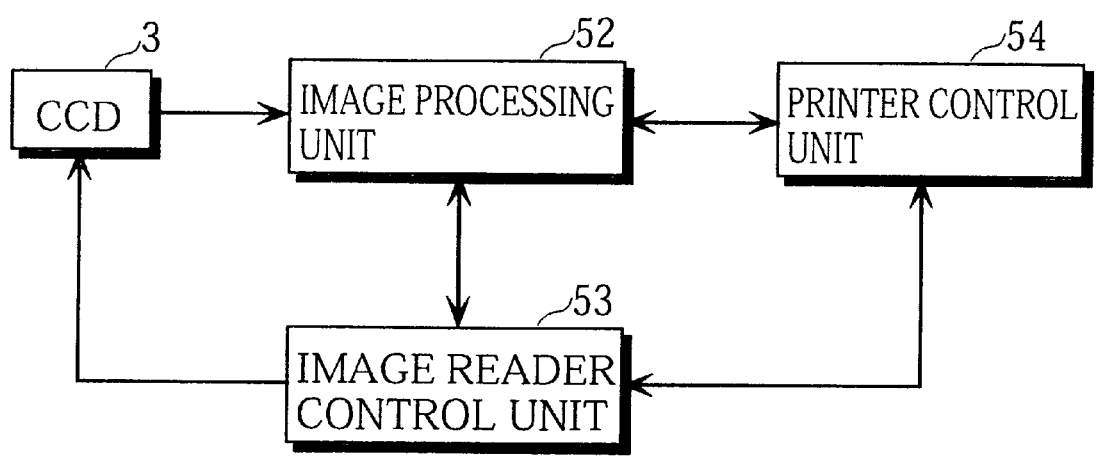
FIG. 42 is a block diagram of the control system of the seventh embodiment.

The following is an explanation of a digital full-color copying machine of the seventh embodiment of the present invention. The structure of the digital full-color copying machine of this embodiment is the same as that of the first embodiment shown in FIG. 1, and will not be described. The control system, however, has the structure shown in FIG. 42. As shown in FIG. 42, the image signal processing unit 52 serves as a centerpiece with the CCD sensor 3, the image reader control unit 53 and the printer control unit 54 being connected. The image signal processing unit 52 controls these units in accordance with the control flows shown in FIGS. 44 and 45. These control flows will be described later.

(7-1) Image Signal Processing Unit

Figure 43:
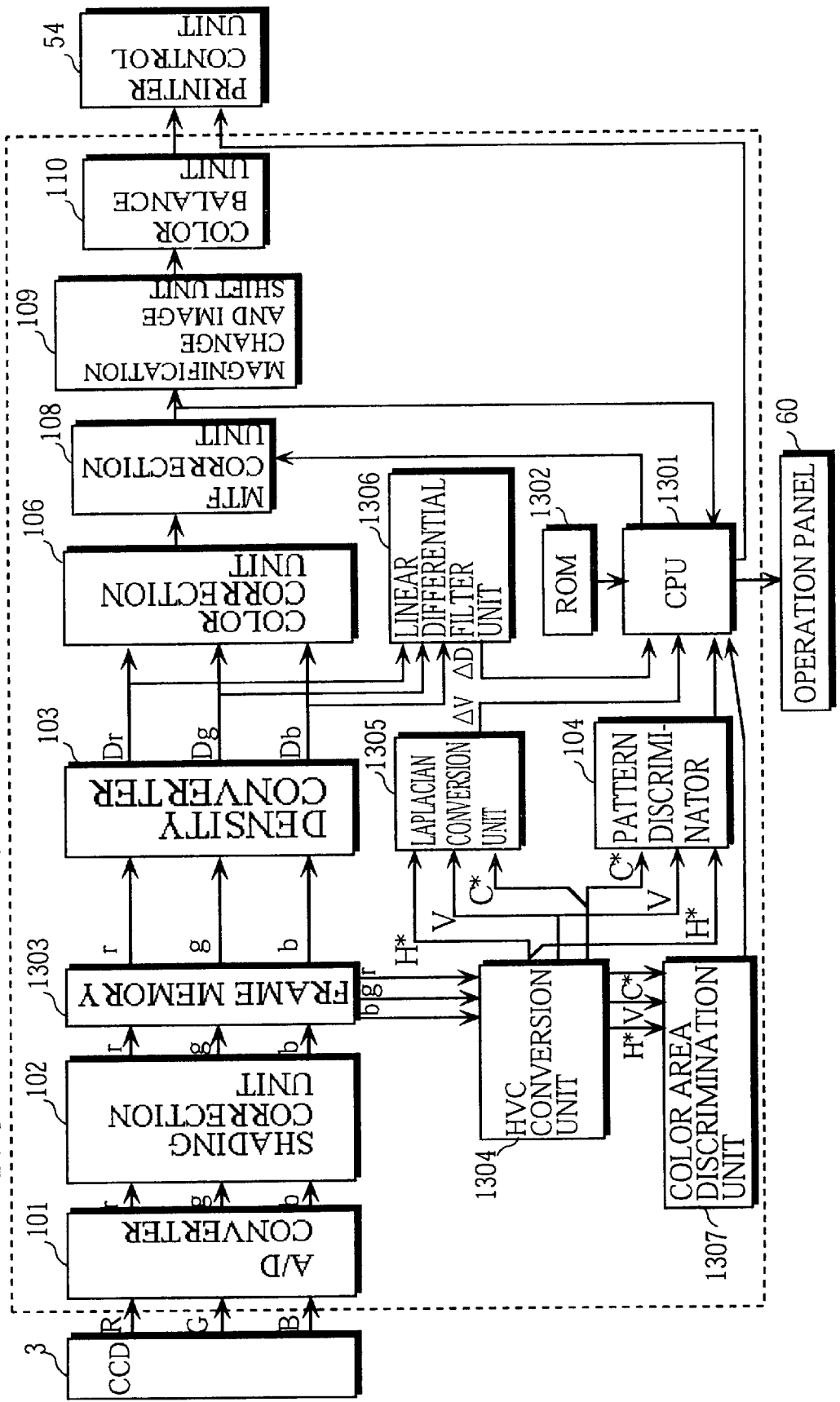
FIG. 43 is a block diagram showing the details of the image signal processing unit 52.

FIG. 43 is a block diagram of the image signal processing unit 52. As shown in FIG. 43, the image signal processing unit 52 does not use the color correction operation unit 105 and the region discriminator 107 which are included in the structure of the first embodiment shown in FIG. 5, but is provided with a CPU 1301, a ROM 1302, a frame memory 1303, an HVC conversion unit 1304, a Laplacian conversion unit 1305, a linear differential filter unit 1306, and a color space discrimination unit 1307. Except for the above, the structure of the seventh embodiment is the same as that of the first embodiment. The following description focuses on the changed and added parts stated above.

Figure 46:
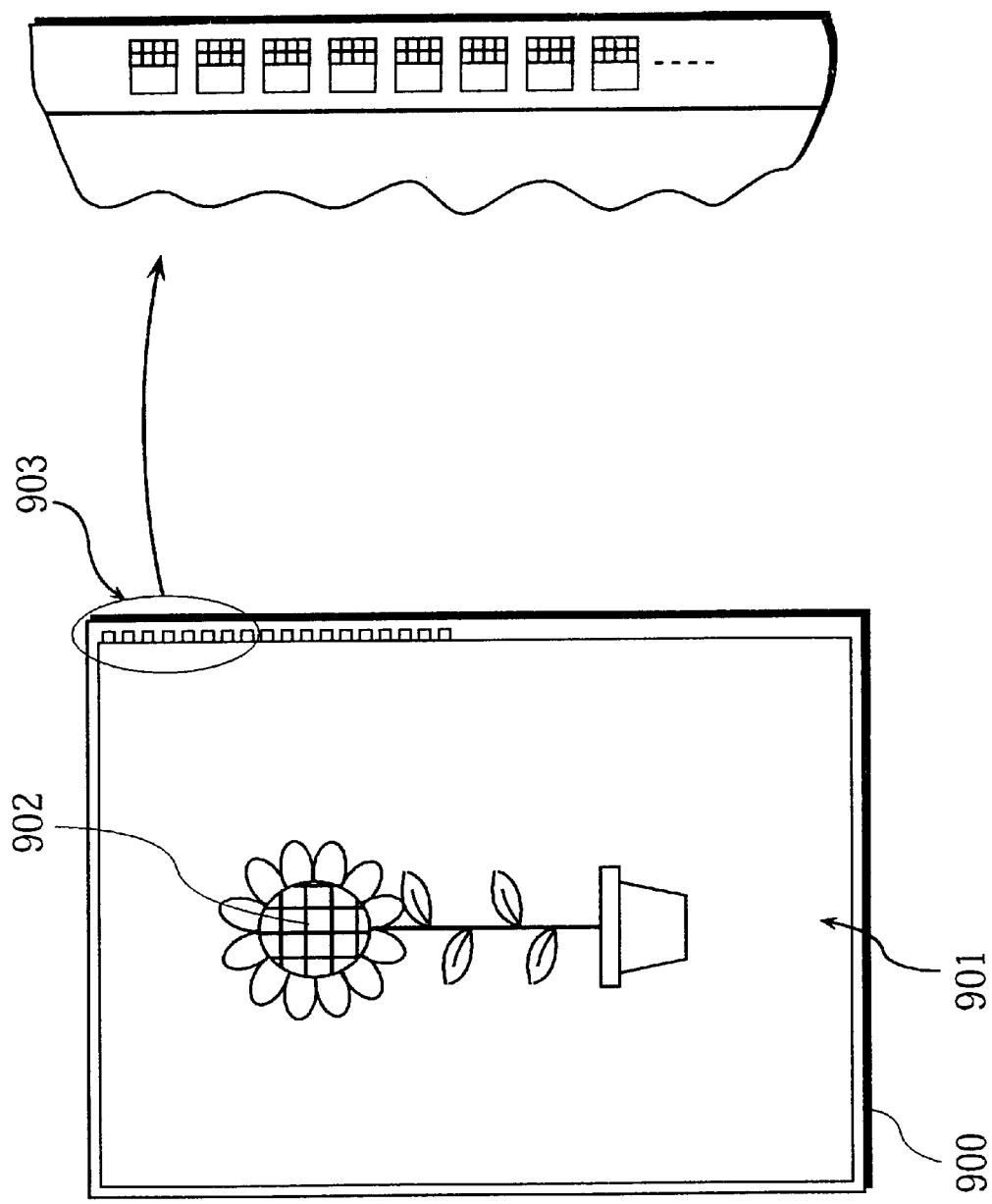
FIG. 46 shows the standard pattern applied to a digital full-color copying machine of the seventh embodiment.

The frame memory 1303 temporarily stores the image data for each color R, G and B of a document read by the CCD sensor 3 during the pre-scanning. When the document read by the CCD sensor 3 during the pre-scanning is a hard copy made by the digital full-color copying machine (the term "hard copy" hereafter refers to a copy that has been made by the present digital full-color copying machine) for which the user did not give an instruction to prohibit the formation of the standard pattern through the operation panel 60, the image data 902 in the image print area 901 (see FIG. 46) and the standard pattern 903 which have been read are separated into the three colors and are stored in the frame memory 1303.

The pattern discriminator 104 searches the image data stored in the frame memory 1303 and detects the image data of the standard pattern 903. The pattern discriminator 104 informs the CPU 1301 that it has detected the image data, and gives the CPU 1301 information relating to its storage positions in the frame memory 1303. Here, the search need only be performed for the image data of one color R, G or B. After the image data for the three colors R, G, B has been stored in the frame memory 1303, the image data for each pixel is read by the density converter 103 and the HVC converter 1304.

(7-2) HVC Converter

The HVC converter 1304 converts the read image data for each pixel into data for Hue angle (H*), Value (V) and Chroma (C*)of the color area signal in the uniform color space (called "Munsell color space" hereafter) of the Munsell color system as described below. The image data of R, G and B is first converted into the color area signals v, α and β using Equation (6) below. Based on these signals α and β, the values of Chroma (C*) and Hue (H*) are calculated.

$$M = \begin{pmatrix} a11 & a12 & a13 \\ a21 & a22 & a23 \\ a31 & a32 & a33 \end{pmatrix} \quad (6)$$

In Equation (6), the 3×3 conversion coefficients a11 to a33 are set in advance based on the transmission characteristics of the filter for the color elements and so forth. As one example, Equation (7) is shown below.

$$\begin{pmatrix} c \\ m \\ y \end{pmatrix} = X \begin{pmatrix} Dr' \\ Dg' \\ Db' \end{pmatrix} \quad (7)$$

Figure 47:
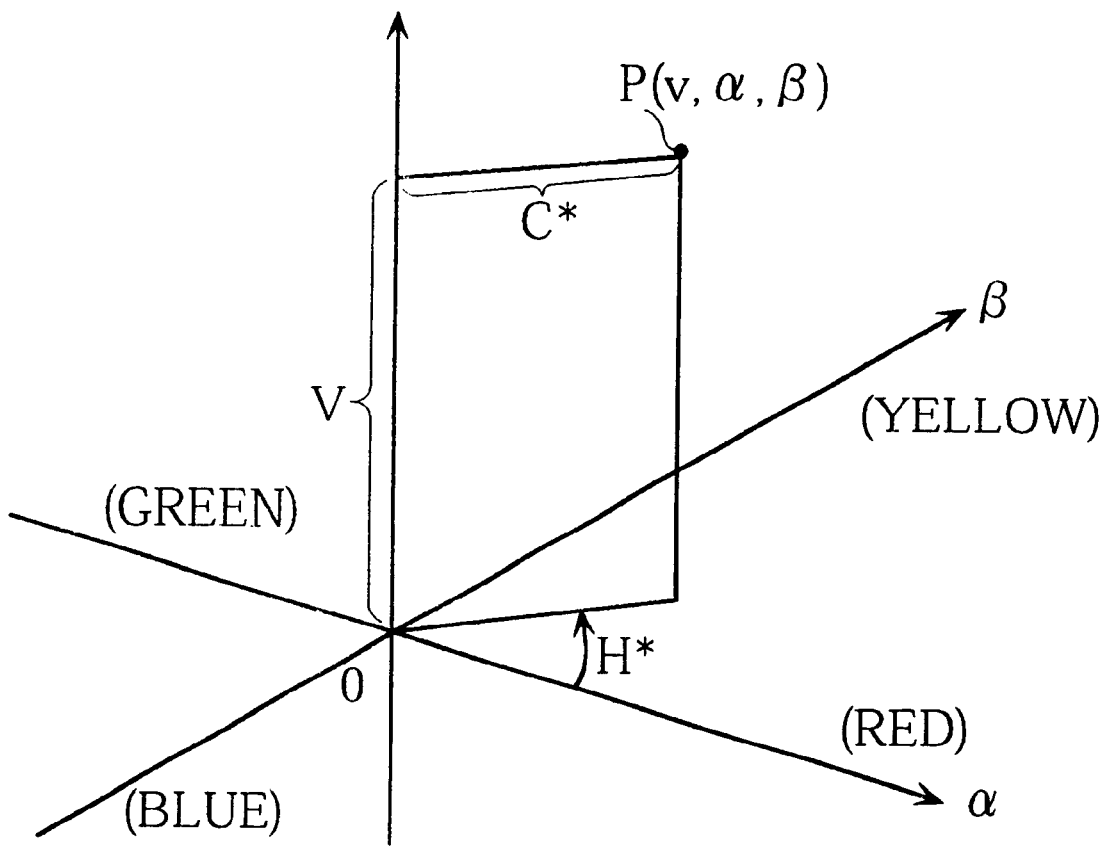
FIG. 47 shows the coordinates system for the Munsell color space.

FIG. 47 shows a coordinate system of the Munsell color space. The vertical axis indicates the Value, and two intersecting horizontal axes relate to the Hue. Here, the α axis denotes the red density in the positive direction and the green density in the negative direction, while the β axis denotes the yellow density in the positive direction and the blue density in the negative direction. Value (V) of the point P in the color space is the same as the value of v. As shown in FIG. 47, the Chroma and Hue angle are calculated respectively by Equations (8) and (9).

$$\begin{pmatrix} v \\ \alpha \\ \beta \end{pmatrix} = \begin{pmatrix} a11 & a12 & a13 \\ a21 & a22 & a23 \\ a31 & a32 & a33 \end{pmatrix} \begin{pmatrix} r \\ g \\ b \end{pmatrix} \quad (8)$$

$$\begin{pmatrix} 0.3 & 0.6 & 0.1 \\ 1.0 & -0.8 & 0.1 \\ -0.3 & -0.6 & 1.0 \end{pmatrix} \quad (9)$$

It should be noted here that although Hue angle (H*) is usually given as an angle ranging from 0° to 360°, Hue angle (H*) in Equation (8) is given by multiplying by the coefficient(256/360) so that H* can be expressed as one of 256 gradations (8 bits).

The respective color area signals for Chroma (C*), Value (V) and Hue angle (H*) calculated by the HVC converter 1304 in the above process are outputted to the Laplacian conversion unit 1305, the pattern discriminator 104 and the color area discriminator 1307.

The Laplacian conversion unit 1305 performs filter processing on the Value data for a focused pixel and its peripheral pixels using the Laplacian filter 1251 shown in FIG. 48. The Laplacian conversion unit 1305 then transmits the result as the Laplacian data ΔV to the CPU 1301.

(7-3) Color Area Discrimination Unit

The color area discrimination unit 1307 discriminates the color area where the image data of the focused pixel belongs using the color area signals H*, V and C* stated above. In more detail, the color area discrimination unit 1307 divides the entire range for the angle H* on an αβ plane in the Munsell color space of FIG. 47 into three corresponding to C, M and Y. The color area discrimination unit 1307 then determines which color area of C, M or Y the image data of the focused pixel belongs to, in accordance with the H* of the image data. Meanwhile, when the C* of the image data is "0" (i.e., colorless), the color area discrimination unit 1307 judges the image data belongs to the color area of K and outputs the result as the color area information to the CPU 1301.

In parallel with the HVC conversion, the density data Dr, Dg and Db which has been density converted by the density converter 103 is inputted into the color correction unit 106 and the linear differential filter 1306. The color correction unit 106 performs the black print process (BP process) and the undercolor removing process (UCR process) for the density data Dr, Dg and Db for colors R, G and B.

The processed density data of the reproduced color C, M, Y and K is then outputted to the MTF correction unit 108 where the data is subjected to MTF (spatial frequency) correction. However, before this is performed, the CPU 1301 performs the area discrimination process on the image data as described below.

The linear differential filter unit 1306 calculates the linear differential data ΔD for the density data Dr, Dg and Db outputted by the density converter 103. To do so, the linear differential filter unit 1306 calculates the average density value of each color, and the filtering by the linear differential filters 1261 for vertical direction and 1262 for horizontal direction in FIG. 49 is performed on the average density value to obtain the linear differential value ΔDv in the vertical direction and the linear differential value ΔDh in the horizontal direction. The linear differential filter unit 1306 then calculates the average value of the obtained absolute value by the expression (|ΔDv|+|ΔDh|)/2. The average value obtained here is transmitted as the linear differential data ΔD to the CPU 1301. In general, there are large changes in color density around the edges of images. For this reason, the CPU 1301 discriminates whether the image data of the focused pixel corresponds to an edge portion (where an edge portion represents a part of an edge in the image to be reproduced and the periphery of the edge) or to an even density portion of the original document in accordance with the linear differential data ΔD.

Figure 50:
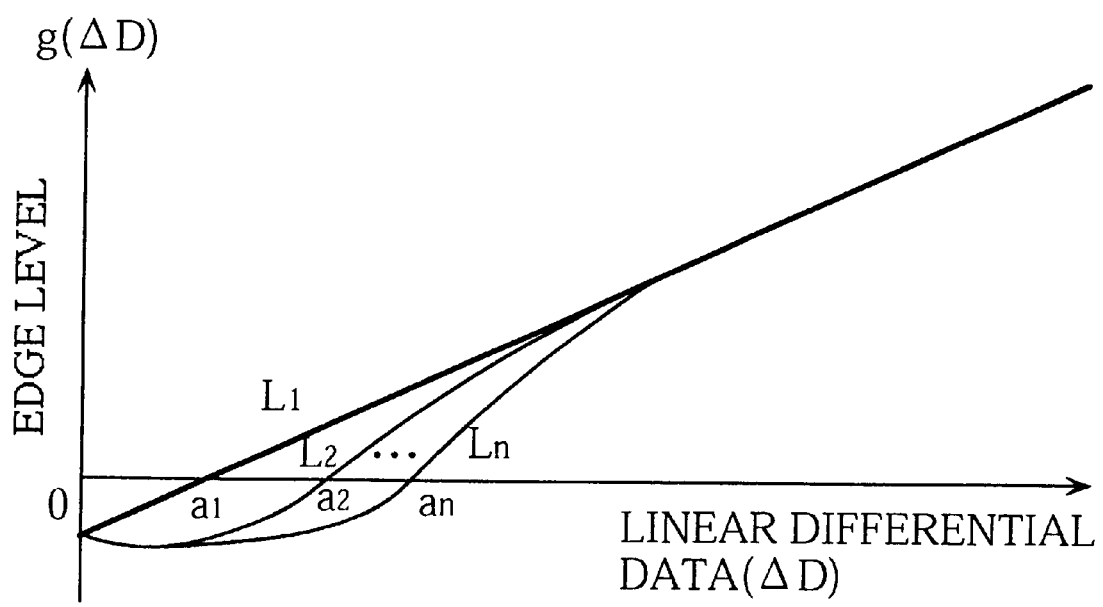
FIG. 50 is a characteristic curve for determining the edge portion.

When performing this discrimination, a characteristic curve for the edge portion discrimination shown in FIG. 50 is used. In FIG. 50, the horizontal axis indicates the value of the linear differential data ΔD and the vertical axis indicates the likelihood of the image data being judged an edge portion, i.e., the edge level.

Here, when the function of the specified characteristic curve is set as g(ΔD) and the inequality g(ΔD)>0 holds, the image data of the focused pixel is discriminated to be an edge portion of the original document. Accordingly, this function g(ΔD) is hereafter called the edge portion discriminating function.

The characteristic curve Ln (n=1, 2, 3, . . . ) is found statistically and experimentally, and is determined depending on the reading accuracy of the digital full-color copying machine and the image quality of the original document. The greater the threshold value "an" (n=1, 2, 3, . . . ) becomes, the harder it is for image data to be discriminated as an edge portion.

When the image of the original document has a lot of noise, for instance, a curve with a greater threshold value an is selected as the edge portion discriminating function g(ΔD), so that even density portions are not mistaken for edge portions.

The edge portion discriminating function g(ΔD) is set as tables for each of color areas C, M, Y, K in the internal memory of the CPU 1301. On receiving the input of the image data for a focused pixel, the CPU 1301 first refers to the tables of the edge portion discriminating function g(ΔD) which have been set for color areas of the image data in accordance with the color area information from the color area discrimination unit 1307. The CPU 1301 then discriminates whether the image data corresponds to an edge portion or an even density portion in accordance with the inputted linear differential data ΔD, and outputs the result as the area discriminating information to the MTF correction unit 108. Simultaneously, the linear differential data ΔD, the Laplacian data ΔV and the color area information are also outputted to the MTF correction unit 108.

In accordance with the MTF correction conditions which have been already set for the image data of the focused pixel, the MTF correction unit 108 performs an edge sharpening process or smoothing process on the image data of the original document outputted from the color correction unit 106 as follows.

(7-4) Edge Sharpening Process

When judging from the area discrimination information provided by the CPU 1301 that the image data of the focused pixel corresponds to an edge portion, the MTF correction unit 108 performs the edge sharpening process on the image data.

Figure 52:
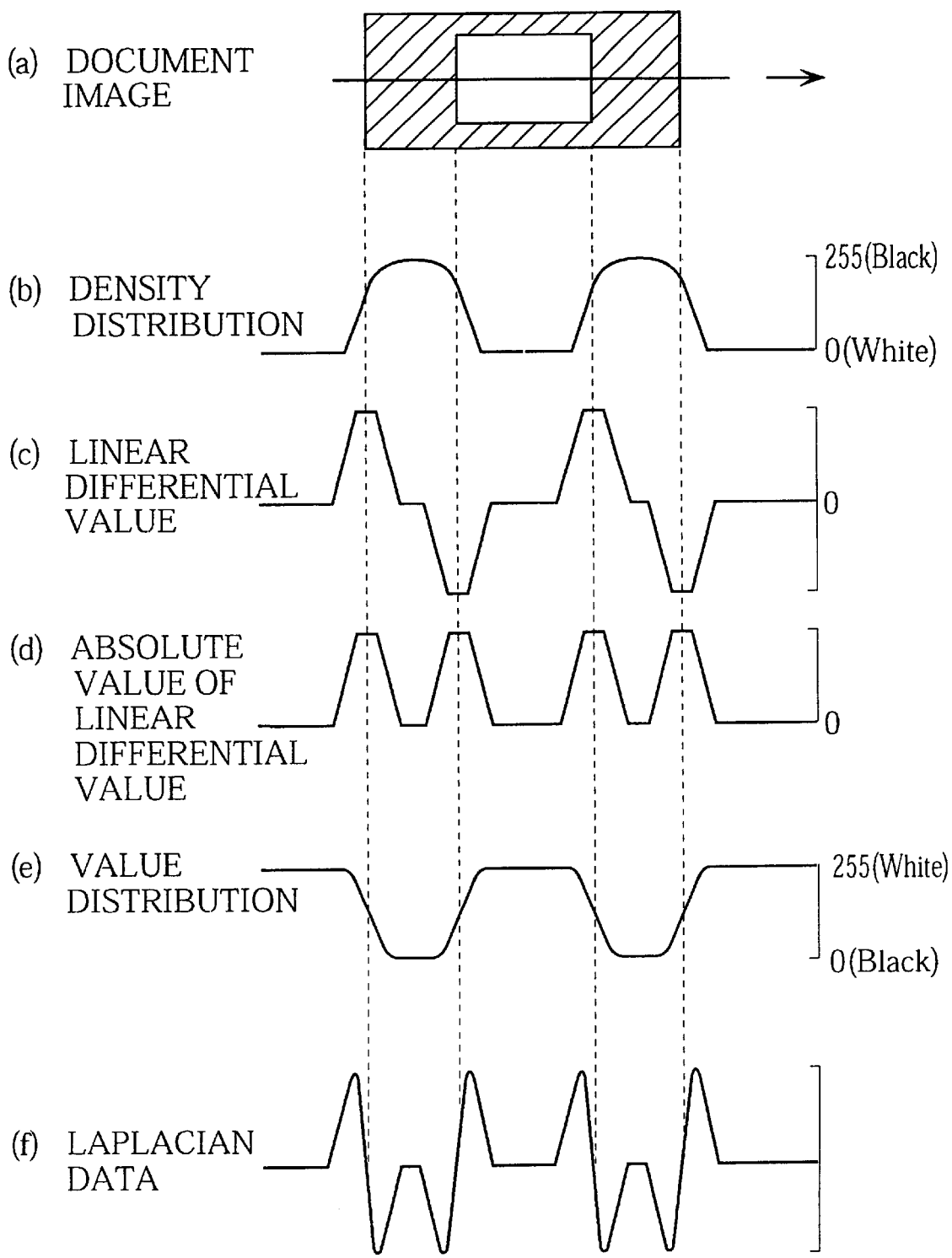
FIG. 52 shows the status of the density distribution, the linear differential value, Laplacian and others after reading a document image.

In FIG. 52, the graph (b) shows the distribution of the density, the graph (c) the linear differential value of the density, the graph (d) the absolute value of the linear differential value, the graph (e) the distribution of Value and the graph (f) Laplacian data corresponding to the Value of the image data that is obtained when the pixels of the original document of FIG. 52(*a*) that lie on the central line are read in the indicated direction.

As shown in FIG. 52, the detected rate of density change is lower than the actual rate at the edge portions of the original document, due to factors such as the reading accuracy of the CCD sensor 3 and the granularity of toner. As a result, density correction is needed. This process is called an edge sharpening process.

The absolute values of the linear differential of the density of FIG. 52(*d*) and the Laplacian data of FIG. 52(*f*) exhibit definite characteristics at edge portions. The edge sharpening process can be performed, using the specified function which has these two values (equivalent to the linear differential value ΔD and the Laplacian data ΔV stated above) as coefficients. As one example, the following equation may be used as the edge sharpening function.

$$D'j = Dj * (f(\Delta V) * g(\Delta D))$$

In this function, j is equal to C, M, Y and K, D'j represents the density value of each reproduced color obtained by the edge sharpening process and Dj represents the density value of each reproduced color obtained by the color correction unit 106.

Figure 51:
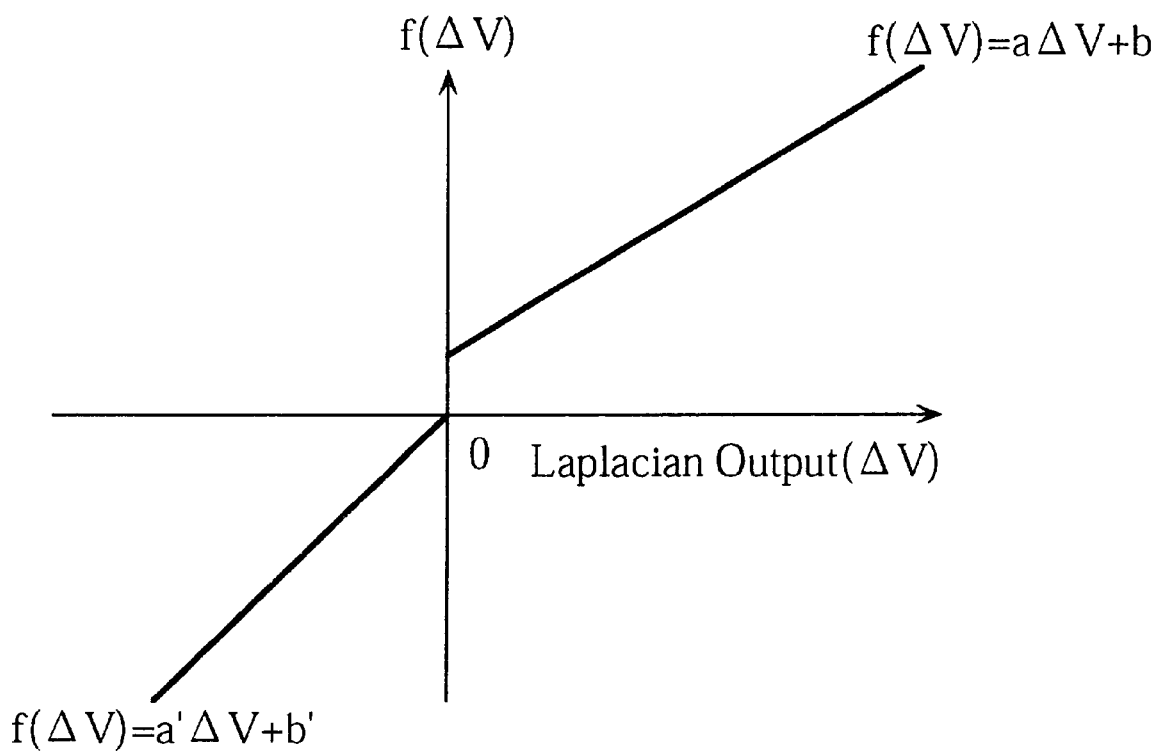
FIG. 51 shows a curve of the MTF correction function.

The function f (ΔV) is a function that changes with the Laplacian data (ΔV) as shown in FIG. 51, which has a unique relation to the MTF correction (thereby, the function f (ΔV) is called "MTF" correction function hereafter), while the function g (ΔD) is the edge discriminating function stated above.

By multiplying the MTF correction function f (ΔV) by the edge discriminating function g (ΔD), the density correction coefficient is set a value that reflects the values ΔV and ΔD. The edge portion is sharpened by multiplying this determined coefficient by the density data Dj.

Accordingly, when the inputted image data is determined to correspond to the edge portion by the area discrimination information from the CPU 1301, the MTF correction unit 108 outputs the edge portion sharpened by the edge sharpening function based on the linear differential data ΔD and the Laplacian data ΔV of the image data.

It should be noted here that the density correction coefficient (f (ΔV)*g(ΔD)) relies substantially on the MTF correction function f (ΔV) since the edge discriminating function g (ΔD) is specified at the area discrimination stage. Here, as shown in FIG. 51, since the MTF correction function f (ΔV) is defined by coefficients a, b, a' and b', these coefficients are generically called "the edge sharpening function" hereafter.

Each value of the these edge sharpening correction coefficients is set an optimal value for each color area during assembly or prior to shipment of the present digital full-color copying machine, and will be changed as necessary when the MTF correction conditions are changed (described later).

(7-5) Smoothing Process

When the CPU 1301 judges from the area discrimination information that the image data of the focused pixel corresponds to the even density portion, the MTF correction unit 108 performs the smoothing process using the two-dimensional space filter.

In the smoothing process, noise present in the image is reduced by finding a moving average for a focused pixel where the value of peripheral pixels is given an appropriate weighting. By doing so, a high-quality image can be achieved.

For instance, as shown in FIG. 53, three types of smoothing filter 1081, 1082 and 1083 (with an increasing degree of smoothing) are set in the MTF correction unit 108. One of these filters is selected for the smoothing process. As is the case with the edge sharpening correction coefficient, the optimum filter to be selected is set for each color area during assembly or prior to shipment of the present digital full-color copying machine, and will be changed as necessary when the MTF correction conditions are changed (described later).

The image data for the entire image corrected as needed by the edge sharpening function or smoothing filter for every color area in the MTF correction unit 108 is magnified or shifted according to user indications given in advance by the user in the magnification change and image shift unit 109, with the color balance then being adjusted by the color balance unit 110. After this, the image data is outputted to the printer control unit 54.

(7-6) Modification of MTF Correction Conditions

MTF correction conditions refer to various conditions for the edge portion discrimination standard used in area discrimination, and the degrees of the edge sharpening process and smoothing process in the MTF correction. The modification of such MTF correction conditions is performed in every color area, when making a copy of a copy previously made by the present digital full-color copying machine, by comparing the standard pattern data stored within the copying machine with image data obtained by having a scanner read the standard pattern (that shows the MTF characteristics when copying was performed) formed inside or outside the image forming area of the original document.

(7-7) Modification of Edge Portion Discrimination Standard

After the user makes a key input of the magnification, the number of the copies, whether to form the standard pattern and whether to use the present MTF correction conditions, the user then presses the copy key to start copying. The pre-scanning then starts and the image data for each color area is obtained from the CCD sensor 3. The obtained image data is converted into a digital multivalue signal by the A/D converter 101 and image defects caused by inconsistencies in the sensitivity of the CCD sensor 3 or the exposure by the lamp are reduced by the shading correction unit 102. The obtained image data for each color is then stored temporarily in the color areas R, G and B of the frame memory 1303.

Figure 54:
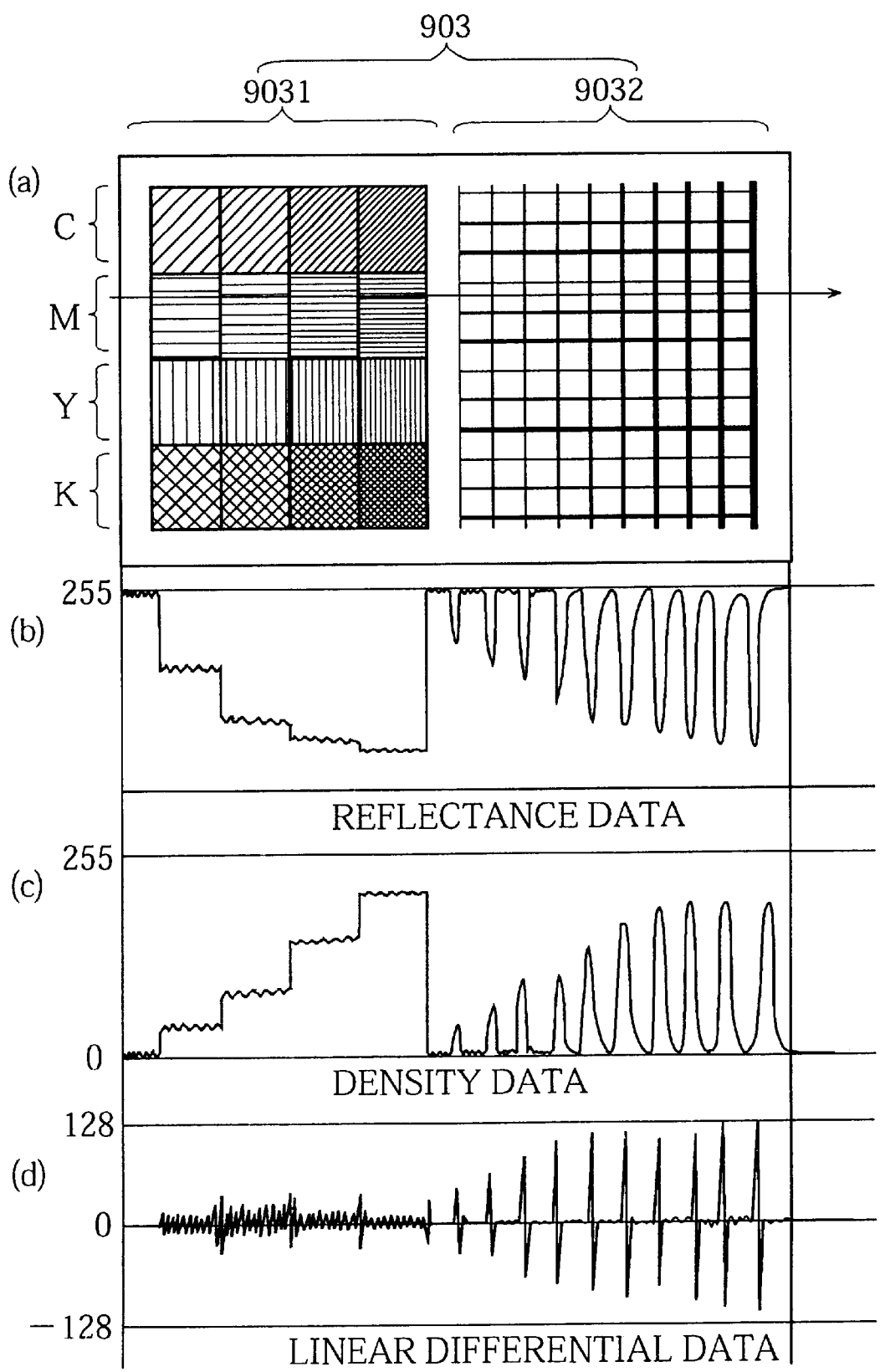
FIG. 54 shows a standard pattern used for modifying the standard to determine the edge portion, and also shows data such as the density data and the linear differential value after reading the standard pattern.

The HVC converter 1304 reads the image data, performs the HVC conversion, and transmits the converted data to the pattern discriminator 104, where each halftone area 9031 and each edge pattern area 9032 of the standard pattern 903 are detected in accordance with the values of H*, V and C* (see FIG. 54). After this, the pattern discriminator 104 transmits the position information of the detected image data (that is, the storing position information in the frame memory 1303) to the CPU 1301, where the position information (called "the pattern position information" hereafter) is stored in an internal memory. It should be noted here that all the color area signals of H*, V and C* do not have to be used in the detection of the pattern position information, so that the pattern may be detected from only the color area signals of Value for instance.

The CPU 1301 next reads the image data on a specified scanning line for the colors Cyan, Magenta, Yellow and Black (C, M, Y and K) in the standard pattern 903 and has the density converter 103 convert the density. The CPU 1301 then instructs the density converter 103 to output the density-converted image data to the linear differential filter unit 1306. The linear differential filter unit 1306 calculates the linear differential data $\Delta D$ using the process described above and outputs it into the CPU 1301.

FIG. 54 shows the distribution characteristics of the reflectance data, the density data and the linear differential data of the density for the one of the colors (R, for instance) when the pattern image data of Magenta in the standard pattern 903 is read along the scanning line in the direction indicated by the arrow.

Since density changes on the halftone area 9031 are only found at the boundaries of the blocks of different densities, the linear differential data value should be almost "0" across most of the halftone area 9031. As shown in FIG. 54(d), however, the linear differential data across the halftone area 9031 is great because of image noise generated due to various factors such as deterioration. If such portions are judged to be the edge potion, the MTF correction unit 108 would end up performing the edge sharpening process based on incorrect area discrimination information. As a result, a false edge would appear in what should be an even density portion of the reproduced image.

To avoid this, the CPU 1301 changes the discrimination standard for the edge portion using the following method. By sampling the linear differential data $\Delta D$ of the density data (except for the data of the density boundaries) on the halftone area, the CPU 1301 obtains the maximum value of the linear differential data $\Delta D$. The CPU 1301 substitutes the maximum value into the edge portion discrimination function $g(\Delta D)$ represented by the characteristic curve of edge level shown in FIG. 50, and then selects the characteristic curves Lnhf holding an inequality $g(\Delta D \text{ max}) \leq 0$.

Meanwhile, the CPU 1301 samples the linear differential data $\Delta D$ of the edge portion on the edge pattern area 9032 and obtains the linear differential data $\Delta D$ min (usually the data of the finest line) to select characteristic curves Lneg holding an inequality $g(\Delta D \text{ min}) > 0$.

A characteristic curve Lnco common to the characteristic curves Lnhf and Lneg is set as the edge portion it discriminating function $g(\Delta D)$. When there are more than one common characteristic curve Lnco, the central curve may be set. When the halftone area is assigned priority, the curve on the right side (whose threshold "an" is the greatest) is selected out of the common curves Lnco. On the other hand, when the edge pattern area is assigned priority, the curve on the left side (whose threshold "an" is the smallest) is selected. This selection process can be specified through the operation panel 60.

The edge portion discriminating function $g(\Delta D)$ modified using the stated method is stored overwritten in the section corresponding to the color area in the internal memory of the CPU 1301 and is used in the discrimination of the image data for each color area hereafter. As a result, the area discrimination can be correctly performed, with even density portions not being mistaken for edge portions or vice versa.

(7-8) Smoothing Filter Selection

After the image data of the halftone area 9031 in Magenta area on the scanning line in FIG. 54 has been read again from the frame memory 1303 and processed in the density converter 103 and the color correction unit 106, the MTF correction unit performs the MTF correction.

Before this MTF correction, the image data of the halftone area on which the density conversion has been performed is outputted to the linear differential filter unit 1306 to obtain the linear differential data $\Delta D$ which the CPU 1301 uses when performing the area discrimination. As described above, the edge discrimination standard is corrected so that the image data can be reliably discriminated as corresponding to the even density portion. This information is given to the MTF correction unit 108.

The MTF correction unit 108 performs the smoothing process on the image data using the smoothing filter set in advance, and then feeds it back to the CPU 1301.

The CPU 1301 compares the smoothed image data to the standard pattern data corresponding to the smoothed image data, and judges whether the difference is within tolerance. When it goes out of tolerance, the CPU 1301 selects another filter so as to minimize the difference.

As specific example, the CPU 1301 may calculate the absolute value of the density difference between the density value of the MTF-corrected image data and that of the corresponding standard pattern data for each pixel, and then add up these differences. The CPU 1301 judges whether the sum of the differences is within tolerance, and if it is not, changes the smoothing filter to minimize the total. The CPU 1301 performs the smoothing process using the changed filter and obtains the difference by comparing the image data to the standard pattern data. The CPU repeats this process until the difference comes within tolerance, when the filter is selected as the new smoothing filter.

Here, a table which associates different types of smoothing filter with different levels of density value may be stored beforehand and used to select one smoothing filter. Also after the difference comes within tolerance, the feedback operation may be repeated to set the smoothing filter by which the difference is minimized.

The MTF correction unit 108 stores the smoothing filter obtained by the above process overwritten in an internal memory so that it can be applied to the image data of the Magenta area.

(7-9) Modification of Edge Sharpening Function

In parallel with the selection of the smoothing filter for the Magenta area, or about that time, the edge sharpening function is modified in the CPU 1301.

The image data of the edge pattern area 9032 of the standard pattern 903, which has been read from the frame memory 1303 and been subjected to density conversion and color correction is inputted to the MTF correction unit 108. Here, this image data corresponds to the edge portion, and has been already judged to correspond to the edge portion in accordance with the new edge discrimination standard. The MTF correction unit 108 accordingly performs the edge sharpening process on the image data of the edge pattern area 9032.

The edge-sharpened image data is fed back to the CPU 1301. The CPU 1301 compares the edge sharpened image data to the standard pattern data stored in the ROM 1302, and modifies the edge sharpening function in order to make the difference fall within tolerance.

As a specific example, the CPU 1301 may calculate the absolute value of the density difference between the density value of the MTF corrected image data and that of the corresponding standard pattern data for each pixel, and then add up these differences. The CPU 1301 judges whether the total of the differences is within tolerance, and if it is not, the CPU 1301 changes the edge sharpening function, i.e., D'j= DJ $*(f(\Delta V)*g(\Delta D))$, so as to minimize the total.

The edge discriminating function $g(\Delta D)$, however, has already been specified during the area discrimination, so that the values of coefficients a, b, a' and b' (the edge sharpening correction coefficients) in the MTF correction function $f(\Delta V)$ are modified to the highest values and are transmitted to the MTF correction unit 108.

The CPU 1301 modifies the edge sharpening correction coefficients, has the MTF correction unit 108 perform the edge sharpening process on the image data of the edge pattern area, and compares the corrected image data to the standard pattern data. This is repeated until the difference comes within tolerance, when the present edge sharpening correction coefficients are set as new edge sharpening correction coefficients.

Here, a table which associates different types of edge sharpening correction coefficients with levels of differences with the standard pattern data may be stored beforehand and used to select one edge sharpening correction coefficient. Also the edge sharpening correction coefficient by which the density difference is minimized may be set.

The MTF correction unit 108 stores the MTF correction function $f(\Delta V)$ obtained by the above process overwritten in an internal memory so that it can be applied to the image data of the Magenta area.

The above description only shows the modification of the MTF correction condition in the Magenta area, although the same operation is performed on the other color areas C, M, Y and K. The modified correction conditions are respectively overwritten and stored in the internal memory of the CPU 1301 or the MTF correction unit 108 corresponding to each color. The correction coefficients for each color area are described as being determined based on a single scanning line, although image data of more than one scanning line in a color area may be read and used to determine, with MTF correction conditions which minimize the difference with the standard pattern data then being selected.

(7-10) Control Operation for Modifying MTF Correction Condition

Figure 44:
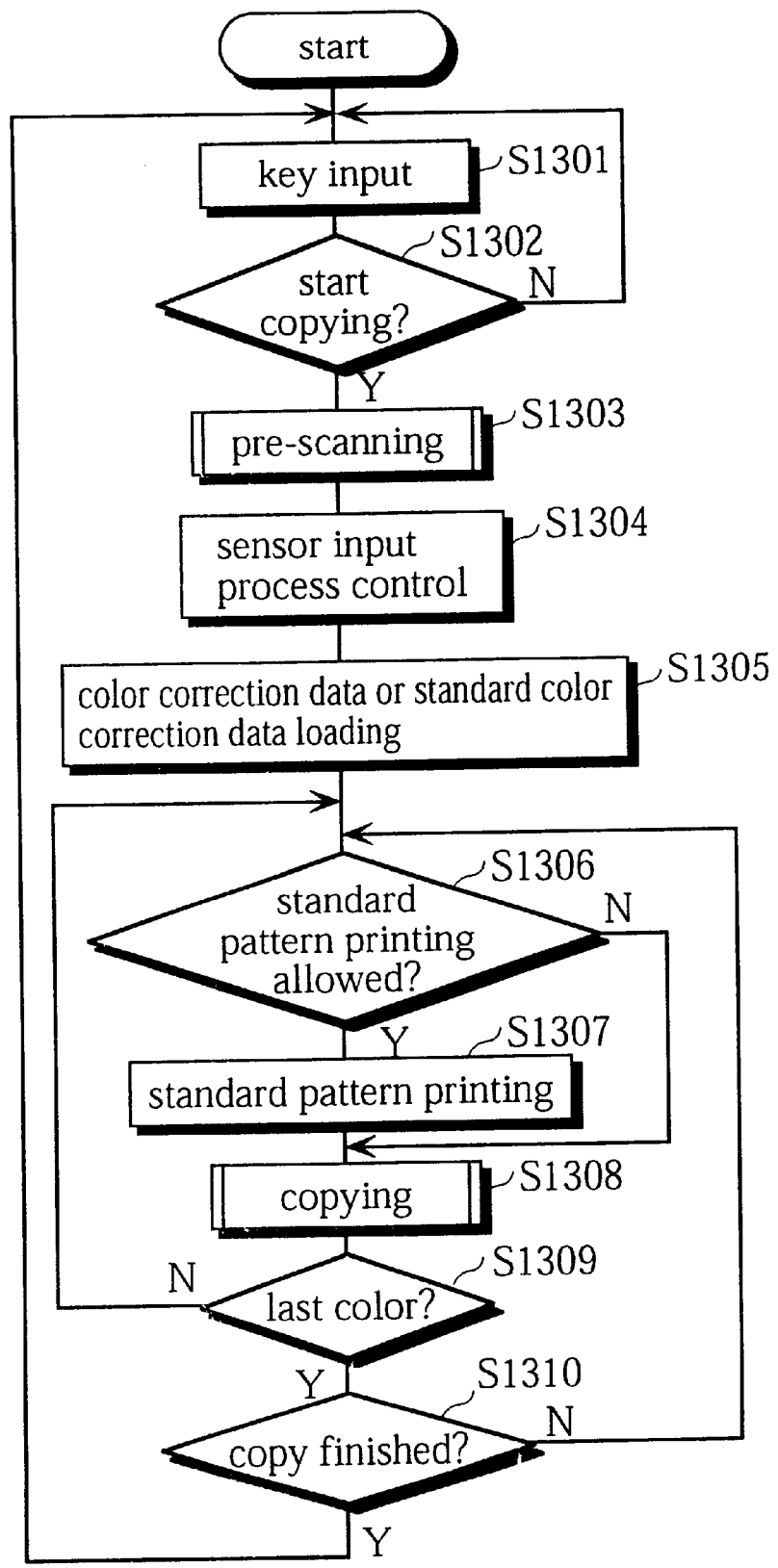
FIG. 44 is a flow chart of the operation of the control system.

The following is an explanation of the control operation by the CPU 1301 for modifying the MTF correction conditions, with reference to the flow chart in FIG. 44.

After the user makes a key input of the magnification, the number of the copies, whether to form the standard pattern and whether to use the present MTF correction conditions, the user then presses the copy key to start copying (steps S1301 and S1302) and the pre-scanning is started (step S1303).

Figure 45:
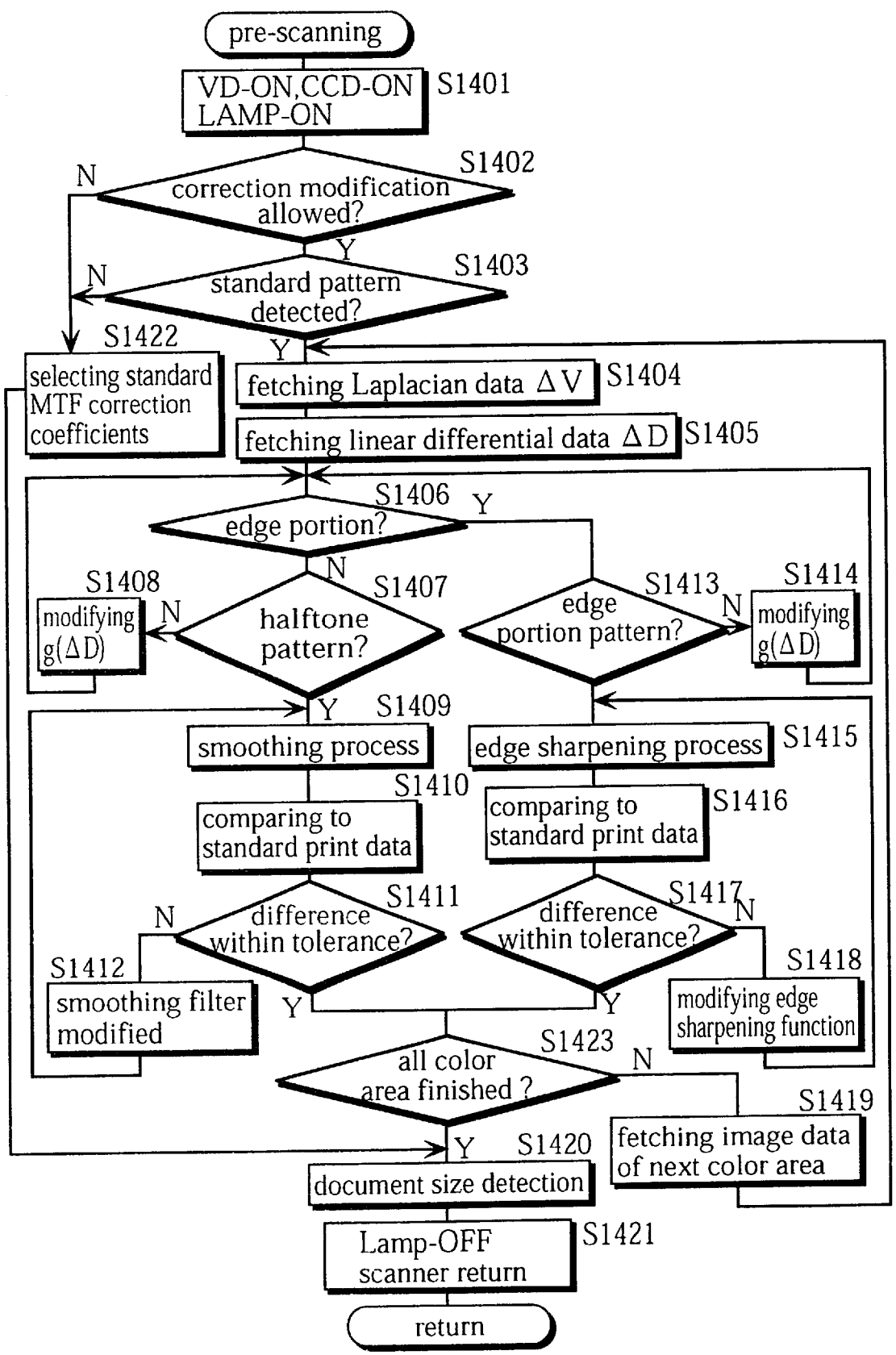
FIG. 45 shows a subroutine of the flow chart shown in FIG. 44.

FIG. 45 shows the operation details of the pre-scanning. The image reader 10 issues the CCD signals to instruct the scanner to apply a voltage to the CCD sensor 3 (CCD-ON), and also issues the VD signals to the scanner to start the output of image data of an original document from the CCD sensor 3 (VD-ON). The scanner lamp is then turned on (LAMP-ON) and the pre-scanning is performed (step S1401). The image data of every color area obtained by pre-scanning the original document is stored in the frame memory 1303 after the shading correction is performed.

The image data of every color area is converted into color area signals of H*, V and C* in the HVC conversion unit 1304, and the Laplacian data $\Delta V$ of Value is obtained by the Laplacian conversion unit 1305. If no instruction preventing the modification of the correction conditions has been given by the user through the operation panel 60, the CPU 1301 judges that the correction conditions can be changed (step S1402). When this is the case, the image data for each pattern in the standard pattern is detected in the pattern discriminator 104, and the pattern position information is outputted to the CPU 1301 (step S1403).

At the same time, the density of the image data of pixels in the standard pattern is converted by the density converter 103 and inputted into the linear differential filter unit 1306 to obtain the linear differential data $\Delta D$. The CPU 1301 then fetches the Laplacian data $\Delta D$ and the linear differential data $\Delta D$ (steps S1404 and S1405), and discriminates whether the image data of the focused pixel corresponds to the edge portion or the even density portion (FIG. 50) using the edge portion discriminating function $g(\Delta D)$ obtained from the linear differential data $\Delta D$ (steps S1406 and S1407).

When the image data of the focused pixel is discriminated to correspond to an even density portion, the CPU 1301 checks it against the pattern position information to make sure that the image data corresponds to the halftone area 9031. If it is not the data of the halftone area 9031 but of the edge pattern area 9032, this means that the edge portion discrimination standard is incorrect. In this case, the CPU 1301 modifies the edge portion discriminating function $g(\Delta D)$ using the stated method (step S1408) and returns to step S1406 to have the area discrimination performed.

If the image data of the focused pixel is judged in S1406 to correspond to an edge portion, the edge portion discriminating function $g(\Delta D)$ is judged to have been properly modified. On the other hand, if the image data is again judged to correspond to the halftone area, the above process is repeated until the area discrimination is correctly performed.

When the image data is judged to correspond to an even density portion in S1406 and is confirmed as being the halftone area 9031 when compared to the pattern position information in S1407, the edge portion discriminating function $g(\Delta D)$ does not need to be modified since it is judged to have been set properly. The CPU 1301 then instructs the MTF correction unit 108 to perform the smoothing process on the image data of this even density portion (step S1409), fetches the smoothed image data and compares it with the standard pattern data of the standard pattern in the corresponding position and judges whether the difference is within tolerance (steps S1410 and S1411).

When the difference is not within tolerance, the CPU judges that there is a problem with the setting of the smoothing filter and resets it (step S1412). After this, the steps from S1409 to S1412 are repeated until the difference is judged in S1411 to be within tolerance.

On the other hand, when the image data of the focused pixel is judged to be the edge portion in S1406, the CPU 1301 checks the image data against the pattern position information to make sure that the image data corresponds to the edge pattern area 9032. If the image data corresponds to the halftone area 9031, the edge portion discrimination standard is incorrect. In this case, the CPU 1301 modifies the edge portion discriminating function g($\Delta$D) using the stated method and performs the area discrimination again (steps S1406, S1413 and S1414).

When the image data of the focused pixel is then judged to be the even density portion in S1406, the edge portion discriminating function g($\Delta$D) is judged to have been modified properly. If the data is judged to be the edge portion again here, the above process is repeated until the edge portion discriminating function is judged to have been modified properly.

When the image data is judged to be the edge portion in S1406 and is checked to be the edge pattern in S1413, the CPU 1301 instructs the MTF correction unit 108 to perform the edge sharpening process on the image data of the edge portion (step S1415), fetches the edge sharpened image data to compare it with the standard pattern data of the standard pattern in the corresponding position and judges whether the difference is within tolerance (steps S1416 and S1417).

When the difference is not within tolerance, the CPU 1301 judges that there is a problem with the edge sharpening function and resets it using the stated method (step S1418). After this, the steps from S1415 to S1418 are repeated until the difference is judged to be within tolerance in S1417.

When the differences between the standard pattern data and the image data of the halftone area and between the standard pattern data and the image data of the edge pattern area are within the respective tolerance for a given color area, the modification of the MTF correction condition in that color area is judged to be complete. After this, the same process is performed on the image data on the scanning line of the next color area. When the MTF correction condition settings in all the color areas are complete, the operation for the modification of the MTF correction condition is terminated (steps S1411, S1417, S1423 and S1419).

Accordingly, by modifying the MTF correction condition in every color area, the optimum MTF correction for every color area belonging to the image data of the document can be performed.

The edge portion discriminating function g($\Delta$D) corrected in S1408 will usually match the one modified in S1414. When more than one function meets the both conditions, the performance of the components in the copying machine is considered to have deteriorated beyond the scope where it can be managed by changing the MTF correction condition. In this case, the display unit may display a message "modification error for MTF correction condition" on the operation panel 60 to encourage the user to replace the necessary components.

After the pre-scanning is completed, the processing returns to step S1304 in FIG. 44 where the sensor input and the process control are performed.

With the structure of the present digital full-color copying machine, after an electrostatic latent image has been formed on the photosensitive drum 21 and color toner has been stuck to the photosensitive drum 21 by the electrostatic force, the toner image is transferred onto the surface of the copying sheet. The quality of the reproduced image therefore depends heavily on the toner and amount of electrical charge on the photosensitive drum. The amount of electrical charge is greatly affected by the temperature and humidity of the environment. As such, a temperature sensor and a humidity sensor (not illustrated) detect the temperature and humidity inside of the present digital full-color copying machine. In the meantime, the surface potential of the photosensitive drum and the amount of stuck toner to the AIDC pattern, this being a pattern provided on the photosensitive drum for detecting the amount of stuck toner. These detected values are inputted into the printer unit 54 in FIG. 42 (the sensor input process).

In accordance with the detected values, the printer control unit 54 modifies the image forming conditions of the printer unit 20 such as conditions for VO (the surface potential of the photosensitive drum), VB (the electric potential of the developing bias), the amplification factor of the laser diode and the gamma correction value set in the gamma table (the process control operation), before performing the main scanning (steps S1304 and S1305).

The image data of the document read in the main scanning for each color is subjected to image processes including the MTF correction process by the image signal processing unit 52, and is outputted to the printer control unit 54 to be printed out.

Here, the CPU 1301 first judges whether to print the standard pattern. When an instruction to prohibit writing the standard pattern has not been given using the operation panel 60, the CPU 1301 reads the standard pattern data for the reproduced colors of standard pattern from the ROM 1302 and transfers the read data to the printer control unit 45. The CPU 1301 then has the standard pattern printed (step S1307), while having the document image printed in accordance with the image data that has been subjected to image processing and converted to data for reproduced colors (step S1308).

This printing operation is performed for colors C, M, Y and K. When the printing for all the reproduced colors is completed, the first copy is finished (Step S1309).

Generally, the printing of the standard pattern based on the standard pattern data in the ROM 1302 is performed only when making a first generation copy. When making second and later generation copies, the standard pattern in the ROM 1302 is not formed every time a new generation copy is made, but the standard pattern in the original document is copied as a part of the image. By copying the standard pattern repeatedly, deterioration in reproduction of fine lines can be detected by reading the copied standard pattern. Using the read data of the standard pattern, a suitable color correction can be performed. When copying more than one sheet of paper, after repeating the above operation from S1306 to S1309 for the indicated number of copies, the copying operation is completed and the next key input is awaited (step S1310).

If an instruction to prohibit the printing of the standard pattern has been issued in S1306, the printing of the standard pattern is not performed in S1307. When copying a document on which no standard pattern has been formed, no margin is required for printing the standard pattern. That is to say, a larger space may be used for the image printing area. As such, the magnification may be adjusted automatically in the magnification change and image shift unit 109 (FIG. 43) so as to print the reproduced image using the enlarged image printing area.

In the present embodiment, when a document to be copied is judged as a special kind of document, the MTF correction is performed using the MTF correction conditions based on the document. When making copies of copies, MTF correction can be performed properly even if the document is a hard copy so that the deterioration in the reproduction of fine lines is minimized.

[The Eighth Embodiment]

The following is an explanation of a digital full-color copying machine of the eighth embodiment of the present invention. The structure of the digital full-color copying machine of this embodiment is the same as that of the first embodiment shown in FIG. 1, although, as shown in the block diagram in FIG. 57, the control system comprises the image signal processing unit 55 serving as a centerpiece, with the CCD sensor 3, the print head control unit 56, the image reader control unit 57 and the printer control unit 58 being connected. The control system controls these units in accordance with the control flows shown in FIGS. 55 and 56. The details of these control flows will be described later.

Figure 58:
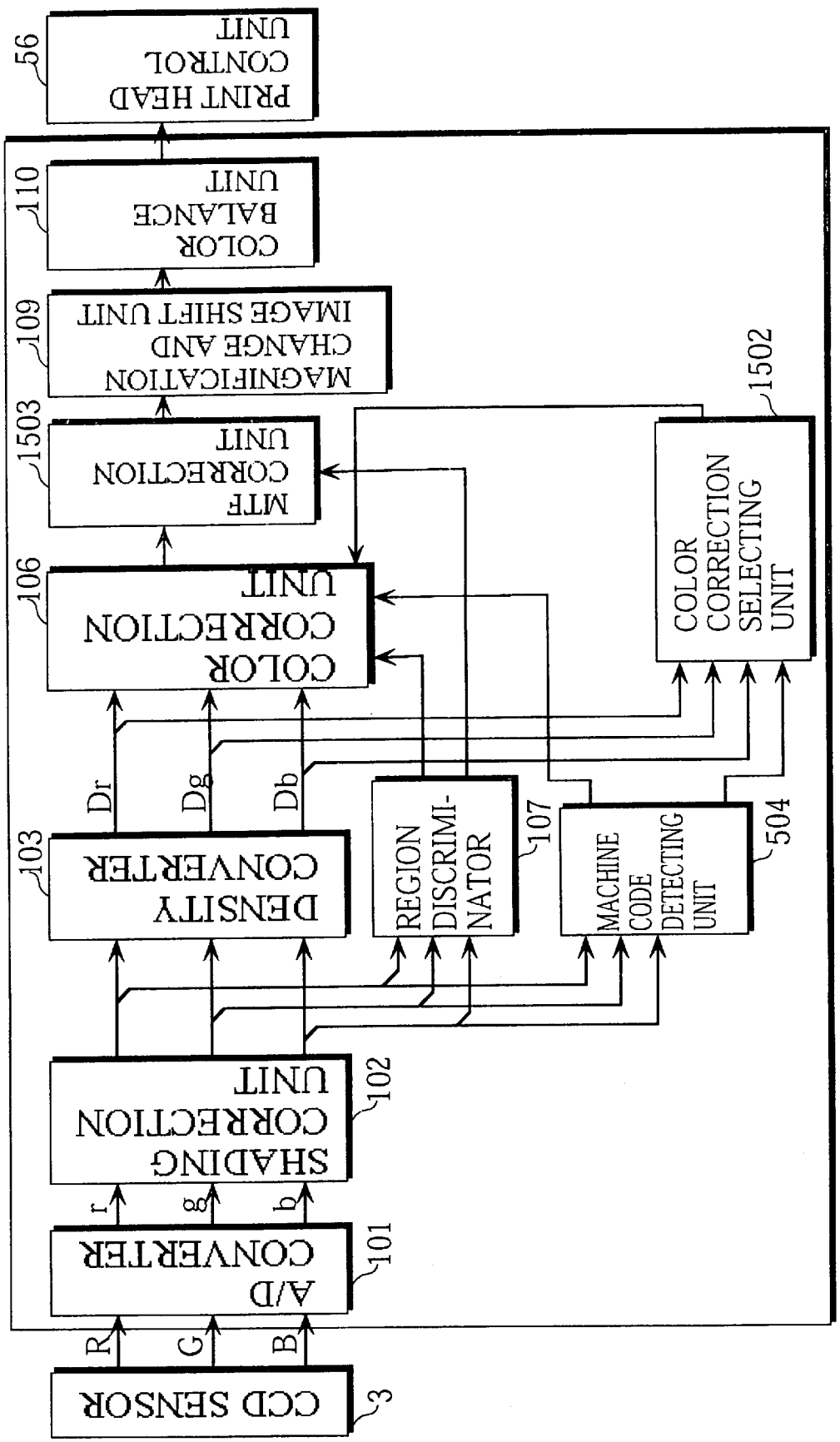
FIG. 58 is a block diagram showing the details of the image signal processing unit 55.

FIG. 58 is a block diagram showing the detailed structure of the image signal processing unit 55. The image signal processing unit 55 has the same structure as that of the image signal processing unit of the sixth embodiment shown in the block diagram in FIG. 39 so as to deal with machine codes. This the image signal processing unit 55, however, comprises a color correction selecting unit 1502 and a MTF correction unit 1503 in place of the gamma correction selecting unit 505 and the MTF correction unit 108 shown in FIG. 39. Accordingly, the description below mainly concerns the color correction selecting unit 1502 and the MTF correction unit 1503.

The color correction selecting unit 1502 selects a color correction condition using the machine code detected by the machine code detecting unit 504 and the look-up table showing the machine code and the corresponding color correction condition, and transmits the selected color correction condition to the color correction unit 106. This look-up table is provided inside the color correction selecting unit 1502 and stores a plurality of pairs of machine codes and color correction conditions. The color correction condition in each pair refers to the optimum color correction condition for making a copy using a machine (such as a copying machine), considering the characteristic of the machine indicated by the machine code in the same pair.

The MTF correction unit 1503 performs the MTF correction using the machine code detected by the machine code detecting unit 504 and the look-up table showing the machine code and the corresponding MTF correction value. This look-up table is provided inside of the MTF correction unit 1503 and stores a plurality of pairs of machine codes and MTF correction values. The MTF correction value in each pair refers to the optimum MTF correction value for making a copy using a machine (such as a copying machine), considering the characteristic of the machine indicated by the machine code in the same pair.

Next, the operation of the digital full-color copying machine of the eighth embodiment is explained with reference to the control flows shown in FIGS. 55 and 56.

The digital full-color copying machine receives various key inputs prior to copying (Step S1501), and these key inputs may be received via an operation panel 60 shown in FIG. 7. The generation button 66 receives an instruction as to whether modification of the correction conditions is allowed. An instruction to allow modification of correction conditions is issued, when the original is a hard copy, to order the color correction selecting unit 1502 and the MTF correction unit 1503 to select the optimum color correction condition and MTF correction value and to have copying performed in accordance with the selected color correction condition and MTF correction value. An instruction to prohibit modification of correction conditions is issued to order the copying machine to perform copying in accordance with the usual color correction condition and MTF correction value, even when the original is a hard copy. The standard pattern button 67 receives an instruction as to whether the same standard pattern of the sixth embodiment as shown in FIG. 40 should be formed during copying. The display 62 indicates the number of copies to be made, the machine code and so on.

After receiving each key input, an instruction to start copying is issued by pressing the copy start key 68 shown in FIG. 7 (Step S1502), and pre-scanning is performed (Step S1503). As shown in the control flow of FIG. 56, the pre-scanning is performed prior to the main scanning of a document to detect the size of the document and the existence of the standard pattern.

Figure 56:
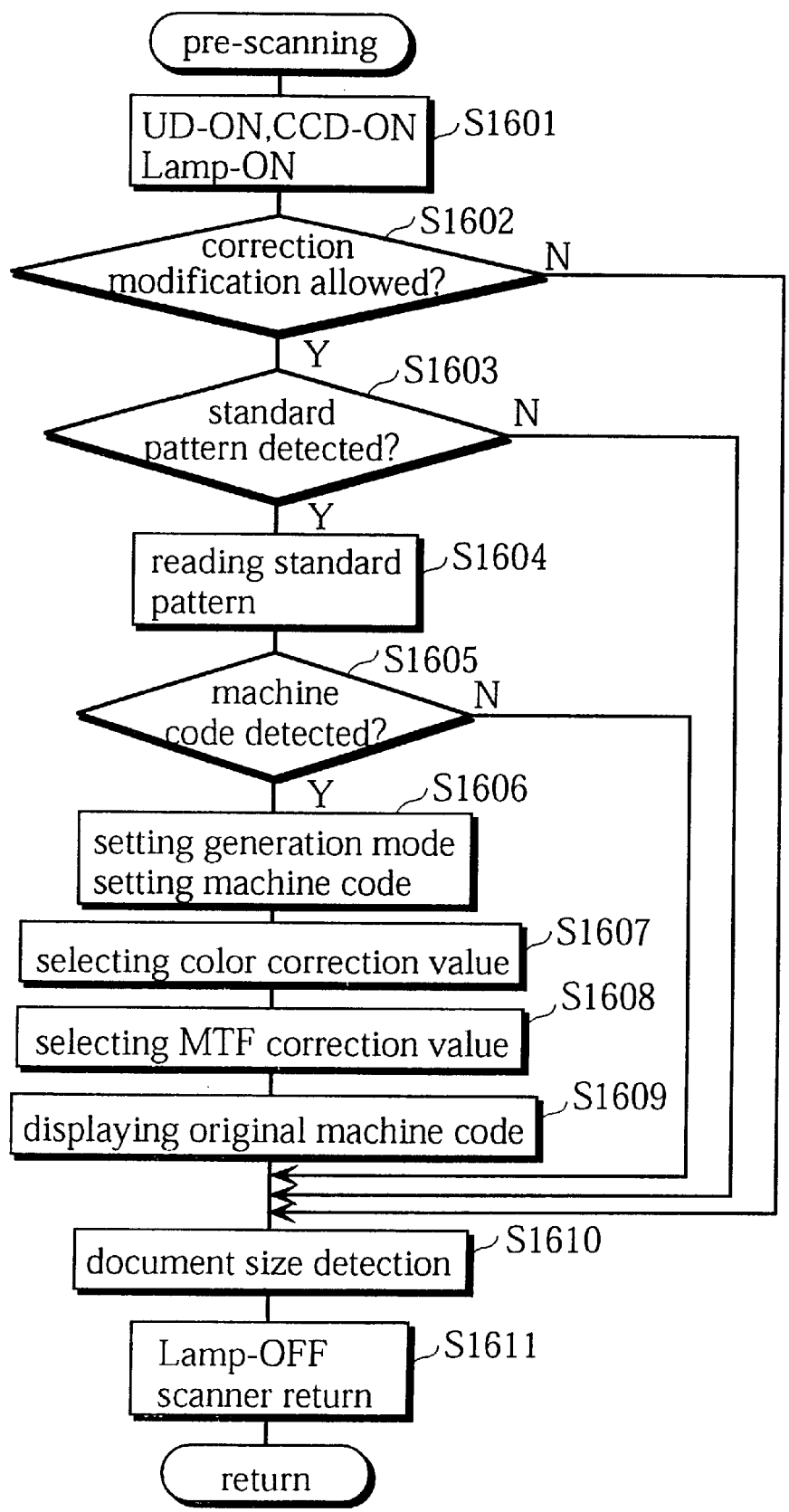
FIG. 56 is a shows a subroutine of the control flow shown in FIG. 55.
Figure 57:
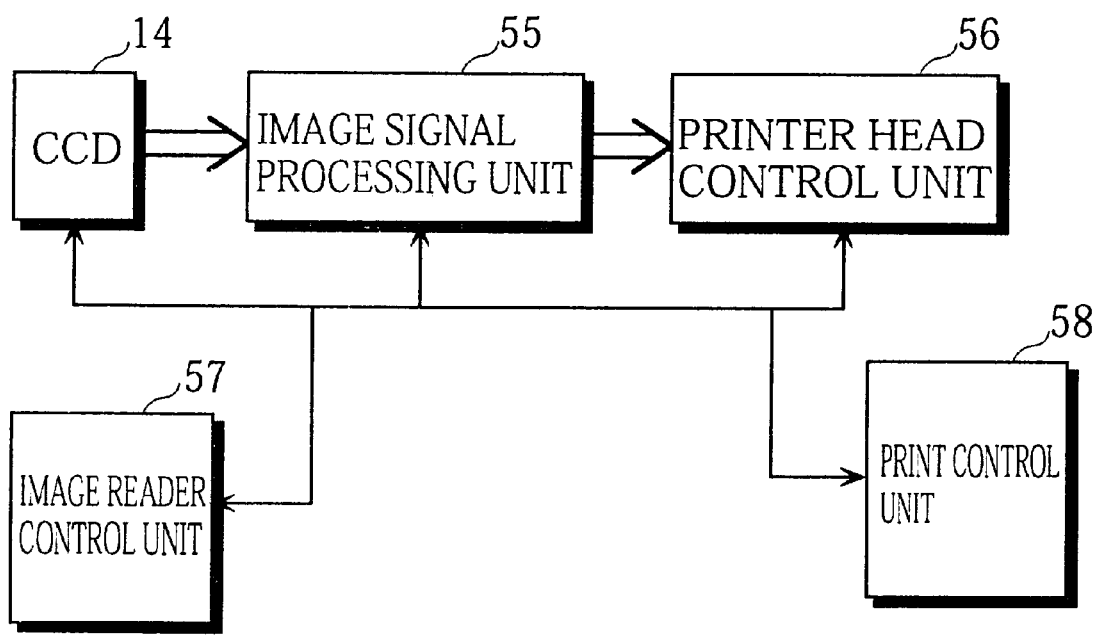
FIG. 57 is a block diagram of the control system.

More specifically, the lamp of the scanner 1, the CCD sensor 3, and the VD signal are first turned on, as shown in the control flow chart of FIG. 56 (Step S1601). The CPU 1301 judges whether an instruction to allow modification of the correction conditions has been received in S1501 (step S1602), and if it has, the machine code detecting unit 504 judges whether the standard pattern representing a machine code and the like exists in the image forming area or in a specified part of the image forming area(step S1603). For instance, the machine code detecting unit 504 judges whether a single-color standard pattern of Y representing a machine code as shown in FIG. 40 exists. If the standard pattern has been detected, the CCD sensor 3 reads the standard pattern (step S1604). The read data of the standard pattern is then sent to the machine code detecting unit 504, through the A/D converter 101, the shading correction unit 102 and the density conversion unit 103. Based on the read data, the machine code detecting unit 504 detects the machine code represented by the standard pattern. If the machine code has been detected (step S1605), the control system sends the detected machine code to the color correction selecting unit 1502, and sets the generation mode flag (step S1606).

The control system orders the color correction selecting unit 1502 to select the color correction conditions (step S1607). Specifically, the color correction selecting unit 1502 selects color correction conditions in accordance with the detected machine code and the internal look-up table of machine codes and color correction conditions. The control system next orders the MTF correction unit 1503 to select the MTF correction value (step S1608). The MTF correction unit 1503 selects the MTF correction values in accordance with the detected machine code and the internal look-up table of machine codes and MTF correction values. The detected machine code is then displayed by the display 62 shown in FIG. 7, and the size of the document is detected by the scanner 1 (steps S1609 and S1610). The lamp of the scanner 1 is turned off, and the scanner is returned to its home position (step S1611), where the pre-scanning comes to an end.

Figure 55:
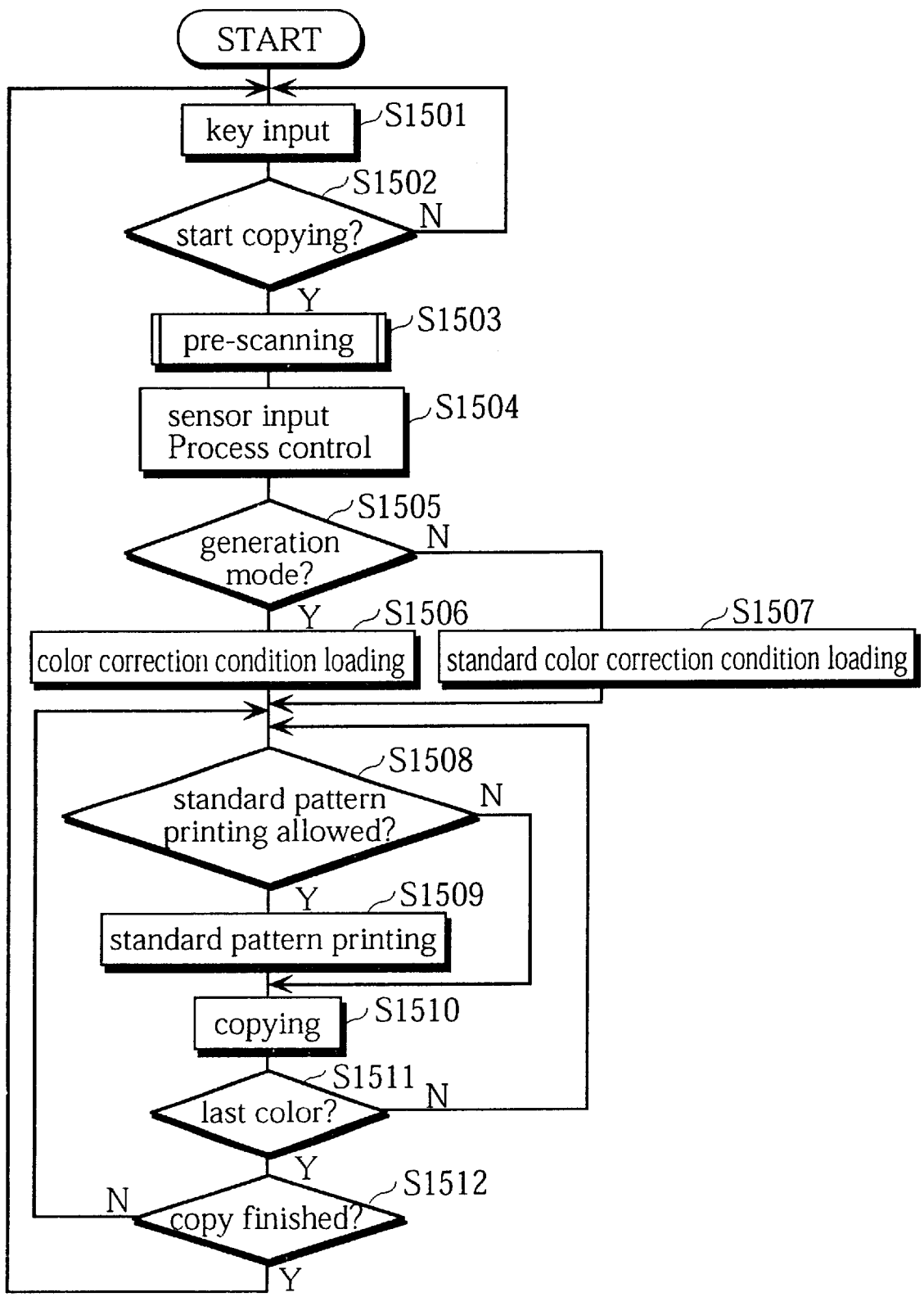
FIG. 55 is a flow chart of the control unit of a digital full-color copying machine of the eighth embodiment.

As shown in the control flow chart of FIG. 55, image forming conditions (VO, VB, LD GAIN, gamma-TABLE and so on) are specified in accordance with the sensor inputs, such as from the environment sensor in the printer, and the process control operations (detection of the electric potential of the photosensitive member and detection of the amount of stuck toners by AIDC pattern)(step S1504). The CPU 1301 judges whether the generation mode flag is currently on (step S1505), and if it is, the color correction conditions selected in 1607 of FIG. 56 are set in the color correction unit 106 and the MTF correction values selected in step S1608 are set in the MTF correction unit 1503 (step S1506). In accordance with the selected color correction conditions and MTF correction values, the copying operation including the main scanning is performed for each color (C, M, Y, and BK) (steps S1510 and S1511).

If the generation mode flag is not currently on, the control system loads the standard color correction conditions from the color correction selecting unit 1502 to set them into the color correction unit 106, and also sets the standard MTF correction values into the MTF correction unit 1503 (step S1507). A copying operation is then performed for each color in accordance with the standard correction conditions (steps S1510 and S1511). When an instruction to form the standard pattern has been issued in S1501 (step S1508), the control system instructs the printer head control unit 56 to form the standard pattern (step S1509). More specifically, the control system orders the printer head control unit 56 to form a standard pattern representing the machine code detected by the machine code detecting unit 504. Accordingly, the produced copies include the standard patterns representing machine codes, so that the color correction which is suitable for the characteristics of the machine represented by the detected machine code can be performed by reading the standard pattern. After repeating the above operation for indicated number of copies, the copying operation is finished (step S1512). The generation mode flag is cleared at the same time as the copying is finished.

According to this embodiment, a machine code is detected by reading the standard pattern, and the copying operation for a hard copy is performed in accordance with the color correction conditions and the MTF correction conditions suitable for the characteristics of the machine represented by the detected machine code. As a result, better reproduction of colors can be achieved in a copying operation even when the original itself is a hard copy. This embodiment has the advantage that the standard pattern does not stand out in the copied image, because the standard pattern is not clearly printed in the margin of a copy sheet as before and is printed using a color difficult to distinguish, such as yellow.

By means of this invention, the standard pattern forming unit prints standard patterns for MTF correction, the standard pattern reading unit reads standard patterns for the MTF correction, and the MTF correction value modifying unit modifies the MTF correction values for the read data of a document in accordance with the read standard pattern for the MTF correction. As a result, MTF correction can be performed in addition to color correction.

Moreover, by means of this invention, the copying operation is performed through the following process. An image is formed together with standard pattern representing at least one machine code, with this being detected when the image is read. Using the data of the read standard pattern, the machine code represented by the read data is detected. Based on the detected machine code, the color correction condition and the MTF correction values for the image data are properly modified. Accordingly, copying is performed in accordance with the color correction conditions and the MTF correction conditions suitable for the characteristics of the machine represented by the detected machine code. As a result, better reproduction of colors can be achieved in a copying operation even when the original itself is a hard copy.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:
    a machine code storage unit for storing a plurality of machine codes, each machine code having gradation correction conditions stored corresponding thereto;
    a standard pattern reading unit for reading a standard pattern formed on a document, and detecting whether the read standard pattern includes data corresponds to one of the plurality of machine codes stored in the machine code storage unit;
    a machine code fetch unit for fetching said one of the plurality of machine codes and the gradation correction conditions corresponding thereto when data corresponding to said one of the plurality of machine codes stored in the machine code storage unit is detected in the read standard pattern;
    a gradation correction condition modification unit for modifying gradation correction conditions in accordance with said fetched gradation correction conditions; and
    a correction unit for correcting image data obtained by reading said document in accordance with said modified gradation correction conditions.

2. The image forming apparatus according to claim 1, wherein the image forming apparatus is a color image forming apparatus, and said standard pattern formed on a copying paper is painted yellow.

3. A method of forming an image with an image forming apparatus, comprising the steps of:
    obtaining image data by reading a document with a document reading unit;
    detecting a standard pattern from said image data;
    detecting whether the detected standard pattern includes data corresponds to one of a plurality of machine codes stored in a table, each machine code have gradation correction conditions stored corresponding thereto;
    reading gradation correction conditions stored corresponding to said one of the plurality of machine codes, and setting said one of the plurality of machine codes and said corresponding gradation correction conditions in said correction unit; and
    performing gradation correction on said image data by a correction unit, and printing an image on a copying paper.

4. An image forming apparatus comprising:
    a machine code storage unit for storing a plurality of machine codes, each machine code having image correction conditions stored corresponding thereto;
    an image reading unit for reading a pattern image formed on a document and detecting whether the read pattern image includes data corresponding to one of the plurality of machine codes stored in the machine code storage unit;
    a machine code fetch unit for fetching said one of the plurality of machine codes and the image correction conditions corresponding thereto when data corresponding to said one of the plurality of machine codes stored in the machine code storage unit is detected in the read pattern image;
    an image correction condition modifying unit for modifying image correction conditions in accordance with the fetched image correction conditions; and an image correcting unit for correcting image data in accordance with the modified image correction conditions, the image data being obtained by reading the document.

5. An image forming apparatus according to claim 4, wherein the image correction is an image gradation correction, and the image correction condition modifying unit modifies an image gradation correction condition.

6. An image forming apparatus according to claim 4, wherein the image correction is an MTF correction, and the image correction condition modifying unit modifies an MTF correction condition.

7. An image forming apparatus according to claim 4, wherein the image correction is a color correction, and the image correction condition modifying unit modifies a color correction condition.

8. An image forming apparatus according to claim 4 further comprising:

a display for displaying the detected machine code.

9. An image forming apparatus according to claim 4 further comprising:

a setting unit for setting a predetermined mode, wherein the image correcting unit corrects the image data in accordance with the modified image correction condition when the predetermined mode has been set, and corrects the image data in accordance with the image correction condition before the modification when the predetermined mode has not been set.

10. A image forming apparatus according to claim 4, wherein the pattern image is formed on the document using yellow ink.

11. An image forming apparatus according to claim 4, wherein the pattern image is formed outside an image area of a sheet of the document.

* * * * *